US011310262B1

(12) United States Patent
Oliphant et al.

(10) Patent No.: US 11,310,262 B1
(45) Date of Patent: *Apr. 19, 2022

(54) REAL-TIME VULNERABILITY MONITORING

(71) Applicant: SecurityProfiling, LLC, Cedar Park, TX (US)

(72) Inventors: Brett M. Oliphant, Plano, TX (US); John P. Blignaut, West Lafayette, IN (US)

(73) Assignee: Security Profiling, LLC, Cedar Park, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/515,385

(22) Filed: Oct. 29, 2021

Related U.S. Application Data

(63) Continuation of application No. 17/098,281, filed on Nov. 13, 2020, which is a continuation of application No. 16/740,961, filed on Jan. 13, 2020, now Pat. No. 10,873,595, which is a continuation of application No. 15/608,983, filed on May 30, 2017, now Pat. No. 10,547,631, which is a continuation of application No. 14/834,102, filed on Aug. 24, 2015, now Pat. No.
(Continued)

(51) Int. Cl.
*H04L 9/40* (2022.01)
*H04L 29/06* (2006.01)
*G06F 21/50* (2013.01)

(52) U.S. Cl.
CPC .......... *H04L 63/1433* (2013.01); *G06F 21/50* (2013.01); *H04L 63/1416* (2013.01); *H04L 63/20* (2013.01); *H04L 63/0263* (2013.01)

(58) Field of Classification Search
CPC . H04L 63/1433; H04L 63/20; H04L 63/1416; G06F 21/50
USPC ........................................................... 726/23
See application file for complete search history.

(56) References Cited

U.S. PATENT DOCUMENTS

| 5,684,957 A | 11/1997 | Kondo et al. |
| 5,796,942 A | 8/1998 | Esbensen |

(Continued)

FOREIGN PATENT DOCUMENTS

| FR | 2819322 A1 | 7/2002 |
| JP | 2002157221 A | 5/2002 |

(Continued)

OTHER PUBLICATIONS

Fortinet, Inc., "FortiGate-50 V2.30 User Manual," Oct. 27, 2002.
(Continued)

*Primary Examiner* — Dant B Shaifer Harriman
(74) *Attorney, Agent, or Firm* — Patrick E. Caldwell, Esq.; The Caldwell Firm, LLC

(57) ABSTRACT

An apparatus is provided including at least one platform; an intrusion prevention system configured to communicative couple with the at least one platform; a firewall configured to communicative couple with the at least one platform; at least one first data storage configured to communicative couple with the at least one platform; and at least one second data storage configured to communicative couple with the at least one platform. The at least one platform is configured to perform a plurality of operations that collective protect one or more networked devices.

20 Claims, 12 Drawing Sheets

Related U.S. Application Data 10,154,055, which is a continuation of application No. 14/138,014, filed on Dec. 21, 2013, now Pat. No. 9,117,069, which is a continuation of application No. 10/882,852, filed on Jul. 1, 2004, now abandoned.

(60) Provisional application No. 60/484,085, filed on Jul. 1, 2003.

(56) References Cited

U.S. PATENT DOCUMENTS

| | | | |
|---|---|---|---|
| 5,819,255 A | 10/1998 | Celis et al. | |
| 5,822,750 A | 10/1998 | Jou et al. | |
| 5,872,931 A | 2/1999 | Chivaluri | |
| 5,951,698 A | 9/1999 | Chen et al. | |
| 5,960,170 A | 9/1999 | Chen et al. | |
| 5,987,611 A | 11/1999 | Freund | |
| 6,088,804 A | 7/2000 | Hill et al. | |
| 6,119,165 A | 9/2000 | Li et al. | |
| 6,119,236 A | 9/2000 | Shipley | |
| 6,185,689 B1 | 2/2001 | Todd et al. | |
| 6,226,372 B1 | 5/2001 | Beebe et al. | |
| 6,275,942 B1 | 8/2001 | Bernhard et al. | |
| 6,279,113 B1 | 8/2001 | Vaidya | |
| 6,298,445 B1 | 10/2001 | Shostack et al. | |
| 6,301,668 B1 | 10/2001 | Gleichauf et al. | |
| 6,324,646 B1 | 11/2001 | Chen et al. | |
| 6,405,318 B1 | 6/2002 | Rowland | |
| 6,408,391 B1* | 6/2002 | Huff | H04L 63/0435 726/22 |
| 6,513,122 B1 | 1/2003 | Magdych et al. | |
| 6,530,024 B1* | 3/2003 | Proctor | H04L 63/1441 709/224 |
| 6,546,493 B1* | 4/2003 | Magdych | H04L 63/14 709/227 |
| 6,550,012 B1 | 4/2003 | Villa et al. | |
| 6,574,639 B2 | 6/2003 | Carey et al. | |
| 6,636,845 B2 | 10/2003 | Chau et al. | |
| 6,735,766 B1 | 5/2004 | Chamberlain et al. | |
| 6,775,675 B1 | 8/2004 | Nwabueze et al. | |
| 6,789,202 B1 | 9/2004 | Ko et al. | |
| 6,789,215 B1 | 9/2004 | Rupp et al. | |
| 6,898,632 B2 | 5/2005 | Gordy et al. | |
| 6,907,531 B1 | 6/2005 | Dodd et al. | |
| 6,925,443 B1 | 8/2005 | Baggett et al. | |
| 6,925,572 B1 | 8/2005 | Amit et al. | |
| 6,952,779 B1 | 10/2005 | Cohen et al. | |
| 6,957,348 B1 | 10/2005 | Flowers et al. | |
| 6,971,026 B1 | 11/2005 | Fujiyama et al. | |
| 7,000,247 B2 | 2/2006 | Banzhof | |
| 7,007,299 B2 | 2/2006 | Ioele et al. | |
| 7,085,934 B1 | 8/2006 | Edwards | |
| 7,093,292 B1 | 8/2006 | Pantuso | |
| 7,096,503 B1 | 8/2006 | Magdych et al. | |
| 7,124,438 B2 | 10/2006 | Judge et al. | |
| 7,152,105 B2 | 12/2006 | McClure et al. | |
| 7,159,237 B2 | 1/2007 | Schneier et al. | |
| 7,178,166 B1 | 2/2007 | Taylor et al. | |
| 7,181,769 B1 | 2/2007 | Keanini et al. | |
| 7,222,366 B2 | 5/2007 | Bruton et al. | |
| 7,234,168 B2 | 6/2007 | Gupta et al. | |
| 7,237,264 B1 | 6/2007 | Graham et al. | |
| 7,278,161 B2 | 10/2007 | Lingafelt et al. | |
| 7,308,493 B2 | 12/2007 | Liang | |
| 7,308,715 B2 | 12/2007 | Gupta et al. | |
| 7,331,061 B1 | 2/2008 | Ramsey et al. | |
| 7,359,626 B2 | 4/2008 | McMurdie et al. | |
| 7,359,962 B2 | 4/2008 | Willebeek-Lemair et al. | |
| 7,392,545 B1 | 6/2008 | Weber et al. | |
| 7,398,272 B2 | 7/2008 | Hindawi et al. | |
| 7,409,714 B2 | 8/2008 | Gupta et al. | |
| 7,412,721 B2 | 8/2008 | Torii et al. | |
| 7,418,730 B2 | 8/2008 | Chu et al. | |
| 7,424,746 B1 | 9/2008 | Magdych et al. | |
| 7,444,679 B2 | 10/2008 | Tarquini et al. | |
| 7,451,488 B2 | 11/2008 | Cooper et al. | |
| 7,472,421 B2 | 12/2008 | Cummins | |
| 7,478,420 B2 | 1/2009 | Wright et al. | |
| 7,516,490 B2 | 4/2009 | Riordan et al. | |
| 7,574,740 B1 | 8/2009 | Kennis | |
| 7,575,740 B2 | 8/2009 | Molenberg et al. | |
| 7,590,855 B2 | 9/2009 | Irwin | |
| 7,610,610 B2 | 10/2009 | Haeffele et al. | |
| 7,624,444 B2 | 11/2009 | Gupta et al. | |
| 7,650,638 B1 | 1/2010 | Njemanze et al. | |
| 7,694,128 B2 | 4/2010 | Judge et al. | |
| 7,716,742 B1 | 5/2010 | Roesch et al. | |
| 7,739,722 B2 | 6/2010 | Okajo et al. | |
| 7,823,204 B2 | 10/2010 | Gupta et al. | |
| 7,913,303 B1 | 3/2011 | Rouland et al. | |
| 7,926,113 B1 | 4/2011 | Gula et al. | |
| 7,941,854 B2 | 5/2011 | Baffes et al. | |
| 8,065,725 B2 | 11/2011 | Zheng et al. | |
| 8,127,353 B2* | 2/2012 | Rittermann | H04L 63/1433 726/25 |
| 8,127,359 B2 | 2/2012 | Kelekar | |
| 8,176,553 B1 | 5/2012 | Magdych et al. | |
| 8,201,257 B1 | 6/2012 | Andres et al. | |
| 8,225,407 B1 | 7/2012 | Thrower et al. | |
| 8,256,002 B2 | 8/2012 | Chandrashekhar et al. | |
| 8,266,703 B1 | 9/2012 | Magdych et al. | |
| 8,438,643 B2* | 5/2013 | Wiemer | G06F 21/577 709/224 |
| 8,766,553 B2 | 7/2014 | Lin et al. | |
| 8,984,644 B2 | 3/2015 | Oliphant et al. | |
| 9,047,582 B2* | 6/2015 | Hutchinson | H04L 63/0428 |
| 9,094,434 B2 | 7/2015 | Williams et al. | |
| 9,100,431 B2 | 8/2015 | Oliphant et al. | |
| 9,117,069 B2 | 8/2015 | Oliphant et al. | |
| 9,118,708 B2 | 8/2015 | Oliphant et al. | |
| 9,225,686 B2 | 12/2015 | Oliphant et al. | |
| 9,584,536 B2* | 2/2017 | Nantel | H04L 63/02 |
| 9,846,780 B2 | 12/2017 | Tonn et al. | |
| 10,122,750 B2* | 11/2018 | Gorodissky | G06F 21/577 |
| 10,873,595 B1* | 12/2020 | Oliphant | H04L 63/1416 |
| 11,184,384 B2* | 11/2021 | Flaherty | G06N 5/003 |
| 2001/0034847 A1 | 10/2001 | Gaul | |
| 2002/0087882 A1 | 7/2002 | Schneier et al. | |
| 2002/0091819 A1 | 7/2002 | Melchione et al. | |
| 2002/0100036 A1 | 7/2002 | Moshir et al. | |
| 2002/0112179 A1 | 8/2002 | Riordan et al. | |
| 2002/0147803 A1* | 10/2002 | Dodd | H04L 63/1433 726/25 |
| 2003/0004689 A1 | 1/2003 | Gupta et al. | |
| 2003/0051026 A1 | 3/2003 | Carter et al. | |
| 2003/0056116 A1 | 3/2003 | Bunker et al. | |
| 2003/0126472 A1* | 7/2003 | Banzhof | G06F 21/577 726/25 |
| 2003/0140249 A1 | 7/2003 | Taninaka et al. | |
| 2003/0188194 A1 | 10/2003 | Currie et al. | |
| 2003/0196123 A1 | 10/2003 | Rowland et al. | |
| 2003/0204632 A1 | 10/2003 | Willebeek-LeMair et al. | |
| 2004/0006704 A1 | 1/2004 | Dahlstrom et al. | |
| 2004/0064726 A1 | 4/2004 | Girouard | |
| 2004/0064731 A1 | 4/2004 | Nguyen et al. | |
| 2004/0073800 A1 | 4/2004 | Shah et al. | |
| 2004/0088581 A1 | 5/2004 | Brawn et al. | |
| 2004/0111637 A1 | 6/2004 | Baffes et al. | |
| 2004/0117640 A1 | 6/2004 | Chu et al. | |
| 2004/0167806 A1 | 8/2004 | Eichhorn et al. | |
| 2004/0221176 A1 | 11/2004 | Cole | |
| 2004/0250107 A1 | 12/2004 | Guo | |
| 2005/0005152 A1 | 1/2005 | Singh et al. | |
| 2005/0022021 A1 | 1/2005 | Bardsley et al. | |
| 2005/0086522 A1 | 4/2005 | Rowland | |
| 2005/0216957 A1 | 9/2005 | Banzhof et al. | |
| 2006/0031933 A1 | 2/2006 | Costa et al. | |
| 2006/0095965 A1 | 5/2006 | Phillips et al. | |
| 2006/0191012 A1 | 8/2006 | Banzhof et al. | |
| 2006/0265750 A1 | 11/2006 | Huddleston | |
| 2008/0060073 A1 | 3/2008 | Haeffele et al. | |
| 2008/0282347 A1 | 11/2008 | Dadhia et al. | |
| 2009/0038015 A1 | 2/2009 | Diamant et al. | |

(56) References Cited

U.S. PATENT DOCUMENTS

| | | | | |
|---|---|---|---|---|
| 2011/0023119 | A1* | 1/2011 | Rayes | H04L 63/145 726/23 |
| 2012/0079598 | A1* | 3/2012 | Brock | G06F 21/577 726/25 |
| 2012/0185944 | A1 | 7/2012 | Abdine et al. | |
| 2012/0210434 | A1 | 8/2012 | Curtis et al. | |
| 2013/0227695 | A1* | 8/2013 | Shankar | G06F 21/577 726/25 |
| 2014/0359776 | A1* | 12/2014 | Liu | H04L 63/14 726/25 |
| 2015/0033340 | A1* | 1/2015 | Giokas | H04L 63/1433 726/23 |
| 2015/0271142 | A1 | 9/2015 | Oliphant et al. | |
| 2017/0078309 | A1* | 3/2017 | Allen | H04L 63/1433 |
| 2017/0195361 | A1* | 7/2017 | Liu | G06F 8/41 |
| 2018/0219900 | A1* | 8/2018 | Gorodissky | H04L 63/20 |
| 2018/0219901 | A1* | 8/2018 | Gorodissky | H04L 63/1433 |
| 2018/0316715 | A1* | 11/2018 | Liu | H04L 63/1466 |
| 2019/0036961 | A1* | 1/2019 | Gorodissky | G06F 21/577 |
| 2020/0052878 | A1* | 2/2020 | Enga | G06F 21/6209 |
| 2020/0053115 | A1* | 2/2020 | Hodgman | H04L 63/1408 |

FOREIGN PATENT DOCUMENTS

| | | |
|---|---|---|
| WO | 9841919 A1 | 9/1998 |
| WO | 1999056196 A1 | 11/1999 |
| WO | 2001091350 A3 | 1/2003 |
| WO | 2003058457 A1 | 7/2003 |
| WO | 2003060717 A1 | 7/2003 |

OTHER PUBLICATIONS

Fortinet, Inc., "FortiGate-500 Datasheet," Mar. 11, 2002.
Fortinet, Inc., "FortiGate-500 V2.27 User Manual," Jul. 31, 2002.
Fortinet, Inc., "FortiGate-500 V2.30 User Manual," Oct. 27, 2002.
Fortinet, Inc., "FortiGate-5000 Series Administration Guide Version 2.80 MR11," Oct. 26, 2005.
Fortinet, Inc., "FortiGate™ Antivirus Firewall Administration Guide Version 3.0," Jul. 11, 2005.
Fortinet, Inc., "Fortine Real Time Network Protection Brochure," 2003.
Fortinet, Inc., "Fortinet FortiCenter Functional Specifications Version 1.0," Jul. 2002.
Fortinet, Inc., "FortiResponse™ Update Infrastructure Technical Note," Dec. 2002.
Fortinet, Inc., "Life of a Packet, White Paper," Oct. 9, 2003.
FR32819322 (Sadirac, 2012).
Fratto, Mike, "Policy Enforcers," May 29, 2003, Network Computing.
Frederic Cuppens, Sylvain Gombault Thierry Sans, "Cuppens, Selecting Appropriate Countermeasures in an Intrusior election Framework," 2004.
Gartner, "Gartner, Enterasys Networks Dragon Intrusion Detection System (2003)," 2003.
GFI Software Ltd., "GFI LANguard Network Security Scanner 3.3 Manual," Oct. 22, 2003.
Gillmor, Steve, "BindView Simplifies Security," Aug. 16, 2002, InfoWorid.
Government Computer News GCN Tech Edition, "Patch Management Software Cuts the Manual Labor ("GCN Chart")," Jun. 14, 2004.
Greene, Tim, "Streamlining Intrusion Detection, NetworkWorld article," Feb. 25, 2002, NetworkWorld.
Gucer et al., "Early Experiences with Tivoli Enterprise Console 3.7," 2000, International Business Machines Corporation.
Guirguis, Ragi, "Network and Host-Based Vulnerability Assessments: An Introduction to a Cost Effective and Easy to Use Strategy ("Guirguis Paper")," Jun. 14, 2003, SANS Institute.
Gula, R., Network Security Technology Update for CIOs, Tenable Network Security (2002).
Hagopian, S., Network-Based Intrusion Prevention System Technology Revolution or Evolution?, SANS (2004).
Holden, Greg, "Guide to Firewalls and Network Security: Intrusion Detection and VPNs," 2003, Thomson.
Holden, Greg, "Guide to Network Defense & Countermeasure," 2003, Thomson Course Technology.
Hourihan et a. , "Nokia Network Security: Solutions Handbook— The Complete Guide to Nokia Firewalls and VPNs," 2002, Syngress Publishing Inc.
Hull Scott, "GIAC Security Essentials Certification Practical Assignment," Version 1.4b, Option 2, May 31, 2003, found in GIAC Certifications, Global Information Assurance Certification Paper, SANS Institute (2003).
Hulme, G., Gartner: Intrusion Detection on the Way Out, Information Week (2003).
IBM "Tivoli Endpoint Manager for Lifecycle Management V.8.2" Software Announcement, dated Jun. 12, 2012.
IEEE, ""Cooperative Intrusion Tracebook and Response Architecture (CITRA)", IEEE 2001 ("CITRA")," 2001.
Infoworld, ""Eyes on the network—eEye EVA brings manageability to strong vulnerability assessment" ("InfoWorld Article")," Feb. 24, 2003.
Infoworld, "CA Unifies eTrust Tools," Sep. 19, 2002.
Interface Analysis Associates, "Web Review: Enterprise-level Intrusion Detection (and Prevention) Systems," Sep. 13, 2004.
Internet Security System's website, www.iss.net, ""Enterprise Protection Components" ("EPP Components")," Jun. 2, 2003.
Internet Security System's website, www.iss.net, "Internet Security Systems Introduces ISS Proventia A-Series Protection Appliances ("Proventia A Series Press Release 1")," Apr. 14, 2003.
Internet Security System's website, www.iss.net, "Internet Security Systems Introduces Proventia Family of Protection Appliances to Identify and Prevent All Forms of Network Attack ("Proventia A Series Press Release 2")," Apr. 14, 2003.
Internet Security Systems "RealSecure 6.0", Frequently Asked Questions, Jun. 2001, 21 pages.
Internet Security Systems Certified User Training, "Internet Scanner for Windows NT," Version 5.4, 1998.
Internet Security Systems Technical White Paper, "BlackICE Sentry to RealSecure Network Sensor 7.0 Migration Guide" 2002.
Internet Security Systems, ""Internet Security Systems Reports Third Quarter Results, Achieves Operating Profitability and Earnings Expectations," ("Earning Announcement")," Oct. 17, 2001.
Internet Security Systems, "Internet Security Systems Internet Scanner User Guide, Version 6.2.1 ("ISUG")," Nov. 2001.
Internet Security Systems, "Network Sensor Policy Guide," Version 6.0, 2001, 54 pages.
Internet Security Systems, "RealSecure 5.x to 6.0 Upgrade Considerations," Revision 1.2, May 17, 2001, 5 pages.
Internet Security Systems, "RealSecure 6.0" Revision 1a, Jun. 8, 2001, 3 pages.
Internet Security Systems, "RealSecure Getting Started," 1998, 46 pages.
Internet Security Systems, "RealSecure Getting Started," 1999, 68 pages.
Internet Security Systems, "RealSecure Installation Guide," Version 6.0, 2001, 218 pages.
Internet Security Systems, "RealSecure Network Engine User Guide," Version 3.1, 1999, 28 pages.
Internet Security Systems, "RealSecure Network Sensor and Gigabit Network Sensor Installation Guide" Version 7.0, 2002, 150 pages.
Internet Security Systems, "RealSecure Network Sensor Policy Guide," Version 7.0, 2002, 74 pages.
Trend Micro Incorporated, "Trend Micro™ InterScan VirusWall™ 3 Getting Started Guide," Aug. 2003.
Trend Micro Incorporated, "Trend OfficeScan Corporate Edition Administrator's Guide," 1998.
Trend Micro, "OfficeScan 7 Installation and Deployment Guide" Mar. 2005.
Tuttle et al., "Centralized Risk Management Using Tivoli Risk Manager 4.2, International Technical Support Organization," 2003, International Business Machines Corporation.

(56) References Cited

OTHER PUBLICATIONS

Voldal, D., A Practical Methodology for Implementing a Patch Management Process, SANS (2003).
Vukelich, D., Levin, D., and Lowry, J., Architecture for Cyber Command and Control: Experiences and Future Directions, IEEE (2001).
Wassom, D., Intrusion Detection Systems: An Overview of RealSecure, SANS (2002).
Welch-Abernathy, Dameon D., "Essential Check Point FireWall—An Installation, Configuration, and Troubleshooting Guide," 2000, Pearson Education, Inc.
Wickham, T., Intrusion Detection is Dead. Long Live Intrusion Prevention!, SANS (2003).
Wickham, Timothy, "Intrusion Detection is Dead. Long Live Intrusion Prevention!, SANS Institute InfoSec Reading Room," Apr. 21, 2003, SANS Institute.
Windows IT Pro, "Retina 3.0 ("Windows IT Pro Article")," Feb. 25, 2001.
Young, Casey, "Exploring IBM e-business Software, Second Edition," 2003, Maximum Press.
Swiler, L. and Phillips, C., A Graph-Based System for Network-Vulnerability Analysis, 1998 NSPW 9/98 (1998).
Symantec Corporation, "LiveUpdate Administrator's Guide," 2003.
Symantec Corporation, "LiveUpdate™ Administrator's Guide," 2002.
Symantec Corporation, "Modifications for Windows Security Center in Windows XP2," 2004.
Symantec Corporation, "Norton AntiVirus™ Corporate Edition Implementation Guide," 2001.
Symantec Corporation, "Norton AntiVirus™ Corporate Edition User's Guide," 2001.
Symantec Corporation, "Symantec AntiVirus™ Corporate Edition Administrator's Guide," 2002.
Symantec Corporation, "Symantec AntiVirus™ Corporate Edition Administrator's Guide," 2003.
Symantec Corporation, "Symantec AntiVirus™ Corporate Edition Client Guide," 2002.
Symantec Corporation, "Symantec AntiVirus™ Corporate Edition Installation Guide," 2002.
Symantec Corporation, "Symantec AntiVirus™ Corporate Edition Reference Guide," 2002.
Symantec Corporation, "Symantec AntiVirus™ Corporate Edition, Read this first," Jul. 2002.
Symantec Corporation, "Symantec AntiVirus™ Small Business Edition, Read this first," Jul. 2002.
Symantec Corporation, "Symantec Client Security Business Pack Administrator's Guide," 2004.
Symantec Corporation, "Symantec Client Security Business Pack Getting Started," 2004.
Symantec Corporation, "Symantec Client Security Business Packet Client Guide," 2004.
Symantec Corporation, "Symantec Client Security Getting Started," 2004.
Symantec Corporation, "Symantec Enterprise Firewall and Symantec Enterprise VPN Configuration Guide," 2001.
Symantec Corporation, "Symantec Enterprise Firewall, Symantec Enterprise VPN, and VelociRaptor Firewall Appliance Reference Guide," 2001.
Symantec Corporation, "Symantec Enterprise Product Catalog," 2003.
Symantec Corporation, "Symantec Gateway Security Appliance Installation and Configuration Guide," Feb. 19, 2002.
Symantec Corporation, "Symantec Security Appliances Matrix," Jan. 2004.
Symantec Corporation, "Symantec™ Advanced Managerand Symantec™ Event Manager for Security Gateways (Group 1) v2.0 1, Release notes," Oct. 12, 2005.
Symantec Corporation, "Symantec™ Advanced Manager for Security Gateways, Symantec™ Event Manager for Security Gateways Administrator's Guide, Supported version 2.0.1," Oct. 12, 2004.
Symantec Corporation, "Symantec™ Advanced Manager for Security Gateways, Symantec™ Event Manager for Security Gateways Integration Guide, Supported version 2.0.1," Jul. 16, 2004.
Symantec Corporation, "Symantec™ Central Quarantine Administrator's Guide," 2002.
Symantec Corporation, "Symantec™ Client Firewall Client Guide," 2002.
Symantec Corporation, "Symantec™ Client Firewall Client Guide," 2003.
Symantec Corporation, "Symantec™ Client Firewall Implementation Guide," 2002.
Symantec Corporation, "Symantec™ Client Firewall, Read this first," Jul. 2002.
Symantec Corporation, "Symantec™ Client Security Administrator's Guide," 2004.
Symantec Corporation, "Symantec™ Client Security Brochure," 2002.
Symantec Corporation, "Symantec™ Client Security Fact Sheet," 2003.
Symantec Corporation, "Symantec™ Gateway Security 5400 Series Administrator's Guide," Jul. 22, 2004.
Symantec Corporation, "Symantec™ Gateway Security 5400 Series Administrator's Guide," Aug. 27, 2003.
Symantec Corporation, "Symantec™ Gateway Security 5400 Series Fact Sheet," 2003.
Symantec Corporation, "Symantec™ Gateway Security 5400 Series Installation Guide," Jul. 23, 2004.
Symantec Corporation, "Symantec™ Gateway Security 5400 Series Installation Guide," Aug. 20, 2003.
Symantec Corporation, "Symantec™ Gateway Security 5400 Series Reference Guide," Aug. 27, 2003.
Symantec Corporation, "Symantec™ Gateway Security 5400 Series version 2,0 Maintenance Update," Oct. 12, 2004.
Symantec Corporation, "Symantec™ Gateway Security 5400 Series, Third-party attributions," 2004.
Symantec Corporation, "Symantec™ Gateway Security Booklet," 2002.
Symantec Corporation, "Symantec™ Gateway Security Fact Sheet," 2002.
Symantec Corporation, "Symantec™ Packager Implementation Guide," 2002.
Symantec Corporation, "Symantec™ Security Gateways Reference Guide," 2004.
Tan, S., NIDS—Should You Do Without It?, SANS (2003).
Tarman, T., Witzke, E., Bauer, K., Kellogg, B. and Young, W., Asynchronous Transfer Mode (ATM) Intrusion Detection, IEEE (2001).
Techweb, "Proactive Virus Protection—McAfee Integrates Policy Management and Reporting Into New Suite ("TechWeb Release Note")," Feb. 7, 2000.
Teo, L., Zheng, Y., and Ahn, G, Intrusion Detection Force: An Infrastructure for Internet-Scale Intrusion Detection, IEEE (2003).
Tere Parnell, Network Computing, "BindView Readies New Version of Compliance Center," Aug. 16, 2005.
The NSS Group, "Intrusion Detection Systems Group Test (Edition 2)," 2001.
Tidswell, Jason, "McAfee's Proactive Threat Protection Strategy ("Proactive Threat Protection Strategy")," Apr. 19, 2003, SANS Institute.
Tim Grieser, et al., "Tim Grieser, et al., Enhancing IT Productivity and Improving ROI with NetIQ Management Software ("Grieser")," 2003.
TippingPoint Technologies, Inc., "Improving Corporate Profitability through Advanced Security," Jan. 2003.
TippingPoint Technologies, Inc., "Product Requirements Document Adaptive Firewall," Mar. 2002.
TippingPoint Technologies, Inc., "Product Requirements Document Continuous Vulnerability Assessor (CVA)," Mar. 2002.
TippingPoint Technologies, Inc., "Product Requirements Document Security Management System (SMS) and Local Security Manager (LSM)," Feb. 2002.
TippingPoint Technologies, Inc., "Product Requirements Document Threat Management Center (TMC)," Mar. 2002.

(56) References Cited

OTHER PUBLICATIONS

TippingPoint Technologies, Inc., "Product Requirements Document Virtual Private Network," Feb. 2002.
TippingPoint Technologies, Inc., "The TPT-5000TM Optical Switch Processor Platform Datasheet," Aug. 2001.
TippingPoint Technologies, Inc., "The View from RSA—Consolidation, integration, automation ,and vulnerability assessment solutions lead the way, InfoWorld article," Mar. 11, 2002.
TippingPoint Technologies, Inc., "TippingPoint Intrusion Prevention Systems Datasheet," 2005.
TippingPoint Technologies, Inc., "TippingPoint Technologies Announces Availability of UnityOne(TM) Active Network-Defense System, PRNewswire," Sep. 30, 2002.
TippingPoint Technologies, Inc., "TippingPoint Technologies Frequently Asked Questions Sheet," 2003.
TippingPoint Technologies, Inc., "TippingPoint Technologies Introduces UnityOne (TM): Security Industry's First Unified Network-Defenses Appliances, PRNewswire," Feb. 19, 2002.
TippingPoint Technologies, Inc., "TippingPoint Technologies System Requirements Document: Unified Network Defense System (UNDS)," Feb. 6, 2002.
TippingPoint Technologies, Inc., "TippingPoint Technologies to Provide First Programmable Network Platform, Press Release," Sep. 2001.
TippingPoint Technologies, Inc., "TippingPoint Technologies, Inc. UnityOne™ Version 1.2 Security Target," Aug. 14, 2003.
TippingPoint Technologies, Inc., "TippingPoint Unity-One-1200 V1.4 Technical Evaluation," Jan. 2004.
TippingPoint Technologies, Inc., "Unified Network-Defense Appliances . . . A Solution Primer Brochure," 2002.
TippingPoint Technologies, Inc., "UnityOne Datasheet U1001 http://web.archive.org/web/20040727051233/http://www.tippingpoint.com/pdf/resources/datasheets/U1 001.pdf ("UDS")," Apr. 23, 2004.
TippingPoint Technologies, Inc., "UnityOne Network-Defense System Data Sheet," 2002.
TippingPoint Technologies, Inc., "UnityOneTM Solutions, http://web.archive.org/web/20020808144816/http://www.tippingpoint.com/solu.htm ("solu.htm")," Aug. 8, 2002.
TippingPoint Technologies, Inc., "UnityOneTM Version 1.2 Security Target ("UOST")," Aug. 14, 2003.
TippingPoint Technologies, Inc., "UnityOne™ Intrusion Prevention Appliances Data Sheet," 2003.
Tipton et al., "Information Security Management Handbook, 4th Ed.," 1999, Auerbach Publications.
Toth, T. and Kruegel, C. Evaluating the Impact of Automated Intrusion Response Mechanisms, IEEE (2002).
Travis Jones Securityprofiling, Inc., "Patch Management Competitive Analysis (SCP0018512)," Jun. 16, 2003.
Trend Micro "Damage Cleanup Services 3 Administrator's Guide," (2006).
Trend Micro Incorporated, "Control Manager Agent Development Guide," Jan. 21, 2002.
Trend Micro Incorporated, "Getting Started Guide for Trend Micro Control Manager," Dec. 2002.
Trend Micro Incorporated, "InterScan VirusWall User's Guide," Jul. 1996.
Trend Micro Incorporated, "Trend Micro Client/Server Suite Getting Started Guide," Oct. 2002.
Trend Micro Incorporated, "Trend Micro Control Manager 2.5 Best Practices Guide," Sep. 2003.
Trend Micro Incorporated, "Trend Micro InterScan® VirusWall® 3 Administrator's Guide ("VirusWall Admin Guide")," 1999.
Trend Micro Incorporated, "Trend Micro InterScan® VirusWall® 3 Quick Start Guide," Nov. 1, 1999.
Trend Micro Incorporated, "Trend Micro lnterScan3 Administrator's Guide (Trend InterScan VirusWall Ver. 3 Administrator's Guide)," Jul. 1998.
Trend Micro Incorporated, "Trend Micro OfficeScan Corporate Edition Getting Started Guide," Feb. 2003.
Trend Micro Incorporated, "Trend Micro OfficeScan3 Administrator's Guide," Dec. 1999.
Trend Micro Incorporated, "Trend Micro OfficeScan3 Client User's Guide," Dec. 1999.
Trend Micro Incorporated, "Trend Micro OfficeScan3 Getting Started Guide," Oct. 2000.
Trend Micro Incorporated, "Trend Micro(TM) Control Manager 2.5 Readme," Dec. 2002.
NetScreen Technologies, Inc., ""Adding DI Profiles,"," Dec. 9, 2004.
NetScreen Technologies, Inc., ""Adding Rules to a Firewall Rulebase,","  Dec. 9, 2004.
NetScreen Technologies, Inc., ""Application Note: Hardening Netscreen Firewalls," Team CYMRU," Jul. 18, 2002.
NetScreen Technologies, Inc., ""Configuring Antivirus Scanner Settings,"," Dec. 9, 2004.
NetScreen Technologies, Inc., ""Configuring Events Reporting,"," Dec. 9, 2004.
NetScreen Technologies, Inc., ""Configuring Signature Attack Objects,"," Dec. 9, 2004.
NetScreen Technologies, Inc., ""Configuring SNMP Reporting,"," Dec. 9, 2004.
NetScreen Technologies, Inc., ""Editing Rules to a Firewall Rulebase,","  Dec. 9, 2004.
NetScreen Technologies, Inc., ""Hacking & Counterhacking Security Engineering,"," Date Unknown.
NetScreen Technologies, Inc., "Concepts & Example Guide—NetScreen-IDP Fundamentals Version 2.1," 2003.
NetScreen Technologies, Inc., "IDP Concepts Guide, Version 2.0," 2002.
NetScreen Technologies, Inc., "Implementation Guide, Version 2.0," 2002.
NetScreen Technologies, Inc., "Juniper Networks "Juniper SPG Platforms BBL"," Aug. 10, 2004.
NetScreen Technologies, Inc., "Juniper Networks NetScreen ScreenOS Migration Guide," 2004.
NetScreen Technologies, Inc., "NetScreen "Antivirus Performance in NetScreen—5GT/GateLock 5000"," Mar. 2004.
NetScreen Technologies, Inc., "NetScreen "Configuring IDP for Standalone High Availability"," Dec. 16, 2002.
NetScreen Technologies, Inc., "NetScreen "Creating Custom Attack Objects—Juniper Networks NetScreen-IDP"," 2004.
NetScreen Technologies, Inc., "NetScreen "General Understanding of the 'Debug Flow Basic' Command in Screen OS 5.0"," Sep. 29, 2003.
NetScreen Technologies, Inc., "NetScreen "Performance of the Deep Inspection Firewall"," Nov. 2003.
NetScreen Technologies, Inc., "NetScreen "Test Cases for [IDP Sensor Routing]"," Jul. 1, 2003.
NetScreen Technologies, Inc., "NetScreen "Test Cases for IDP 3.0—Log Investigator Test"," Aug. 6, 2003.
NetScreen Technologies, Inc., "NetScreen "Test Cases for IDP 3.0—Log Viewer"," Aug. 6, 2003.
NetScreen Technologies, Inc., "NetScreen "Test Cases for IDP 3.0—Reports"," Apr. 11, 2003.
NetScreen Technologies, Inc., "NetScreen Concepts & Examples—ScreenOS Reference Guide," 2004.
NetScreen Technologies, Inc., "NetScreen High Availability QuickStart Guide IDP 100," 2002.
NetScreen Technologies, Inc., "NetScreen Product Description Document "Project Coconut: Phase II Antivirus Requirements for EDISON"," Jan. 19, 2004.
NetScreen Technologies, Inc., "NetScreen QuickStart Guide IDP 10, 100, 500 & Bypass Unit," 2003.
NetScreen Technologies, Inc., "NetScreen-500 Installer's Guide," 2001.
NetScreen Technologies, Inc., "NetScreen-5000 Installer's Guide," 2002.
NetScreen Technologies, Inc., "NetScreen-IDP 500 V3.0 Technical Evaluation," Mar. 2004.
NetScreen Technologies, Inc. / Juniper Networks, Inc., "Concepts & Example Guide—NetScreen-IDP Fundamentals Version 3.0," 2004.

(56) References Cited

OTHER PUBLICATIONS

NetScreen Technologies, Inc. / Juniper Networks, Inc., "Juniper Networks NetScreen CLI Reference Guide (2004)," 2024.
NetScreen Technologies, Inc. / Juniper Networks, Inc., "Juniper Networks® "Integration of: Firewall, Virtual Private Networking, Intrusion Detection & Prevention"," Jul. 7, 2004.
Network Associates Technology, Inc., "About McAfee Active Virus Defense—Press Room ("McAfee Press Room")," Oct. 26, 2000.
Network Associates Technology, Inc., "McAfee Desktop Firewall Version 8.0 Installation Guide Revision 1.0 ("Desktop Firewall Installation Guide")," Jun. 2003.
Network Associates Technology, Inc., "McAfee Desktop Firewall Version 8.0 Product Guide Revision 1.0 ("Desktop Firewall Product Guide")," Apr. 2003.
Network Associates Technology, Inc., "McAfee ePolicy Orchestrator 3.0 Centralized Control and Visibility of Malicious Code Protection ("ePO 3.0 Data Sheet")," 2003.
Network Associates Technology, Inc., "McAfee ThreatScan Version 2.5 Product Guide," version 1.0 ("Product Guide Version 2.5")," 2003.
Network Associates Technology, Inc., "The Enterprise Strikes Back: Defending Against Blended Threats—Proactye Strategies to Protect Networks from Today's Most Virulent Security Threat ("Defending Against Blended Threats")," Nov. 2002.
Network Associates Technology, Inc., "ThreatScan Product Release—Engine Version 2.0 ("ThreatScan Release Note")," Mar. 28, 2002.
Network Associates Technology, Inc., "ThreatScan Version 2.0 Installation Guide ("Installation Guide Version 2.0")," 2002.
Network Associates Technology, Inc., "ThreatScan Version 2.0 Product Guide ("Product Guide Version 2.07");," 2002.
Network Associates Technology, Inc., "ThreatScan Viral Vulnerability Assessment ("Viral Vulnerability Assessment")," Jun. 1, 2002.
Network Associates, "CyberCop Event Orchestrator Getting Started Guide, Version 1.02 ("CCEOGSG")," Jan. 1999.
Network Associates, "CyberCop Monitor Getting Started Guide, Version 2.0 for Windows NT 4.0 ("CCMGSG")," 1999.
Network Associates, "CyberCop Scanner Getting Started Guide, Version 5.5 ("CCSGSG")," 2000.
Network Associates, "Vulnerability Guide for CyberCop Scanner Version 2.5 for Windows NT 4.0 ("CCVG")," 1999.
Network Associates, Inc., ""VirusScan Enterprise Edition: The World's#1 Virus Security Program," http://web.archive.org/web/19990429062544/http:// www.nai.com/products/antivirus/virusscan/default. asp," 1999.
Martin, Robert A "The Vulnerabilities of Developing on the NET" Crosstalk, The Journal of Defense Software Engineering, Apr. 2001, pp. 5-10.
Martin, Robert, "The Vulnerabilities of Developing on the Net", CrossTalk Magazine, Apr. 2001.
Mason et al., "Cisco Secure Internet Security Solutions, Cisco Systems," 2001, Cisco Press.
Matsuomoto, K., Hashimoto, K., and Obana, S. Design and Implementation of Real-Time Expert System for Troubleshooting in International Telephone Networks, Gordon and Breach Publishers (1995).
McAfee Security/Network Associates Technology, Inc., "Alert Manager™, version 4.7.1, Product Guide Revision 1.0," 2004.
McAfee Security/Network Associates Technology, Inc., "VirusScan Enterprise, version 7.0, Product Guide," 2003.
McAfee Security/Network Associates Technology, Inc., "VirusScan® Enterprise, version 7.1.0, Product Guide Revision 1.0," 2003.
McAfee, Inc., "Updating with VirusScan Enterprise, version 7.0, Implementation Guide document revision 1.0," 2003.
McHugh, J., Intrusion and Intrusion Detection, CERT Coordination Center (2001).
McHugh, John "Intrusion and intrusion detection," IJIS 1:14-35, Jul. 2001.
Mell, P. and Tracy, M., Procedures for Handling Security Patches, NIST Special Publication 800-40 (2002).
Menga et al., "Secure Intrusion Detection and SAFE Implementation Study Guide (642-531 and 642-541), CCSP," 2004, Sybex.
Microsoft Corporation with Matthew Strebe, "MCSE/MCSA Self-Paced Training Kit—Implementing and Administering Security in a Windows 2000 Network: Exam 70-214," 2003, Microsoft Press.
Microsoft, "Microsoft Hotfix & Security Bulletin Service, Hotfix & Security Bulletin Service Webpage ("Microsoft Security Bulletin Search Webpage")," Feb. 3, 2004.
Microsoft, "Microsoft Security Bulletin MS03-043, Buffer Overrun in Messenger Service Could Allow Code Execution (828035) ("Microsoft Bulletin MS03-043")," Dec. 2, 2003.
Miles Tracy, Wayne Jansen, and Mark McLarnon, "Guidelines on Securing Public Web Servers," NIST Special Publication 800-44 (Sep. 2002), Recommendations of the National Institute of Standards and Technology.
Miles Tracy, Wayne Jansen, and Scott Bisker, "Guidelines on Electronic Mail Security," NIST Special Publication 800-45 (Sep. 2002), Recommendations of the National Institute of Standards and Technology.
Miller, Lawrence C., "Next Generation Firewalls for Dummies," 2011, Wiley Publishing Inc.
Millman, Rene, "bv-Control for Windows and Active Directory," 2004, BindView Development Corp.
MITRE Corporation, "CAN-2002-0059 Vulnerability webpage ("CAN-2002-0059")," Jun. 12, 2002.
MITRE Corporation, "CAN-2003-0717 Vulnerability webpage ("CAN-2003-0717")," Dec. 22, 2016.
MITRE Corporation, "Common Vulnerabilities and Exposures—About CVE webpage ("About CVE webpage")," Jun. 5, 2002.
MITRE Corporation, "CVE Vulnerability Search webpage ("CVE" or "CVE Vulnerability Search document")," Jun. 5, 2002.
Monroe, Kris, "Auditing with BindView bv-Control for Windows and enum, GSNA Practical Version 4.0—Option 1," Mar. 13, 2005, SANS Institute.
Motorola Inc., "Motorola Intrusion Vision—Display Screens Webpage ("Intrusion Vision Display")," Sep. 7, 2001.
Motorola Inc., "Motorola Intrusion Vision—Main Webpage ("Intrusion Vision Main")," Aug. 11, 2001.
Motorola Inc., "Motorola, Motorola Intrusion Vision Datasheet Webpage ("Intrusion Vision Display Datasheet")," Aug. 20, 2001.
National Institute of Standards and Technology, "ICAT Metabase Webpage ("ICAT")," Jun. 5, 2002.
National Institute of Standards and Technology, "Mell, Peter, et al., NIST Special Publication 800-40," Aug. 2002.
National Institute of Standards and Technology, "NIST ITL Bulletin ("NIST Bulletin")," Jul. 2000.
Nessus, ""Features" ("Nessus Features")," Apr. 11, 2003.
Nessus, ""Nessus F.A.Q." ("Nessus FAQ")," Apr. 2, 2003.
Nessus, ""Nessus Machine report 10.163.156" ("Nessus Machine Report")," Apr. 15, 2003.
Nessus, "Download the Stable Version of the Nessus Security Scanner for Unix-compatible Systems ("Nessus Unix Download")," Jun. 29, 2003.
Nessus, "Last Step: The Report Interpretation ("Nessus Demonstration—Last Step")," Apr. 1, 2003.
Nessus, "Second Step: The Client Configuration ("Nessus Demonstration—Second Step")," Feb. 1, 2003.
NetIQ Corporation, "Comprehensive Security Analysis Report, http://www.netiq.com/products/sa/reports/full/full_01_b.HTM," Apr. 16, 2003.
NetIQ Corporation, "http://netiq.com/products/sm/default.asp," Jun. 7, 2002.
NetIQ Corporation, "http://www.netiq.com/products/sa/default.asp?men u=solutions_security_vulnerability_c_menu.xml," Jun. 25, 2003.
NetIQ Corporation, "http://www.netiq.com/products/sm/firewall.asp," Feb. 9, 2002.
NetIQ Corporation, "NetIQ Corporation, Security Manager White Paper ("SMWP")," 2002.
NetIQ Corporation, "NetIQ Security Manager ("NSM")," 2004.
NetIQ Corporation, "NetIQ, Enterprise Security: Moving from Chaos to Control with Integrated Security Managemen from NetIQ ("ES")," 2002.

(56) References Cited

OTHER PUBLICATIONS

NetIQ Corporation, "NetIQ, Reporting and Incident Management for Firewalls ("Firewalls")," 2001.
NetIQ Corporation, "NetIQ, User Guide Vulnerability Manager ("UGVM")," 2004.
NetIQ Corporation, "NetIQ, User Guide, VigilEnt Security Manager ("UGVSM")," 2003.
NetScreen Technologies, Inc., ""About Firewall Rulebases,"," Dec. 9, 2004.
NetScreen Technologies, Inc., ""About Rulebases,"," Dec. 9, 2004.
NetScreen Technologies, Inc., ""About the Report Manager,"," Dec. 9, 2004.
Citadel Security Software Inc., "Citadel Hercules Automated Vulnerability Remediation: Users Guide ("2.0 Users Guide")," 2003.
Citadel Security Software Inc., "Citadel Hercules Automated Vulnerability Remediation: Users Guide Hercules v2.2.0 ("2.2 Users Guide")," 2004.
Citadel Security Software Inc., "Citadel Hercules Automated Vulnerability Remediation: Vulnerability Assessment and Remediation Guide Hercules v2.2.0 ("2.2 Vulnerability Assessment and Remediation Guide")," 2004.
Citadel Security Software Inc., "Citadel Hercules Network Vulnerability Remediation: Vulnerability and Remediation Guide ("2.0 Vulnerability and Remediation Guide")," 2003.
Citadel Security Software Inc., "Citadel Security Software Chosen by the Texas Hospital Association as the Recommended Security Solution for Member Hospitals," May 30, 2002.
Clark, David Leon, "Enterprise Security: The Manager's Defense Guide," 2003, Addison-Wesley.
Clercq, Jan De, "Windows Server 2003 Security Infrastructures, Elsevier Digital Press, HP Publishing Partner," 2004, HP Publishing Partners.
CNN.com, "McAfee Ships ThreatScan Software ("CNN Product Release Note")," Apr. 3, 2002.
Cobb, C., Network Security for Dummies, Wiley Publishing, Inc. (2002).
Cobb, Chey, "Network Security for Dummies," 2002, Wiley Publishing Inc.
Colville et. al, "Patch Management: Identifying the Vendor Landscape," Mar. 18, 2003, Gartner Research.
Colville, R., Wagner R., Nicolett, M., Patch Management Benefits, Challenges, and Prerequisites, Gartner (2002).
Comodo, "Endpoint Security Manager Professional Edition" v. 3.5 (Mar. 6, 2013).
Computer World, "CA Users Get an Earful on Sonars Promise," Jul. 21, 2003.
Convery, Sean, "Network Security Architectures—Expert Guidance on Designing Secure Networks," 2004, Cisco ystems, Cisco Press.
CrossTalk Magazine, "Martin, Robert A., The Vulnerabilities of Developing on the Net," Apr. 2001.
Crosstalk, "The Promise of Web-based Applications", vol. 14 No. 4, Apr. 2001.
Crothers, Tim, "Implementing Intrusion Detection Systems —A Hands-On Guide for Securing the Network," 2002, Wiley Publishing Inc.
Cuppens, F., Gombault, S., and Sans, T., Selecting Appropriate Counter-Measures in an Intrusion Detection Framework, IEEE (2004).
Dargan, P.A. "The Ideal Collaborative Environment", CrossTalk, The Journal of Defense Software Engineering, Apr. 2001, pp. 11-31.
Dasgupta, D. and Brian, H., Mobile Security Agents for Network Traffic Analysis, IEEE (2001).
Delores Etter, "Memorandum for all government software projects," Office of the Director of Defense Research and Engineering, Jan. 30, 2001, as published in Crosstalk, The Journal of Defense Software Engineering, Apr. 2001, page 4.
Demaine, R., An Overview of Computer Network Security Products & Devices, SANS (2002).
Deraison, Renaud, "Nessus Network Auditing, Jay Beale's Open Source Security Series ("Nessus Book")," 2004, Syngress Publishing Inc.
Diop, M. and Gombault, S. Real Time Intrusion Detection, RTO/NATO (2002).
EEye Digital Security on, ""Welcome to Security—Why a Vulnerability Assessment with eEye" ("Retina Webpage 1")," Feb. 2, 2002.
EEye Digital Security, ""REM Operations Guide—The Security Operator Reference Guide" ("REM Operations Guide")," Nov. 2004.
EEye Digital Security, ""Retina Network Security Scanner—Superior Vulnerability Detection & Remediation" ("Retina Webpage 6")," Jun. 11, 2002.
EEye Digital Security, ""Retina Network Security Scanner Users Manual" ("Users Manual")," 2002.
EEye Digital Security, ""Retina Network Security Scanner" ("Retina Webpage 2")," Feb. 2, 2003.
EEye Digital Security, ""Welcome to Security—Cho's Testimony from Congressional Subcommittee Hearing" ("Retina Webpage 5")," Jun. 15, 2002.
EEye Digital Security, ""Welcome to Security—eEye Digital Security Releases World's First Security Software that Thinks Like a Hacker" ("Retina Product Release")," May 25, 2000.
EEye Digital Security, ""Welcome to Security—Retina Network Scanner" ("Retina Webpage 3")," Jun. 11, 2002.
EEye Digital Security, ""Welcome to Security—The Process Retina Webpage 4")," Feb. 2, 2002.
EEye Digital Security, "eEye Digital Security Whitepaper—Retina Network Security Scanner Understanding CHAM—Common Hacking Attack Methods ("CHAM Whitepaper")," 2002.
EEye Digital Security, "Retina The Network Security Scanner ("Retina Whitepaper")," Jun. 11, 2002.
En Garde Systems, Inc., "T-Sight Overview Webpage ("T-Sight Overview Webpage")," Apr. 15, 2000.
En Garde Systems, Inc., "T-Sight Realtime—Main Window Webpage ("T-Sight")," Aug. 16, 2000.
Endorf et al., "Intrusion Detection and Prevention," 2003, McGraw-Hill.
Enterasys Networks, "Dragon 6.0 Intrusion Detection System Data Sheet (2002)," 2002.
Enterasys Networks, "Dragon 7.0 Network Sensor (2004)," 2004.
Enterasys Networks, "Dragon Enterprise Management Server (2004)," 2004.
Enterasys Networks, "Enterasys Dragon-EAL Intrusion Defense System Security Target," 2004.
Enterasys Networks, "Enterasys Dragon™ Intrusion Defense: Security and Intrusion Defense for Enterprise Networks [2004]," 2004.
Enterasys Networks, "Intrusion Detection Methodologies Demystified (2003) ("Demystified")," 2003.
"Attack Signatures Glossary," 1998.
"ITL Bulletin," US Department of Commerce, Technology Administration, National Institute of Standards and Technology, Nov. 1999.
"LANDesk Security Suite 9" (2010).
"Network Sensor Service Release 1.1 Release Notes," Jan. 2001.
Aquiring and Deploying Intrusion Detection Systems, NIST (1999).
Albanese, Jason, "Network Security Illustrated," 2003, McGraw-Hill.
Alexander, Phillip, "bv-Control for Active Directory," 2001, BindView Development Corp.
Allan, A. Intrusion Detection Systems (IDSs): Perspective, Gartner (2002).
Allen, Julia, "The CERT Guide to System and Network Security Practices," 2001, Addison Wesley.
Amir Emamiomeh, "GIAC Security Essentials Certification (GSEC) Version 1.4b Option2 Security Vulnerability Assessment Tools ("Two Security Assessment Tools")," Jun. 10, 2004.
Andress, Mandy, "Citadel focuses on vulnerability remediation ("Network World")," Nov. 8, 2004, Network World.
Ant Allan, "Internet Security Systems Enterprise Protection Platform Intrusion Detection System—Product Report ("Gartner Report")., " Aug. 27, 2003, Gartner, Inc.

(56) References Cited

OTHER PUBLICATIONS

Avast, "Avast Enterprise Administration," Jun. 18, 2012.
Axent Technologies, Inc., "NetProwler 3.0 User Manual," 1999.
Baker et al., "Snort 2.1 Intrusion Detection, Second Edition, Jay Beale's Open Source Security Series," 2004, Syngress Publishing Inc.
Baudrion, M., Fighting System Intrusions: From Detection to Prevention, SANS (2002).
Beale et al., "Snort 2.0 Intrusion Detection," 2003, Syngress Publishing Inc.
Bigdoli, H., Handbook of Information Security, vol. 3 (2006).
BigFix, Inc., "Big Fix, Inc. Launches BigFix Enterprise Suite Proactive Technology That Eliminates Security Vulnerabilities Across the Enterprise Network," Feb. 11, 2002.
BigFix, Inc., "BigFix Client Compliance API version 1.4," Oct. 28, 2004.
BigFix, Inc., "BigFix Development Environment™ (BDE) A Guide to Creating Fixlet® Sites and Messages," Mar. 7, 2003.
BigFix, Inc., "BigFix Enterprise Suite (BES)™ Console Operator's Guide," Feb. 17, 2003.
BindView Development Corporation, "BindView Products: bv-Control, The Security Solution to Manage Within and Between Organizations," 2003.
BindView Development Corporation, "BindView RMS Web Console v 8.00 User Guide," Jul. 2004.
BindView Development Corporation, "HackerShield," 2000.
BindView Development Corporation, "Managing Group Policy Objects in Active Directory," 2000.
Blacksheepnetworks.com, "BindView EMS/NOSadmin for NetWare," 2002.
Blake et al., "Making Security Policies Effective," 2002, BindView Development Corp.
Bosworth et al., "Computer Security Handbook, 4th Ed.," 2002, John Wiley & Sons, Inc.
Brackin, C., Vulnerability Management: Tools, Challenges, and Best Practices, SANS (2003).
Bragg et al., "Network Security—The Complete Reference," 2004, McGraw-Hill/Osborne.
Burns, J. et al., Automatic Management of Network Security Policy, Telcordia Technologies (2001).
CA, Inc., "eTrust Audit Getting Started 1.5," 2003.
CA, Inc., "eTrust Intrusion Detection Administrator Guide 2.0," 2001.
CA, Inc., "eTrust Intrusion Detection Getting Started 2.0," 2002.
CA, Inc., "eTrust Managing eBusiness Security," 2003.
CA, Inc., "eTrust Managing eBusiness Security," 2002.
CA, Inc., "eTrust Policy Compliance Administrator Guide 7.3," 2001.
CA, Inc., "eTrust Policy Compliance Getting Started," 2001.
CA, Inc., "eTrust Vulnerability Manager User Guide Version 1.0," 2003.
Carver, C., Hill, J., and Pooch, U, Limiting Uncertainty in Intrusion Response, IEEE (2001).
CERT Coordination Center, "Carnegie Mellon Software Engineering Institute, CERT Advisory CA-99-05 Vulnerability ("CERT Advisory CA-99-05")," Nov. 9, 1999.
CERT Coordination Center, "Carnegie Mellon Software Engineering Institute, The CERT® Coordination Center FAQ webpage ("CERT FAQ webpage")," Nov. 23, 2001.
CERT Coordination Center, "Carnegie Mellon Software Engineering Institute, Vulnerability Note VU#18287 ("VU#18287")," Nov. 23, 2001.
CERT Coordination Center, "Carnegie Mellon Software Engineering Institute, Vulnerability Note VU#368819 ("VU#368819")," Mar. 16, 2002.
CERT Coordination Center, "Carnegie Mellon Software Engineering Institute, Vulnerability Note VU#654643 (VU#654643)," Apr. 24, 2002.
CERT Coordination Center, "Carnegie Mellon Software Engineering Institute, Vulnerability Note VU#908611 ("VU#908611")," Nov. 20, 2001.
CERT Coordination Center, "Carnegie Mellon Software Engineering Institute," The CERT Coordination Center FAQ webpage Nov. 23, 2001.
Internet Security Systems, Inc., "RealSecure version 3.0 Attack Signatures Glossary," 1999.
Internet Security Systems, Inc., "RealSecure version 3.0 Getting Started," 1999.
Internet Security Systems, Inc., "RealSecure version 3.0 User's Guide," 1999.
Internet Security Systems, Inc., "RealSecure version 3.1 Attack Signatures Glossary," 1999.
Internet Security Systems, Inc., "RealSecure version 3.1 Console User Guide," 1999.
Internet Security Systems, Inc., "RealSecure version 3.1 Getting Started," 1999.
Internet Security Systems, Inc., "RealSecure version 3.1 Network Engine User Guide," 1999.
Internet Security Systems, Inc., "RealSecure version 3.1 System Agent Guide," 1999.
Internet Security Systems, Inc., "RealSecure Workgroup Manager User Guide Version 6.0," Jul. 2001.
Internet Security Systems, Inc., "RealSecure® Network Sensor 7.0, Gigabit Network Sensor 7.0, Workgroup Manager 5.6 Internal Technical FAQ," May 23, 2002.
Internet Security Systems, Inc., "RealSecure® Protection System FAQ," May 21, 2002.
Internet Security Systems, Inc., "RealSecure™ 5.x to 6.0 Upgrade Considerations," May 17, 2001.
Internet Security Systems, Inc., "RealSecure™ Server Sensor 6.0.1 Frequently Asked Questions," Aug. 2001.
Internet Security Systems, Inc., "RealSecure™ Server Sensor 6.0.1 Internal FAQ," Aug. 2001.
Internet Detection Systems: Definition, Need, and Challenges, SANS (2001).
Intrusion.com, Inc., "Building an Enterprise Security Infrastructure: Introduction to Kane Secure Enterprise ("Kane")," Mar. 2000.
IntruVert Networks, Inc., "IntruShield IDS System Getting Started Guide Version 1.1 ("GSG v1.1")," Jul. 2002.
IntruVert Networks, Inc., "IntruShield IDS System Getting Started Guide Version 1.2 ("GSG v1.2")," Oct. 2002.
IntruVert Networks, Inc., "IntruShield IDS System Manager Administrator's Guide Version 1.1 ("MAG v1.1")," Jul. 2002.
IntruVert Networks, Inc., "IntruShield IDS System Manager Administrator's Guide Version 1.2 ("MAG v1.2")," Oct. 2002.
IntruVert Networks, Inc., "IntruShield IDS System Manager Installation Guide version 1.1 ("MIG v1.1")," Jul. 2002.
IntruVert Networks, Inc., "IntruShield IDS System Sensor Installation and Configuration Guide version 1.1 ("SIG v1.1")," Jul. 2002.
IntruVert Networks, Inc., "IntruShield Product Family: The IntruShield system is a next-generation network IDS that offers real-time network intrusion detection and prevention against known, unknown, and Denial of Service attacks for enterprise networks," Jun. 5, 2002.
IntruVert Networks, Inc., "Press Releases: IntruVert Networks Announces Availability of its IntruShield Product Line," Sep. 3, 2002.
IntruVert Networks, Inc., "Technology: IntruVert is introducing the industry's first real-time network intrusion prevention system that takes Intrusion Detection Systems (IDS) to a new level," Apr. 4, 2002.
IPR2017-02191.
IPR2017-02191 (U.S. Pat. No. 8,266,699).
IPR2017-02192.
IPR2017-02192 (U.S. Pat. No. 8,984,644).
IPR2021-01242.
IPR2021-01242 (U.S. Pat. No. 9,100,431).
IPR2021-01428.
IPR2021-01428 (U.S. Pat. No. 10,609,063).
IPR2022-00035.
IPR2022-00259.
ISS Certified User Training, "RealSecure" Version 3.0, 1999.

(56) References Cited

OTHER PUBLICATIONS

Kaeo, Merike, "Designing Network Security—A Practical Guide to Creating a Secure Network Infrastructure, Cisco Systems," 2003, Cisco Press.
Kohlenberg et al., "Snort IDS and IPS Toolkit—Featuring Jay Beale's Open Source Security Series," 2007, Syngress Publishing Inc.
Komar et al., "Firewall for Dummies, Second Edition," 2003, Wiley Publishing Inc.
Komar, B., Beekelaar, R., Wettern, J., Firewall for Dummies, Wiley Publishing, Inc. (2003).
Kothari, P., Intrusion Detection Interoperability and Standardization, SANS (2002).
LeClaire, Jennifer, "Symantec Buys BindView in $209 Million Cash Deal," Oct. 4, 2005, E-Commerce Times.
Liu, C. and Richardson, D., Automated Security Checking and Patching Using TestTalk, IEEE (2000).
Lukatsky, Alex, "Protect Your Information with Intrusion Detection—IT Master," 2003, A-List, LLC.
Maiwald, Eric, "Fundamentals of Network Security, Information Series," 2004, McGraw Hill Technology Education.
Maiwald, Eric, "Network Security—A Beginner's Guide," 2001, McGraw-Hill.
Malik, Saadat, "Network Security Principles and Practices,—Expert Solutions for Security Network Infrastructures and VPNs, CCIE Professional Development," 2002, Cisco Systems, Cisco Press.
Mamdou Diop, Syvlain Gombault, "Fonction du reaction" RTO Meeting Proceedings 101, ref 13 (2002).
Mardini, M., Case Study In Firewall and Intrusion Detection Integration, SANS (2002).
Martin et al., "The Vulnerabilities of Developing on the Net," CrossTalk Magazine, Apr. 2001.
Internet Security Systems, "RealSecure OS Sensor Policy Guide," Version 5.0, 2001, 50 pages.
Internet Security Systems, "RealSecure Protection System FAQ," May 21, 2002, 13 pages.
Internet Security Systems, "RealSecure Server Sensor 6.0.1 Frequently Asked Questions," Aug. 2001, 22 pages.
Internet Security Systems, "RealSecure Server Sesnor Policy Guide," Version 6.0, 2001, 100 pages.
Internet Security Systems, "RealSecure Signatures Reference Guide, Version 6.5 ("SRG")," Dec. 2001.
Internet Security Systems, "RealSecure Signatures Reference Guide," Version 6.0, 2001, 778 pages.
Internet Security Systems, "RealSecure Signatures Reference Guide," Version 6.5, 2001, 830 pages.
Internet Security Systems, "RealSecure System Agent User Guide," Version 3.1, 1999, 30 pages.
Internet Security Systems, "RealSecure Version 6.0—Readme" Jun. 2001.
Internet Security Systems, "RealSecure Version 6.0—Readme" Jun. 21, 2001.
Internet Security Systems, "RealSecure Workgroup Manager User Guide, Version 6.5 ("RSUG")," Dec. 2001.
Internet Security Systems, "RealSecure Workgroup Manager User Guide," Version 6.0, 2001, 268 pages.
Internet Security Systems, "Release Notes," Aug. 1, 2002, 14 pages.
Internet Security Systems, "System Requirements RealSecure IDS Application," May 2001, 10 pages.
Internet Security Systems, "System Scanner Getting Started," System Scanner for Unix 1.7, 1997, 86 pages.
Internet Security Systems, "System Scanner Getting Started," System Scanner for Widnows Version 1.1, 1997, 50 pages.
Internet Security Systems, Inc., ""Frequently Asked Questions," RealSecure® 6.0," 2001.
Internet Security Systems, Inc., ""RealSecure SiteProtector Strategy Guide," version 1.2, ("Strategy Guide Version 1.2")," Sep. 2002.
Internet Security Systems, Inc., ""System Requirements," RealSecure IDS Application," May 29, 2001.
Internet Security Systems, Inc., "Internet Scanner for Windows NT v.5.4 Student Guide, ISS Certified User Training," 1999.
Internet Security Systems, Inc., "Internet Scanner Getting Started Guide version 6.1 ("Internet Scanner GSG")," Jul. 2000.
Internet Security Systems, Inc., "Internet Security Systems—Internet Scanner ("Internet Scanner")," 2000.
Internet Security Systems, Inc., "Internet Security Systems—Internet Scanner Technical Overview ("Internet Scanner Technical Overview")," Dec. 2000.
Internet Security Systems, Inc., "Internet Security Systems, Inc.'s Form 10-Q ("Q1 10-Q Form")," May 14, 2003, U.S. Securities and Exchange Commission.
Internet Security Systems, Inc., "Internet Security Systems' website at http://www.iss.net/customer_care/resource_center/o nline_doc/," Jan. 24, 2002.
Internet Security Systems, Inc., "Internet Security Systems' website at http://www.iss.net/customer_care/whats_new/index .php," Jan. 23, 2002.
Internet Security Systems, Inc., "Network Vulnerability Assessment Report ("Vulnerability Assessment Report")," Apr. 20, 2003.
Internet Security Systems, Inc., "Proventia A Series ("Proventia A Series Datasheet")," 2003.
Internet Security Systems, Inc., "Proventia A604, A1204, and A1204F Appliance User Guide ("Proventia User Guide")," Jun. 18, 2003.
Internet Security Systems, Inc., "RealSecure Agent Advanced Administration Guide, version 7.0, ("Agent Administration Guide")," Aug. 19, 2003.
Internet Security Systems, Inc., "RealSecure BlackICE™ Sentry to RealSecure® Network Sensor 7.0 Migration Guide," 2002.
Internet Security Systems, Inc., "RealSecure Installation Guide Version 6.0," May 2001.
Internet Security Systems, Inc., "RealSecure Network Sensor and Gigabit Network Sensor Installation Guide Version 7.0," May 2002.
Internet Security Systems, Inc., "RealSecure Network Sensor and Gigabit Network Sensor Policy Guide," version 7.0 ("Network Sensor Policy Guide"), Aug. 2003.
Internet Security Systems, Inc., "RealSecure Network Sensor Installation Guide," version 6.5 ("Network Sensor istallation Guide"), Jan. 2002.
Internet Security Systems, Inc., "RealSecure Network Sensor Policy Guide Version 6.0," Aug. 2001.
Internet Security Systems, Inc., "RealSecure Network Sensor Policy Guide Version 7.0," May 2002.
Internet Security Systems, Inc., "RealSecure Network Sensor Service Release Notes," Jan. 4, 2001.
Internet Security Systems, Inc., "RealSecure Network Sensor Version 6.0—Readme," Jun. 13, 2004.
Internet Security Systems, Inc., "RealSecure OS Sensor Policy Guide Version 5.0," May 2001.
Internet Security Systems, Inc., "RealSecure Release Notes," Aug. 1, 2001.
Internet Security Systems, Inc., "RealSecure Server Sensor Policy Guide Version 6.0," May 2001.
Internet Security Systems, Inc., "RealSecure Server Sensor Policy Guide," version 6.5 ("Server Sensor Policy Guide") Dec. 2001.
Internet Security Systems, Inc., "RealSecure Senior Sensor Version 6.0—Readme," Jun. 21, 2004.
Internet Security Systems, Inc., "RealSecure Signatures Reference Guide Version 6.0," May 2001.
Internet Security Systems, Inc., "RealSecure Signatures Reference Guide Version 6.5," Dec. 2001.
Internet Security Systems, Inc., "RealSecure SiteProtector Console User Reference Guide, version 2.0, ("Console User Guide")," Jan. 2003.
Internet Security Systems, Inc., "RealSecure SiteProtector Installation and Configuration Guide, version 2.0, ("SiteProtector Installation Guide" or "ICG")," Jan. 2003.
Internet Security Systems, Inc., "RealSecure SiteProtector Strategy Guide, version 2.0 ("Strategy Guide Version 2.0")," Jan. 2003.
Internet Security Systems, Inc., "RealSecure v3.0 Student Guide, ISS Certified User Training," 1999.

(56) References Cited

OTHER PUBLICATIONS

CERT Coordination Center, "CERT Vulnerability Notes Database ("CERT" or "CERT Vulnerability Search document")," Nov. 19, 2001.
Chau, Jonathan, "bv-Control for Internet Security 3.0," Aug. 13, 2001, Windows IT Pro.
Check Point Software Technologies Ltd, "Check Point RealSecure Adminstration" Version 2.5, Sep. 1998, 90 pages.
Check Point Software Technologies Ltd, "Check Point RealSecure Adminstration" Version 3.0, Apr. 1999, 128 pages.
Check Point Software Technologies Ltd, "Check Point RealSecure Attack Signatures Glossary" Version 3.2, Sep. 1999, 177 pages.
Check Point Software Technologies Ltd, "Check Point RealSecure Attack Signatures Glossary" Version 4.1, Jan. 2000, 162 pages.
Check Point Software Technologies Ltd, "Check Point RealSecure Console Guide" Version 3.1, Jul. 1999.
Check Point Software Technologies Ltd, "Check Point RealSecure Console Guide" Version 3.2, Sep. 1999, 96 pages.
Check Point Software Technologies Ltd, "Check Point RealSecure Console Guide" Version 4.1, Jan. 2000, 99 pages.
Check Point Software Technologies Ltd, "Check Point RealSecure Manager User Guide" Version 4.1, Sep. 1999, 24 pages.
Check Point Software Technologies Ltd, "Check Point RealSecure Network Engine User Guide" Version 3.1, Jul. 1999, 30 pages.
Check Point Software Technologies Ltd, "Check Point RealSecure Network Engine User Guide" Version 3.2, Sep. 1999, 30 pages.
Check Point Software Technologies Ltd, "Check Point RealSecure Network Engine User Guide" Version 4.1, Jan. 2000, 30 pages.
Check Point Software Technologies Ltd, "Check Point RealSecure Release Notes" Version 4.1, Mar. 2000, 15 pages.
Check Point Software Technologies Ltd, "Check Point RealSecure System Agent User Guide" Version 3.1, Jul. 1999, 34 pages.
Check Point Software Technologies Ltd, "Check Point RealSecure Verseion 2.5 Release Notes", Nov. 1998, 4 pages.
Check Point Software Technologies Ltd, "Getting Started with Check Point RealSecure" Version 2.5, Apr. 1998, 50 pages.
Check Point Software Technologies Ltd, "Getting Started with Check Point RealSecure" Version 3.0, Feb. 1999, 54 pages.
Check Point Software Technologies Ltd, "Getting Started with Check Point RealSecure" Version 3.1, Jul. 1999, 54 pages.
Check Point Software Technologies Ltd, "Getting Started with Check Point RealSecure" Version 3.2, Sep. 1999, 52 pages.
Check Point Software Technologies Ltd, "Getting Started with Check Point RealSecure" Version 4.1, Jan. 2000, 50 pages.
Check Point Software Technologies Ltd., "Check Point RealSecure Version 2.5 Release Notes, P/N 77400000100," Nov. 1998.
Check Point Software Technologies Ltd., "Check Point RealSecure Version 2.5 Release Notes," Nov. 1998.
Check Point Software Technologies Ltd., "Check Point RealSecure™ Administration, Version 2.5," Sep. 1998.
Check Point Software Technologies Ltd., "Check Point RealSecure™ Administration, Version 3.0," Apr. 1999.
Check Point Software Technologies Ltd., "Check Point™ RealSecure™ Attack Signatures Glossary, Version 3.1," Sep. 1999.
Check Point Software Technologies Ltd., "Check Point™ RealSecure™ Attack Signatures Glossary, Version 3.2," Sep. 1999.
Check Point Software Technologies Ltd., "Check Point™ RealSecure™ Attack Signatures Glossary, Version 4.1," Jan. 2000.
Check Point Software Technologies Ltd., "Check Point™ RealSecure™ Console Guide, Version 3.1," Sep. 1999.
Check Point Software Technologies Ltd., "Check Point™ RealSecure™ Console Guide, Version 3.2," Sep. 1999.
Check Point Software Technologies Ltd., "Check Point™ RealSecure™ Console Guide, Version 4.1," Jan. 2000.
Check Point Software Technologies Ltd., "Check Point™ RealSecure™ Manager User Guide, Version 4.1," Sep. 1999.
Check Point Software Technologies Ltd., "Check Point™ RealSecure™ Network Engine User Guide, Version 3.1," Jul. 1999.
Check Point Software Technologies Ltd., "Check Point™ RealSecure™ Network Engine User Guide, Version 3.2," Sep. 1999.
Check Point Software Technologies Ltd., "Check Point™ RealSecure™ Network Engine User Guide, Version 4.1," Jan. 2000.
Check Point Software Technologies Ltd., "Check Point™ RealSecure™ Release Notes, Version 4.1," Mar. 2000.
Check Point Software Technologies Ltd., "Check Point™ RealSecure™ System Agent User Guide, Version 3.1," Jul. 1999.
Check Point Software Technologies Ltd., "Getting Started with Check Point RealSecure™, Version 2.5," Aug. 1998.
Check Point Software Technologies Ltd., "Getting Started with Check Point RealSecure™, Version 3.0," Feb. 1999.
Check Point Software Technologies Ltd., "Getting Started with Check Point™ RealSecure™, Version 3.1," 1999.
Check Point Software Technologies Ltd., "Getting Started with Check Point™ RealSecure™, Version 3.2," Sep. 1999.
Check Point Software Technologies Ltd., "Getting Started with Check Point™ RealSecure™, Version 4.1," Jan. 2000.
Check Point, "Endpoint Policy Management," archived Jul. 14, 2011.
Chip Andrews, "Block, Then Tackle," May 1, 2000, Redmondmag. com.
Chirillo, John, "Hack Attacks Testing: How to Conduct Your Security Audit," 2003, Wiley Publishing Inc.
Cisco Systems, Inc., "Cisco IDS Sensor Software Version 4.0 Product Requirements Document ("IDS-PRD"), (Cisco_IntelMcAfeeSub00000011) Designated Outside Counsel Eyes Only," 2002.
Cisco Systems, Inc., "Exodus EMODE Intrusion Detection Configuration Guide ("Exodus"), (Cisco_IntelMcAfeeSub00000004) Designated Outside Counsel Eyes Only," 2001.
Cisco Systems, Inc., "NetRanger User's Guide Version 2.1.1 ("NetRanger UG").," 1998.
Citadel Security Software Inc., "Citadel Announces Release of Hercules™ at RSA 2002™," Feb. 19, 2002.
Citadel Security Software Inc., "Citadel Hercules Automated Vulnerability Remediation: Installation Guide Hercules V2.2.0 ("2.2 Installation Guide")," 2003-2004.
Network Associates, Inc., "Gauntlet Administrator's Guide version 5.5," 1999.
Network Computing, "Dragon Claws its Way to the Top, Network Computing," Aug. 20, 2001.
Network Computing, "Michael J. DeMaria, A Rookie's Guide To Defensive Blocks, Network Computing (2002) ("DeMaria")," 2002.
Network World, "Scanning for Weak Links in Server Security," Aug. 30, 1999.
Networks Associates Technology, Inc., "ePoficy Orchestrator Administrator's Guide version 1.0 ("ePO 1.0 Guide")," ar 2000.
Networks Associates Technology, Inc., "ePolicy Orchestrator version 3.0 Product Guide, Revision 1.0 ("ePO 3.0 Guide")," Apr. 2003.
New Briefs, Journal of Research of the National Institute of Standards and Technology, vol. 108, No. 1, Jan.-Feb. 2003, pp. 87-102.
Newman, Robert, "Enterprise Security," 2002, Prentice Hall.
News Brief, Journal of Research of the National Institute of Standards and Technology, vol. 108, No. 1, Jan.-Feb. 2003.
NFR Security, Inc., ""NFR BackOofticer Friendly," https://web.archive.org/web/20020611083143/http://www.nfr.com/products/bof/index.html," Jun. 11, 2002.
NFR Security, Inc., ""NFR Features and Benefits," https://web.archive.org/web/20021206001404/http:/www.nfr.com/popups/nidfeatures. html," Dec. 6, 2002.
NFR Security, Inc., ""NFR Host Intrusion Detection," https://web.archive.org/web/20020602230641/http://www.nfr.com/products/HID/index.html," Jun. 2, 2002.
NFR Security, Inc., ""NFR Intrusion Management System," https://web.archive.org/web/20020602144053/http://www.nfr.com/products/," Jun. 2, 2002.
NFR Security, Inc., ""NFR Network Intrusion Detection," https://web.archive.org/web/20021204192703/http://www.nfr.com/products/NID/," Dec. 4, 2002.
NFR Security, Inc., ""NFR Rapid Response Team," https://web.archive.org/web/20020202174656/http://www.nfr.com/rrt/," Feb. 2, 2002.

(56) References Cited

OTHER PUBLICATIONS

NFR Security, Inc., "Network Intrusion Detection v3 (NID) Data Sheet," 2003.
NFR Security, Inc., "Network Intrusion Detection v3 (NID) Product Overview," 2003.
NFR Security, Inc., "NFR Network Intrusion Detection Data Sheet," Dec. 2002.
NFR Security, Inc., "NFR Network Intrusion Detection Product Overview," Dec. 2002.
Nicastro et al., "Curing the Patch Management Headache," 2005, Auerbach Publications.
Nicolett, M. and Colville, R., Robust Patch Management Requires Specific Capabilities, Gartner (2003).
Nicolett, M., Vendors in the Gartner IT Security Management Magic Quadrant for 1H03 Are Driven by the Need for Real-Time Security Data Analysis and Faster Reactions to Security Incidents, Gartner (2003).
NIST Special Publication 800-40 (2002).
Notice of Allowance from U.S. Appl. No. 14/816,960 dated Oct. 4, 2017.
Notice of Allowance from U.S. Appl. No. 14/834,102 dated Apr. 14, 2017.
Notice of Allowance from U.S. Appl. No. 14/834,102 dated Oct. 11, 2017.
Novak, Kevin, "VA Scanners, Pinpoint Your Weak Spots," Jun. 26, 2003, Network Computing.
Office Action for USPAN17515398 dated Jan. 19, 2022.
OneSecure / NetScreen Technologies, Inc., "OneSecure Product Webpages," 2002.
PC Magazine, ""PC Retina Security Scanner" ("PC Magazine")," Dec. 30, 2003.
PC Magazine, "Finding and Fixing Network Vulnerabilities Review & Rating," ("PC Mag"), Jun. 30, 2002.
Peltier et al., "Managing a Network Vulnerability Assessment," 2003, Auerbach Publications.
Pescatore, J., Easley, M. and Stiennon, R., Network Security Platforms Will Transform Security Markets, Gartner (2002).
Peter Mell and Miles C. Tracy, "Procedures for Handling Security Patches," NIST Special Publication 800-40 (Aug. 2002), Recommendations of the National Institute of Standards and Technology.
PR Newswire, "Internet Security Systems Ships RealSecure for Windows 2000," Jan. 16, 2001.
PR Newswire, "IntruVert Networks Introduces IntruShield (TM)—Next-Generation Intrusion Detection and Prevention System," May 6, 2002.
Press Release "LURHQ Adds Support for SourceFire Intelligent Security Monitoring to Enhance Threat Management of Client Networks," Apr. 19, 2004 (SourceFire.com).
Press Release "SourceFire and NetSec Partner to Deliver Industry Leading Security Monitoring Solutions," Nov. 17, 2003.
Pub. No. 800-51, Use of the Common Vulnerabilities and Exposures (CVE) Vulnerability Naming Scheme, NIST (2002).
Pub. No. 800-30, Risk Management Guide for Information Technology Systems, NIST (2002).
Pub. No. 800-31, Intrusion Detection Systems, NIST (2001).
Pub. No. 800-41, Guidelines on Firewalls and Firewall Policy, NIST (2002).
Pub. No. 800-42, Guideline on Network Security Testing, NIST (2003).
Pub. No. 800-61, Computer Security Incident Handling Guide, NIST (2004).
Pub. No. 800-64, Security Considerations in the Information System Development Life Cycle, NIST (2003).
RealSecure "Console User Guide," Version 3.1, 1999, 88 pages.
RealSecure, "User's Guide," Version 3.0, 1997, 188 pages.
Rehman, Rafeeq, "Intrusion Detection with SNORT : Advanced IDS Techniques Using SNORT, Apache, MySQL, PHP, and Acid ("IDS with Snort")," 2003, Prentice Hall PTR.
Robbins, R., Distributed Intrusion Detection Systems: An Introduction and Review, SANS (2002).
Rohse, M., Vulnerability Naming Schemes and Description Languages: CVE, Bugtraq, AVDL, and VulnXML, SANS (2003).
Russell, Ryan, "Hack Proofing Your Network Internet Tradecraft," 2000, Syngress Media.
SANS Institute, "SANS Institute, Global Information Assurance Certification Paper," 2002.
SC Media, "BindView Adds Patching to its Products," Jan. 6, 2004.
Schnackenberg, D., Djahandri, K., and Sterne, D., Infrastructure for Intrusion Detection and Response, IEEE (2000).
Schnackenberg, D., Holliday, H., Smith, R., Cooperative Intrusion Traceback and Response Architecture (CITRA), IEEE (2001).
Scott et al., "Snort for Dummies," 2004, Wiley Publishing Inc.
Scott Hull, "Implementing a Patch Management Process" May 31, 2003, GIAC Security Essentials Certification Practical Assignment.
Security Focus, "http://www.securityfocus.com/bid/3919/info ("bugtraq_3919_info")," Jan. 21, 2002.
Security Focus, "http://www.securityfocus.com/bid/3919/solution ("bugtraq_3919_solution")," Jan. 21, 2002.
Security Focus, "http://www.securityfocus.com/vdb/top.html?type=c ve, captured by Archive.org on Apr. 17, 2001, available at http://web.archive.org/web/20010417063351fw_/ht tp://www.securityfocus.com/vdb/top.html?type=cve ("cve query")," Apr. 17, 2001.
Security Focus, "http://www.securityfocus.com/vdb/top.html?type=i d, captured by Archive.org on Apr. 18, 2001, available at http://web.archive.org/web/20010418081800fw_/ht tp://www.securityfocus.com/vdb/top.html?type=id ("bugtraq query")," Apr. 18, 2001.
Security Focus, "Nessus, Part 3: Analysing Reports ("Nessus Analysing Report")," Feb. 3, 2004.
Security Focus, "Vulnerability Database Datasheet," 2001.
SecurityProfiling, Inc., ""New SecurityProfiling Anti-Vulnerability Technology Thwarts Hackers," Business Wire [SCP0069820-69821]," Apr. 3, 2002.
SecurityProfiling, Inc., ""Products," https://web.archive.org/web/20020608001441/http://www.securityprofiling.com/logboss.htm[10/18/2016 5:38:35 PM]," Jun. 8, 2002.
SecurityProfiling, Inc., ""SecurityProfiling Introduces New Network Software," https://web.archive.org/web/20020608162907/http://www.securityprofiling.com/press2-28-02.htm[Oct. 19, 2016 3:40:24 AM]," Jun. 8, 2002.
SecurityProfiling, Inc., ""Services," https://web.archive.org/web/20020322000503/http://www.securityprofiling.com/services.htm[Oct. 18, 2016 11:07:31 PM]," Mar. 22, 2002.
SecurityProfiling, Inc., ""Web Educational Piece—Anti-Vulnerability™ Technology" [SCP0069611-69613]," 2002.
SecurityProfiling, Inc., ""What is Anti-Vulnerability™ Technology?" [SCP0069689-69691]," 2002.
SecurityProfiling, Inc., "LogBoss Brochure [SCP0069880-69881]," 2002.
SecurityProfiling, Inc., "LogBoss White Paper, Version 1.2 [SCP0017841-17861]," 2002.
SecurityProfiling, Inc., "SecurityProfiling, Inc. SysUpdate Core Database Schema [SCP0052913-52915]," May 15, 2002.
SecurityProfiling, Inc., "SysUpdate Brochure [SCP0069878-69879]," 2002.
SecurityProfiling, Inc., "SysUpdate® Enterprise Edition White Paper, Version 2.5," 2002.
Sequeira, D., Intrusion Prevention Systems—Security's Silver Bullet?, SANS (2002).
Shim et al., "The International Handbook of Computer Security," 2000, Fitzroy Dearborn Publishers; Glenlake Publishing Company Ltd.
Shimonski et al., "Best Damn Firewall Book Period—Everything You Need to Know About Configuring Firewalls and Implementing State-of-the-Art Intrusion Detection Systems," 2003, Syngress Publishing Inc.
Simmonis et al., "Check Point NG, Next Generation Security Administration," 2002, Syngress Publishing Inc.
SonicWALL, Inc., ""Access Security: SonicWALL Internet Security Applications," https://webarchive.org/web/20020602120509/http:// www.sonicwall.com/products/access.asp," Jun. 2, 2002.

(56) References Cited

OTHER PUBLICATIONS

SonicWALL, Inc., ""Product Matrix," https://webarchive.org/web/20020606055856/www. sonicwall.com/products/FAQ/new)faq_matrix.html," Jun. 6 2002.
SonicWALL, Inc., ""SonicWALL GMS Standard Edition," https://web.archive.org/web/20021006074913/http://www.sonicwall.com/products/sgms/index.html," Oct. 6, 2002.
SonicWALL, Inc., ""SonicWALL Internet Security Solutions," https://webarchive.org/web/20020607184404/http:// www.sonicwall.com/products/index.asp," Jun. 7, 2003.
SonicWALL, Inc., ""SonicWALL Security Applications," https://web.archive.org/web/20020607183609/http://www.sonicwall.com/products/securityApps.asp," Jun. 7, 2002.
SonicWALL, Inc., "SonicWALL Global Management System Configuration Guide, Entry Edition, Version 2.1," 2001.
SonicWALL, Inc., "SonicWALL Global Management System Installation Guide, Entry Edition, Version 2.1," 2001.
SonicWALL, Inc., "SonicWALL Global Management System Introduction Guide, Entry Edition, Version 2.1," 2001.
SonicWALL, Inc., "SonicWALL Global Management System Viewpoint Guide, Version 2.1," 2001.
SonicWALL, Inc., "SonicWALL Viewpoint User's Guide," 2001.
SonicWALL, Inc., "Snort User's Manual—Snort Release: 2.0.0 ("Snort Users Manual")," 2003.
SourceForge.net, "Clam AntiVirus" v0.15 (released Jun. 2002) and v0.60 (released Jun. 2003).
Stauder, Tracy, "The Two Sides of the Web We Weave," Crosstalk, Apr. 2001.
Stiennon, R. and Easley, M., Intrusion Prevention Will Replace Intrusion Detection, Gartner (2002).
Stiennon, R., CIO Update: The Gartner Firewall Magic Quadrant for 2H02, Gartner (2002).
Sud et al., "SECUR Exam Cram 2—Exam 642-501—The Smartest Way to Get Certified, Cisco Certified Security Professional," 2003, Que.
Swiler, L. & Phillips, C., A Graph-Based System for Network-Vulnerability Analysis, 1998 NSPW 9/98 (1998).
Entercept Security Technologies, "Entercept User Guide ("Entercept User Guide")," May 2, 2003.
Enterprise Networking Planet, "In Brief: McAfee ThreatScan Targets Network 'Soft Spots' ("April Release Note")," Apr. 1, 2002.
Eset "ESET Endpoint Security," archived Aug. 27, 2013.
Eweek, "CA Maps Traffic to Processes," Jul. 21, 2003.
Fellinge, Jeff, "Vulnerability Scanners," Sep. 27, 2004, Windows IT Pro.
Fortinet, Inc., ""FortiGate 3000—Real-time Protection for Large Enterprise and Service Providers"," 2004.
Fortinet, Inc., ""FortiGate 400/500—Real-time Network Protection for Enterprises"," 2004.
Fortinet, Inc., ""FortiGate-300 V2.16" User Manual," 2002.
Fortinet, Inc., ""Fortinet Remote VPN Client V1.4" User Manual," Dec. 2, 2002.
Fortinet, Inc.,""The FortiGate™—2000 Network Protection Gateway—The Next Generation Architecture for Gigabit Content Processing" White Paper," Aug. 2002.
Fortinet, Inc., "Break the Barrier to Complete Network Protection, Fortinet Brochure," 2002.
Fortinet, Inc., "Content Protection Guide Version 2.50 MR2," Aug. 8, 2003.
Fortinet, Inc., "Content Protection Guide Version 2.50," Jun. 23, 2003.
Fortinet, Inc., "FIPS 140-2 Security Policy—FortiGate-3000/3600", Jul. 14, 2004.
Fortinet, Inc., "FortiGate 2000 Datasheet," 2002.
Fortinet, Inc., "FortiGate 300 Datasheet," 2002.
Fortinet, Inc., "FortiGate 3600 Datasheet," 2003.
Fortinet, Inc., "FortiGate 50A Installation and Configuration Guide Version 2.50," Feb. 29, 2004.
Fortinet, Inc., "FortiGate Antivirus Firewall IPS User Guide Version 3," Apr. 11, 2005.
Fortinet, Inc., "FortiGate CLI Reference Guide Version 2.80 MR10," Jun. 17, 2005.
Fortinet, Inc., "FortiGate NIDS Guide Version 2.50 MR2," Aug. 8, 2003.
Fortinet, Inc., "FortiGate SNMP Technical Bulletin," Nov. 21, 2003.
Fortinet, Inc., "FortiGate V2.27 CLI Reference Guide," Jul. 25, 2002.
Fortinet, Inc., "FortiGate-100 Datasheet," Mar. 11, 2002.
Fortinet, Inc., "FortiGate-100 V2.16 User Manual," Feb. 15, 2002.
Fortinet, Inc., "FortiGate-100 V2.2 User Manual," Apr. 18, 2002.
Fortinet, Inc., "FortiGate-100 V2.27 User Manual," Jul. 31, 2002.
Fortinet, Inc., "FortiGate-100 V2.30 User Manual," Oct. 27, 2002.
Fortinet, Inc., "FortiGate-1000A Administration Guide Version 2.80 MR11," Nov. 15, 2005.
Fortinet, Inc., "FortiGate-1000A/FA2 Administration Guide Version 2.80 MR11," Nov. 15, 2005.
Fortinet, Inc., "FortiGate-200 Datasheet," Mar. 11, 2002.
Fortinet, Inc., "FortiGate-200 V2.2 User Manual," Apr. 19, 2002.
Fortinet, Inc., "FortiGate-200 V2.27 User Manual," Jul. 31, 2002.
Fortinet, Inc., "FortiGate-200 V2.30 User Manual," Oct. 27, 2002.
Fortinet, Inc., "FortiGate-2000—for Telco and Service Providers Datasheet," Mar. 11, 2002.
Fortinet, Inc., "FortiGate-2000 V2.2 User Manual," Apr. 24, 2002.
Fortinet, Inc., "FortiGate-2000 V2.27 User Manual," Jul. 31, 2002.
Fortinet, Inc., "FortiGate-2000 V2.30 User Manual," Oct. 30, 2002.
Fortinet, Inc., "FortiGate-2000C V2.30 User Manual," Oct. 30, 2002.
Fortinet, Inc., "FortiGate-300 Datasheet," Mar. 11, 2002.
Fortinet, Inc., "FortiGate-300 V2.16 User Manual," Feb. 11, 2002.
Fortinet, Inc., "FortiGate-300 V2.2 User Manual," Apr. 12, 2002.
Fortinet, Inc., "FortiGate-300 V2.27 User Manual," Jul. 31, 2002.
Fortinet, Inc., "FortiGate-300 V2.30 User Manual," Oct. 27, 2002.
Fortinet, Inc., "FortiGate-400 Datasheet," Mar. 11, 2002.
Fortinet, Inc., "FortiGate-400 V2.27 User Manual," Jul. 31, 2002.
Fortinet, Inc., "FortiGate-400 V2.30 User Manual," Oct. 27, 2002.
Fortinet, Inc., "FortiGate-50 Datasheet," Mar. 11, 2002.
Fortinet, Inc., "FortiGate-50 V2.2 User Manual," Apr. 22, 2002.
Fortinet, Inc., "FortiGate-50 V2.27 User Manual," Jul. 31, 2002.
Office Action for U.S. Appl. No. 17/515,398 dated Feb. 18, 2022.

\* cited by examiner

REAL-TIME VULNERABILITY MONITORING

CROSS-REFERENCE TO RELATED APPLICATIONS

This application is a continuation of, and claims priority to U.S. patent application Ser. No. 17/098,281 filed Nov. 13, 2020, titled "REAL-TIME VULNERABILITY MONITORING", which in turn is a continuation of, and claims priority U.S. patent application Ser. No. 16/740,961 filed Jan. 13, 2020, titled "REAL-TIME VULNERABILITY MONITORING", which in turn is a continuation of, and claims priority to U.S. patent application Ser. No. 15/608,983 filed May 30, 2017, titled "REAL-TIME VULNERABILITY MONITORING", which in turn is a continuation of, and claims priority to U.S. patent application Ser. No. 14/834,102 filed Aug. 24, 2015, issued as U.S. Ser. No. 10/154,055, titled "REAL-TIME VULNERABILITY MONITORING", which in turn is a continuation of U.S. patent application Ser. No. 14/138,014 filed Dec. 21, 2013, issued as U.S. Pat. No. 9,117,069, which, in turn, is a continuation of U.S. patent application Ser. No. 10/882,852, filed Jul. 1, 2004 which, in turn, claims the benefit of U.S. Provisional Application No. 60/484,085, titled SECURITY MANAGEMENT PROXY SYSTEM AND METHODS and filed Jul. 1, 2003. The foregoing applications and/or patents are herein incorporated by reference in their entirety for all purposes. This application is also related to issued U.S. Pat. No. 8,266,699, titled MULTIPLE-PATH REMEDIATION, as well as applications titled POLICY PROTECTION PROXY (U.S. patent application Ser. No. 10/882,853), VULNERABILITY AND REMEDIATION DATABASE (U.S. patent application Ser. No. 10/882,788), AUTOMATED STAGED PATCH AND POLICY MANAGEMENT (U.S. patent application Ser. No. 10/884,329), and CLIENT CAPTURE OF VULNERABILITY DATA (U.S. patent application Ser. No. 10/883,376), all filed on Jul. 1, 2004. All of these applications are hereby incorporated herein by reference as if fully set forth.

FIELD OF THE INVENTION

The present invention relates to computer systems, and more particularly to management of security of computing and network devices that are connected to other such devices.

BACKGROUND

With the growing popularity of the Internet and the increasing reliance by individuals and businesses on networked computers, network security management has become a critical function for many people. Furthermore, with computing systems themselves becoming more complex, security vulnerabilities in a product are often discovered long after the product is released into general distribution. Improved methods are needed, therefore, for managing updates and patches to software systems, and for managing configurations of those systems.

The security management problem is still more complex, though. Often techniques intended to remediate vulnerabilities (such as configuration changes, changes to policy settings, or application of patches) add additional problems. Sometimes patches to an operating system or application interfere with operation of other applications, and can inadvertently disable mission-critical services and applications of an enterprise. At other times, remediation steps open other vulnerabilities in software. There is, therefore, a need for improved security management techniques.

SUMMARY

An apparatus is provided including at least one platform; an intrusion prevention system configured to communicative couple with the at least one platform; a firewall configured to communicative couple with the at least one platform; at least one first data storage configured to communicative couple with the at least one platform; and at least one second data storage configured to communicative couple with the at least one platform. The at least one platform is configured to receive a result of at least one operation in connection with at least one of a plurality of networked devices, the at least one operation based on first information from the at least one first data storage identifying a plurality of potential vulnerabilities including at least one first potential vulnerability and at least one second potential vulnerability. The at least one operation is configured for: identifying at least one configuration associated with the at least one networked device, and determining that the at least one networked device is actually vulnerable to at least one actual vulnerability, based on the identified at least one configuration and the first information from the at least one first data storage identifying the plurality of potential vulnerabilities, such that second information associated with the result is stored in the at least one second data storage separate from the at least one first data storage, the second information relating to the at least one actual vulnerability to which the at least one networked device is actually vulnerable. The at least one platform is further configured to cause display, via at least one user interface, a plurality of techniques including a first technique for utilizing the intrusion prevention system for occurrence mitigation, a second technique for utilizing the firewall for occurrence mitigation. Further, the at least one platform is further configured to allow receipt of: user input causing selection of the first technique for utilizing the intrusion prevention system for occurrence mitigation, and user input causing selection of the second technique for utilizing the firewall for occurrence mitigation. Still yet, the at least one platform is further configured to, based on the user input causing selection of the first technique for utilizing the intrusion prevention system for occurrence mitigation, automatically apply the first technique for utilizing the intrusion prevention system for occurrence mitigation; and based on the user input causing selection of the second technique for utilizing the firewall for occurrence mitigation, automatically apply the second technique for utilizing the firewall for occurrence mitigation. Even still, the at least one platform is further configured to cause identification of: in connection with the at least one networked device, a first occurrence including at least one first occurrence packet directed to the at least one networked device, and in connection with the at least one networked device, a second occurrence including at least one second occurrence packet directed to the at least one networked device. Even still yet, the at least one platform is further configured to determine: that the first occurrence including the at least one first occurrence packet directed to the at least one networked device is capable of taking advantage of the at least one of the actual vulnerability to which the at least one networked device is actually vulnerable; and that the second occurrence including the at least one second occurrence packet directed to the at least one networked device is not capable of taking advantage of the at least one of the actual vulnerability to which the at least one networked device is actually vulnerable. Further, the at least one platform is configured to cause a reporting of at least the first occurrence based on the determination that the first occurrence including the at least one first occurrence packet directed to the at least one networked device is capable of taking advantage of the at least one of the actual vulnerability to which the at least one networked device is actually vulnerable.

DESCRIPTION

Figure 1:
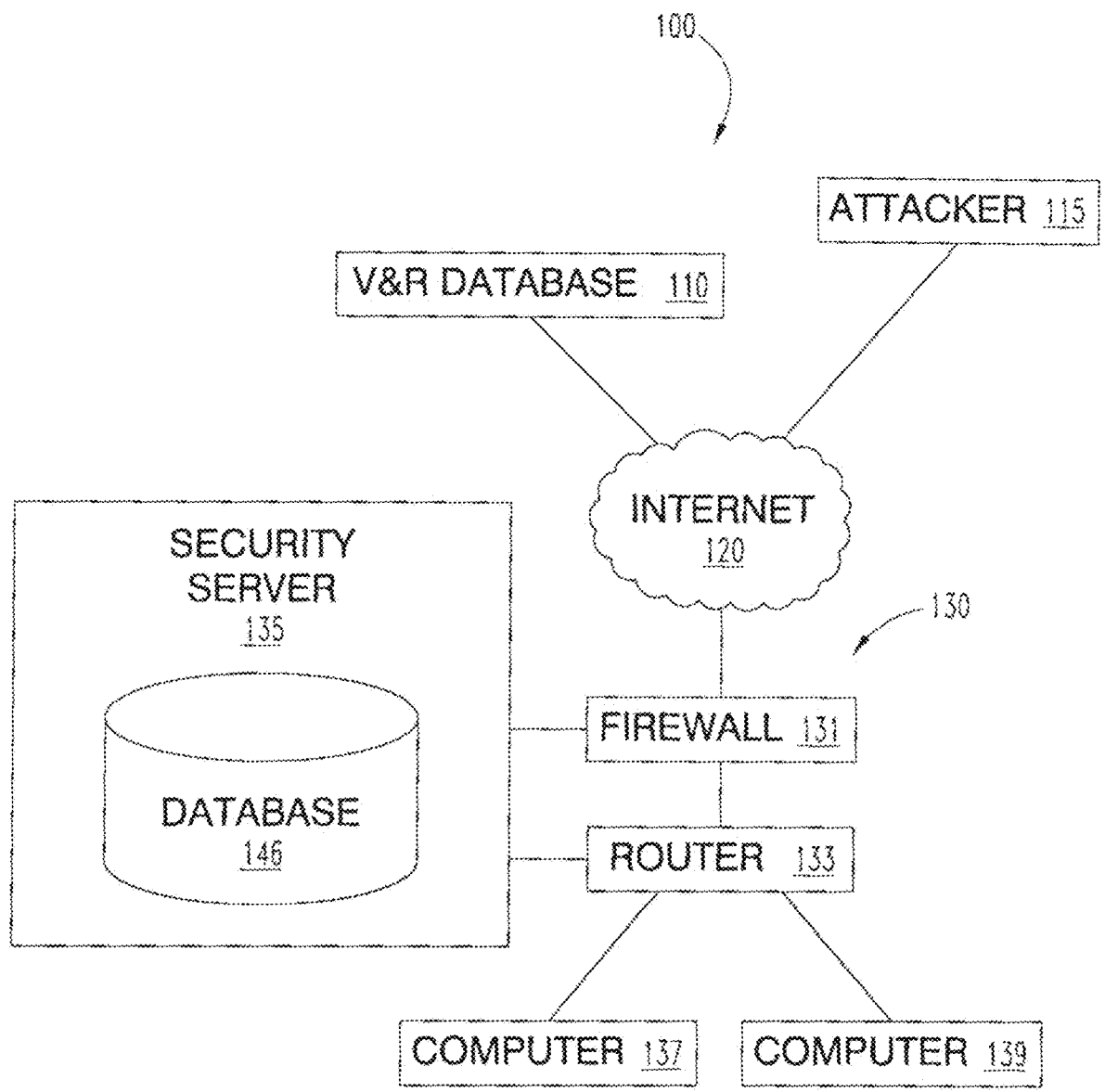
FIG. 1 is a block diagram of a networked system of computers in one embodiment of the present invention.

For the purpose of promoting an understanding of the principles of the present invention, reference will now be made to the embodiment illustrated in the drawings and specific language will be used to describe the same. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

Generally, the present invention in one embodiment operates in the context of a network as shown in FIG. 1. System 100 includes a vulnerability and remediation database 110 connected by Internet 120 to subnet 130. In this exemplary embodiment, firewall 131 serves as the gateway between Internet 120 and the rest of subnet 130. Router 133 directs connections between computers 137 and each other and other devices on Internet 120. Server 135 collects certain information and provides certain data services that will be discussed in further detail herein.

In particular, security server 135 includes processor 142, and memory 144 encoded with programming instructions executable by processor 142 to perform several important security-related functions. For example, security server 135 collects data from devices 131, 133, 137, and 139, including the software installed on those devices, their configuration and policy settings, and patches that have been installed. Security server 135 also obtains from vulnerability and remediation database 110 a regularly updated list of security vulnerabilities in software for a wide variety of operating systems, and even in the operating systems themselves. Security server 135 also downloads a regularly updated list of remediation techniques that can be applied to protect a device from damage due to those vulnerabilities. In one embodiment, each vulnerability in remediation database 110 is identified by a vulnerability identifier, and the vulnerability identifier can be used to retrieve remediation information from database 110 (and from database 146, discussed below in relation to FIG. 2).

In one embodiment, computers 137 and 139 each comprise a processor 152, 162, memory 154, 164, and storage 156, 166. Computer 137 executes a client-side program (stored in storage 156, loaded into memory 154, and executed by processor 152) that maintains an up-to-date collection of information regarding the operating system, service pack (if applicable), software, and patches installed on computer 137, and the policies and configuration data (including configuration files, and elements that may be contained in files, such as *.ini and *.conf files and registry information, for example), and communicates that information on a substantially real-time basis to security server 135. In an alternative embodiment, the collection of information is not retained on computer 137, but is only communicated once to security server 135, then is updated in real time as changes to that collection occur.

Computer 139 stores, loads, and executes a similar software program that communicates configuration information pertaining to computer 139 to security server 135, also substantially in real time. Changes to the configuration registry in computer 139 are monitored, and selected changes are communicated to security server 135 so that relevant information is always available. Security server 135 may connect directly to and request software installation status and configuration information from firewall 131 and router 133, for embodiments wherein firewall 131 and router 133 do not have a software program executing on them to communicate this information directly.

This collection of information is made available at security server 135, and combined with the vulnerability and remediation data from source 110. The advanced functionality of system 100 is thereby enabled as discussed further herein.

Figure 2:
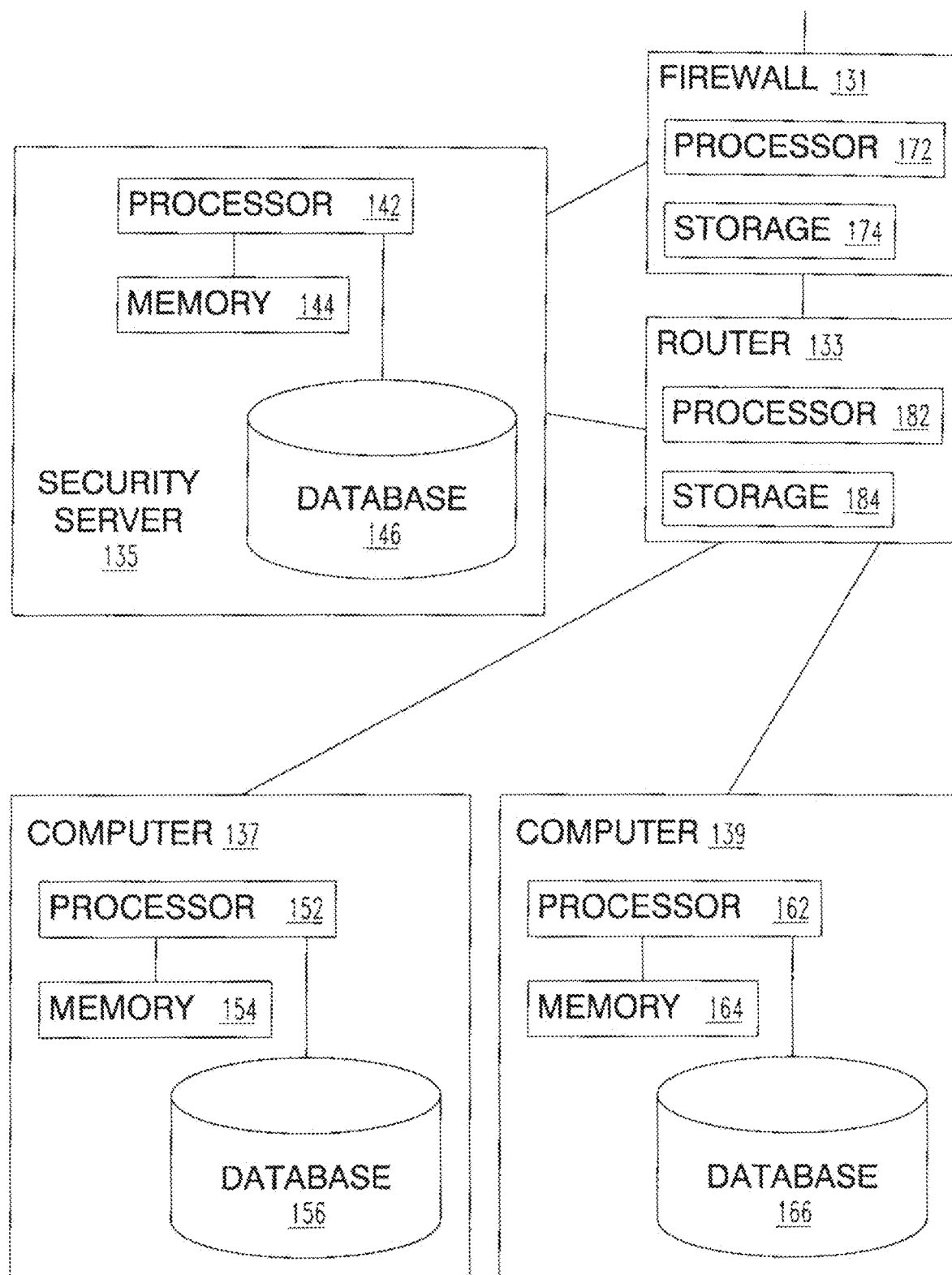
FIG. 2 is a block diagram showing components of several computing devices in the system of FIG. 1.

Turning to FIG. 2, one sees additional details and components of the devices in subnet 130. Computers 137 and 139 are traditional client or server machines, each having a processor 152, 162, memory 154, 164, and storage 156, 166. Firewall 131 and router 133 also have processors 172, 182 and storage 174, 184, respectively, as is known in the art. In this embodiment, devices 137 and 139 each execute a client-side program that continuously monitors the software installation and configuration status for that device. Changes to that status are communicated in substantially real time to security server 135, which continuously maintains the information in database 146. Security server 135 connects directly to firewall 131 and router 133 to obtain software installation and configuration status for those devices in the absence of a client-side program running thereon.

Processors 142, 152, 162 may each be comprised of one or more components configured as a single unit. Alternatively, when of a multi-component form, processor 142, 152, 162 may each have one or more components located remotely relative to the others. One or more components of processor 142, 152, 162 may be of the electronic variety defining digital circuitry, analog circuitry, or both. In one embodiment, processor 142, 152, 162 are of a conventional, integrated circuit microprocessor arrangement, such as one or more PENTIUM 4 or XEON processors from INTEL Corporation of 2200 Mission College Boulevard, Santa Clara, Calif., 95052, USA, or ATHLON XP processors from Advanced Micro Devices, One AMD Place, Sunnyvale, Calif., 94088, USA.

Memories 144, 154, 164 may include one or more types of solid-state electronic memory, magnetic memory, or optical memory, just to name a few. By way of non-limiting example, memory 40*b* may include solid-state electronic Random Access Memory (RAM), Sequentially Accessible Memory (SAM) (such as the First-In, First-Out (FIFO) variety or the Last-In First-Out (LIFO) variety), Programmable Read Only Memory (PROM), Electrically Programmable Read Only Memory (EPROM), or Electrically Erasable Programmable Read Only Memory (EEPROM); an optical disc memory (such as a DVD or CD ROM); a magnetically encoded hard drive, floppy disk, tape, or cartridge media; or a combination of any of these memory types. Also, memories 144, 154, 164 may be volatile, nonvolatile, or a hybrid combination of volatile and nonvolatile varieties.

In this exemplary embodiment, storage 146, 156, 166 comprises one or more of the memory types just given for memories 144, 154, 164, preferably selected from the non-volatile types.

Figure 3:
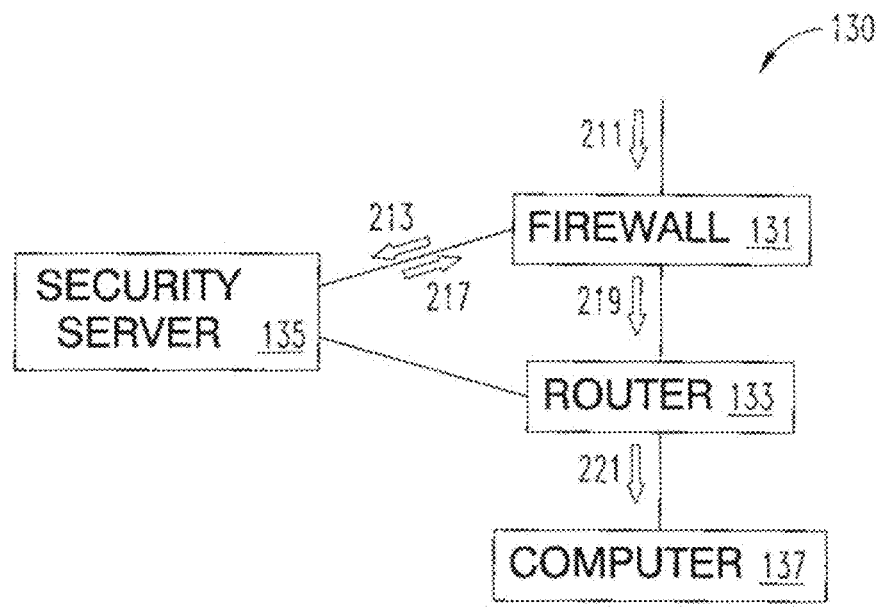
FIGS. 3 and 4 trace signals that travel through the system of FIGS. 1 and 2 and the present invention is applied to them.

This collection of information is used by system 100 in a wide variety of ways. With reference to FIG. 3, assume for example that a connection request 211 arrives at firewall 131 requesting that data be transferred to computer 137. The payload of request 211 is, in this example, a probe request for a worm that takes advantage of a particular security vulnerability in a certain computer operating system. Based on characteristics of the connection request 211, firewall 131 sends a query 213 to security server 135. Query 213 includes information that security server 135 uses to determine (1) the intended destination of connection request 211, and (2) some characterization of the payload of connection request 211, such as a vulnerability identifier. Security server 135 uses this information to determine whether connection request 211 is attempting to take advantage of a particular known vulnerability of destination machine 137, and uses information from database 146 (see FIG. 2) to determine whether the destination computer 137 has the vulnerable software installed, and whether the vulnerability has been patched on computer 137, or whether computer 137 has been configured so as to be invulnerable to a particular attack.

Security server 135 sends result signal 217 back to firewall 131 with an indication of whether the connection request should be granted or rejected. If it is to be granted, firewall 131 passes the request to router 133 as request 219, and router 133 relays the request as request 221 to computer 137, as is understood in the art. If, on the other hand, signal 217 indicates that connection request 211 is to be rejected, firewall 131 drops or rejects the connection request 211 as is understood in the art.

Figure 4:
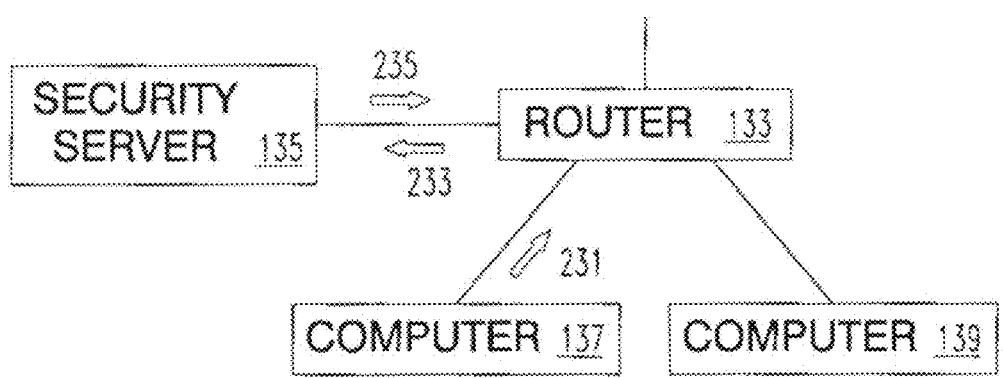

Analogous operation can protect computers within subnet 130 from compromised devices within subnet 130 as well. For example, FIG. 4 illustrates subnet 130 with computer 137 compromised. Under the control of a virus or worm, for example, computer 137 sends connection attempt 231 to router 133 in an attempt to probe or take advantage of a potential vulnerability in computer 139. On receiving connection request 231, router 133 sends relevant information about request 231 in a query 233 to security server 135. Similarly to the operation discussed above in relation to FIG. 3, security server 135 determines whether connection request 231 poses any threat, and in particular any threat to software on computer 139. If so, security server 135 determines whether the vulnerability has been patched, and if not, it determines whether computer 139 has been otherwise configured to avoid damage due to that vulnerability. Security server 135 replies with signal 235 to query 233 with that answer. Router 133 uses response 235 to determine whether to allow the connection attempt.

In some embodiments, upon a determination by security server 135 that a connection attempt or other attack has occurred against a computer that is vulnerable (based on its current software, patch, policy, and configuration status), security server 135 selects one or more remediation techniques from database 146 that remediate the particular vulnerability. Based on a prioritization previously selected by an administrator or the system designer, the remediation technique(s) are applied (1) to the machine that was attacked, (2) to all devices subject to the same vulnerability (based on their real-time software, patch, policy, and configuration status), or (3) to all devices to which the selected remediation can be applied.

In various embodiments, remediation techniques include the closing of open ports on the device; installation of a patch that is known to correct the vulnerability; changing the device's configuration; stopping, disabling, or removing services; setting or modifying policies; and the like. Furthermore, in various embodiments, events and actions are logged (preferably in a non-volatile medium) for later analysis and review by system administrators. In these embodiments, the log also stores information describing whether the target device was vulnerable to the attack.

A real-time status database according to the present invention has many other applications as well. In some embodiments, the database 146 is made available to an administrative console running on security server 135 or other administrative terminal. When a vulnerability is newly discovered in software that exists in subnet 130, administrators can immediately see whether any devices in subnet 130 are vulnerable to it, and if so, which ones. If a means of remediation of the vulnerability is known, the remediation can be selectively applied to only those devices subject to the vulnerability.

In some embodiments, the database 146 is integrated into another device, such as firewall 131 or router 133, or an individual device on the network. While some of these embodiments might avoid some failures due to network instability, they substantially increase the complexity of the device itself. For this reason, as well as the complexity of maintaining security database functions when integrated with other functions, the network-attached device embodiment described above in relation to FIGS. 1-4 is one possible embodiment.

In one embodiment, a software development kit (SDK) allows programmers to develop security applications that access the data collected in database 146. The applications developed with the SDK access information using a defined application programming interface (API) to retrieve vulnerability, remediation, and device status information available to the system. The applications then make security-related determinations and are enabled to take certain actions based on the available data.

In these exemplary systems, "configuration information" for each device may take the form of initialization files (often named *.ini or *.conf), configuration registry (such as, the Windows Registry on Microsoft WINDOWS operating systems), or configuration data held in volatile or non-volatile memory. Such configuration information often determines what and how data is accepted from other devices, sent to other devices, processed, stored, or otherwise handled, and in many cases determines what routines and sub-routines are executed in a particular application or operating system.

In one embodiment, security information management system is provided, wherein a database of potential vulnerabilities is maintained, along with data describing remediation techniques (patches, policy settings, and configuration options) available to protect against them. At least one vulnerability is associated in the database with multiple available remediation techniques. In one embodiment, the system presents a user with the list of remediation techniques available to protect against a known vulnerability, accepts the user's selection from the list, and executes the selected technique. In other embodiments, the system uses a predetermined prioritization schedule to automatically select among the available remediation techniques, then automatically executes the selected technique.

One embodiment of the present invention is a database of information about a plurality of devices, updated in real-time and used by an application to make a security-related decision. The database stores data indicating the installed operating system(s), installed software, patches that have been applied, system policies that are in place, and configuration information for each device. The database answers queries by one or more devices or applications attached by a network to facilitate security-related decision making. In one form of this embodiment, a firewall or router handles a connection request or maintenance of a connection based on the configuration information stored in the database that relates to one or both of the devices involved in the transmission.

In one embodiment, database 146 includes vulnerability and remediation information such that, for at least one vulnerability, multiple methods of remediating the vulnerability are specified. When the system has occasion to implement or offer remediation of a vulnerability, all known alternatives are presented that are relevant to the device or machine's particular configuration or setup. For example, when a vulnerability of a device is presented to an administrator, the administrator is given a choice among the plurality of remediation options to remediate the vulnerability. In some embodiments, the administrator can select a preferred type of remediation that will be applied if available and a fallback type. For example, an administrator may select application of a policy setting over installation of a software patch, so that the risk of disruption of critical business systems is minimized.

In other embodiments, an administrator or other user is presented with a set of user interface elements that identify multiple options for remediating and identifying the vulnerability. The administrator or user selects the method to be used, and that remediation is applied to the vulnerable device(s).

Figure 5A:
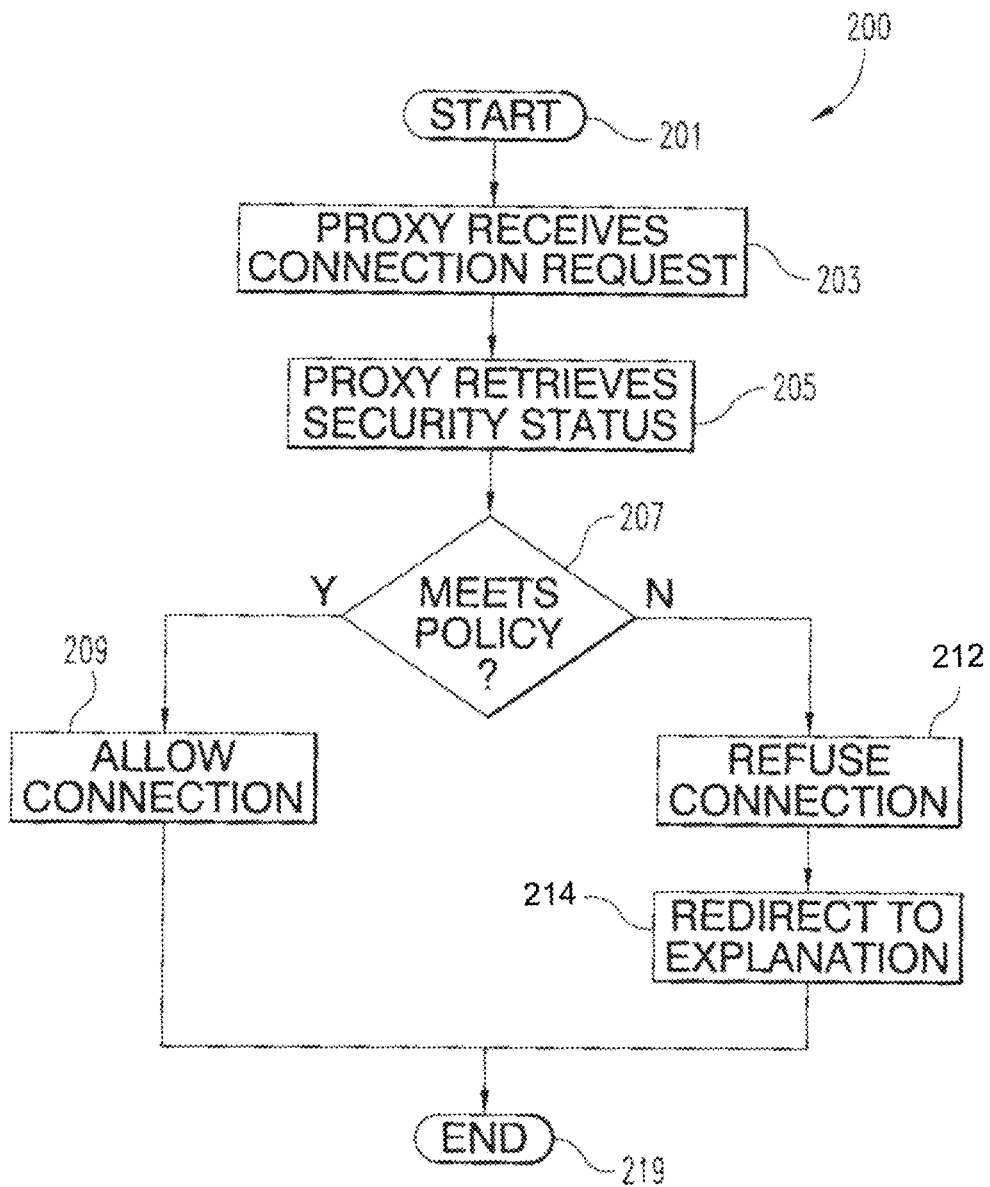
FIG. 5A is a flow chart of a filtering proxy method according to one embodiment of the present invention.

FIG. 5A is a flow chart of a filtering proxy method according to one embodiment of the present invention.

In use, a database maintains security status information on each device in a network, based on whether the device's operating system, software, and patches are installed and configured to meet a baseline level of security. A network gateway proxy blocks connection attempts from devices for which the database indicates a substandard security status, but allows connections from other devices to pass normally. The database is preferably updated on a substantially real-time basis by client-side software run by each device in the network.

Another form of the present embodiment includes a connection proxy that filters connections originating within the network. In particular, one embodiment employs a proxy that denies connection attempts originating with devices in the network when the originating device has a status, reflected in the database, that fails to meet predetermined security characteristics in terms of installed operating system and software, patch levels, and system policy and configuration registry information.

In this embodiment, router 133 serves as a connection proxy for devices and subnet 130, as will be understood by those skilled in the art. In addition to basic proxy functionality, however, router 133 accesses database 146 on security server 135 via the SDK at each connection attempt. If, for example, device 137 attempts to connect to any device where the connection must pass through the proxy server (router 133 in this example), such as a device on Internet 120, router 133 checks the security status of device 137 in database 146, using the real-time status therein to determine whether device 137 complies with one or more predetermined security policies. If it does, router 133 allows the connection to be made. If it does not, router 133 prevents the connection, preferably redirecting the connection to a diagnostic page that explains why the connection is not being made.

This system is illustrated by method 200 in FIG. 5A. Method 200 begins with start point 201. The proxy (router 133 in the above example) receives a connection request at block 203, then retrieves the security status of the source device at block 205. This preferably uses the real-time updated status information from database 146 (see FIG. 2) at decision block 207. If the security status indicates that the source device complies with the predetermined security policy, the proxy allows the connection at block 209. If not, the proxy refuses the connection at block 212 and redirects the connection to an explanation message (such as a locally generated web page or other message source) at block 214. In either case, method 200 ends at end point 219.

In possible embodiments, the determination and decision at block 207 apply a comprehensive minimum policy set that protects other devices in subnet 130 (see FIG. 1) from viruses, trojans, worms, and other malware that might be inadvertently and/or carelessly acquired due to the requested connection.

In another embodiment, a security information management system is provided, wherein client-side devices preferably collect and monitor information describing the operating system, software, and patches installed on the device (s), as well as configuration thereof. A database of this information is maintained, along with data describing vulnerabilities of available software and associated remediation techniques available for it. The system exposes an API to support security-related decisions by other applications. For example, an intrusion detection system (IDS) accesses the database to determine whether an actual threat exists and should be (or has been) blocked.

In another form of this embodiment, client software runs on each monitored device and reports configuration information to the database, so that the database has substantially real-time-current information.

The present embodiment of the present invention advantageously acquires the real-time status information from each client using client-side software. In this manner, a resource burden of monitoring is spread among the devices being monitored, and uses far fewer network resources in the process.

In these exemplary systems, "configuration information" for each device may take the form of initialization files (often named *.ini or *.conf), configuration registry (such as the Windows Registry on Microsoft Windows operating systems), or configuration data held in volatile or non-volatile memory. Such configuration information often determines what and how data is accepted from other devices, sent to other devices, processed, stored, or otherwise handled, and in many cases determines what routines and sub-routines are executed in a particular application or operating system.

In one embodiment, a system maintains a database of vulnerabilities and associated remediation techniques. The remediation techniques include software patches, policy settings or changes, and registry settings or changes. This multi-faceted provides novel flexibility in management of security issues, and convenience for security administrators in both determining available options and selecting remediation steps for vulnerable systems.

In another embodiment of the present invention, patches, policy changes, software updates, and configuration changes are rolled out to devices on a network using a staged roll-out technique. In this technique, the change is applied to a selected device or set of devices identified by an administrator. After a predetermined amount of time passes, unless the administrator has canceled the roll-out, the change is applied to an additional group of devices on the network. Third- and fourth-tier groups may also be identified by the administrator, where implementation of the remediation or upgrade is automatically effected in subsequent stages a predetermined amount of time after the preceding stage roll-out. Thus, if no failures are noted following a more limited roll-out (on a first set of devices), then the remediation or upgrade is automatically applied to other devices. If, on the other hand, an error or failure is observed, the subsequent roll-out can be canceled so that further failures and problems are avoided.

Figure 5B:
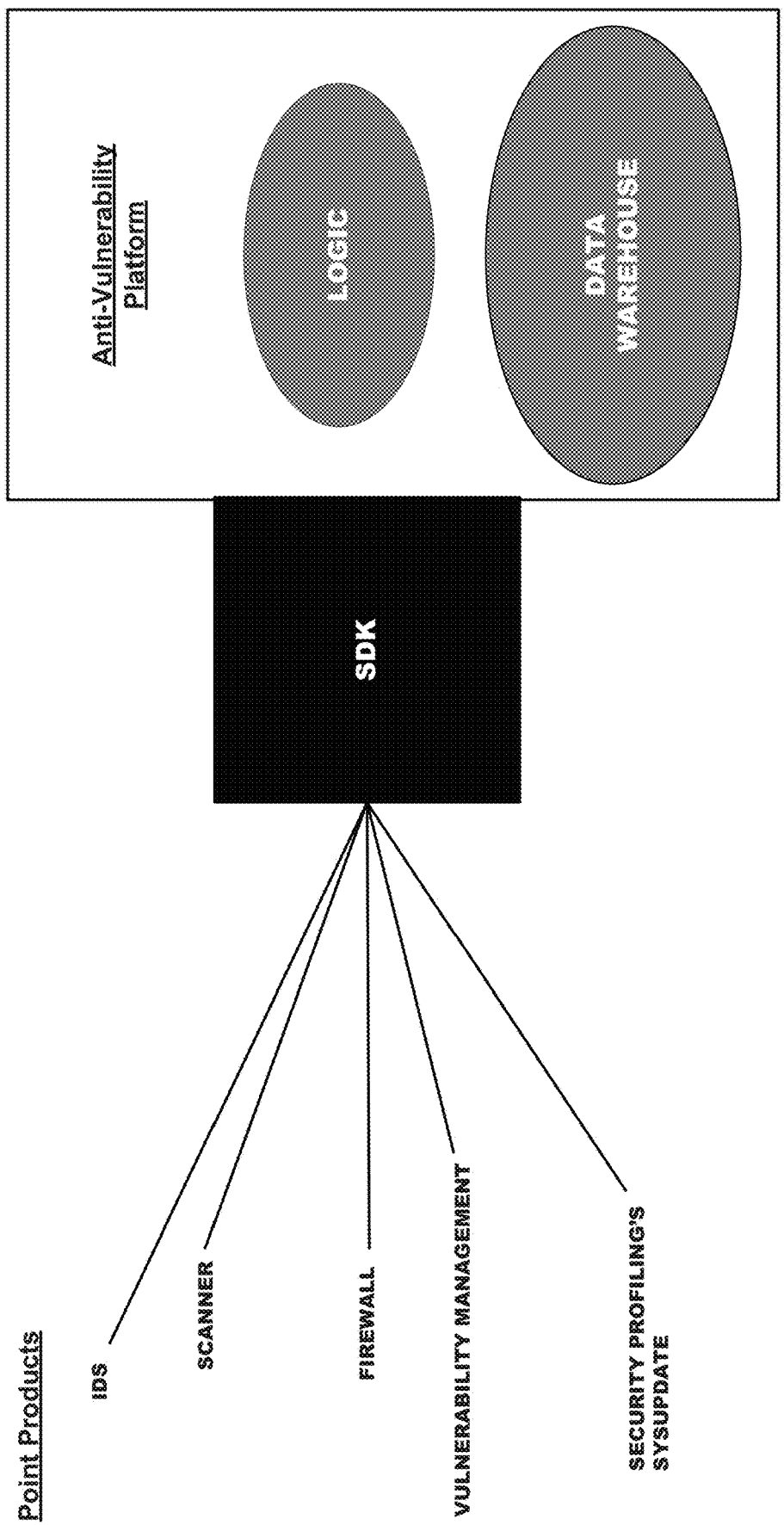
FIGS. 5B and 6 illustrate a platform, in accordance with possible embodiments.
Figure 6:
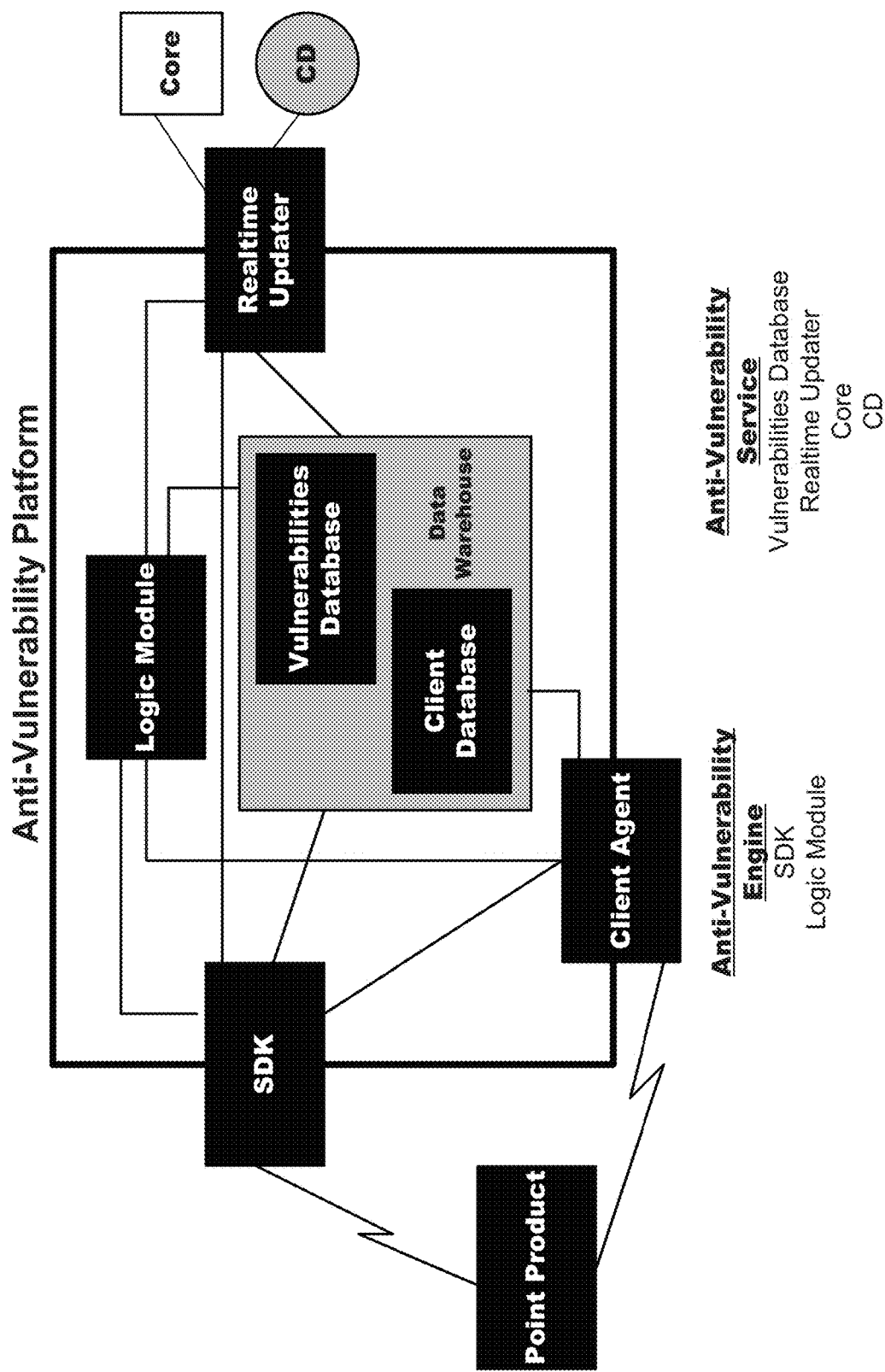

FIGS. 5B and 6 illustrate a platform, in accordance with possible embodiments.

In one possible embodiment, provided is a platform and underlying back end that includes a logic engine and vulnerability data warehouse. It may easily integrate with and enable network security products such as IDS, scanners, or firewalls to intelligently reference and share the same vulnerability data set, and independently provide complete vulnerability remediation (patching) functionalities such as that provided by the patch management and vulnerability remediation application. Thereby, the technology may improve system accuracy and efficiencies, minimize false positives and false negatives, and provide policy compliance and enforcement capabilities.

The latest network compromises are combining qualities of viruses, worms, and denial of service attacks into new blended attacks. Additionally, blended attacks may now utilize metamorphic or polymorphic abilities to change their signatures to avoid detection. To mitigate these new risks, organizations are now deploying a multi-tiered network defense strategy comprised of a variety of network security components layered at the perimeter and to internal network machines and devices. The security components are managed separately, and possibly their data is ported into a Security Information Management System (SIMS) correlation engine.

However, network security components and correlation engines rely on signatures or anomalies, producing an ever-increasing quantity of data, including false positive, benign, and erroneous events. They also lack the intelligence to identify, reference, or remediate the vulnerabilities targeted by the attack. Furthermore, the time and cost to acquire, manage, and maintain these numerous network security components is overwhelming the end user. Therefore, more sophisticated technology is provided to resolve these performance and management issues.

In one embodiment, technology may be provided that addresses these requirements by making each security component smarter and provides managers with remote remediation options. Thereby, improving system performance and streamlining management processes.

In one embodiment, an intelligent integration platform and SDK are provided to meet the above requirements.

In one embodiment, security products are enhanced and system intelligence may be provided. The same vulnerability data warehouse information is shared with the products so that more intelligent actions may then be taken to mitigate complex threats.

One embodiment cross-references the threat's identifier with the target's configuration. The threat's CVE ID, or other identifier, and the destination IP address are fed into the logic engine where it cross-references the threat with the machine's existing OS, application, and patch configuration profile. An answer is returned accurately indicating if the machine is vulnerable.

In one embodiment, network vulnerabilities are identified. The platform may independently identify which network machines and devices have vulnerabilities by querying a client agent, or a device's OS or firmware directly.

One embodiment proactively remediates the vulnerability. Once a vulnerability is identified, a remediation function may be provided that may remotely and automatically deploy the appropriate update to each machine or device, install it, and document it with change tracking and audit trail reports.

Examples of Anti-Vulnerability applications that may be integrated into network security products for enterprise and small office home office (SOHO) networks when integrated with one embodiment, via the SDK, will be described.

In one embodiment, update or patch deployment are provided, which remotely remediate network vulnerabilities and provide policy compliance and enforcement capabilities. And, for the consumer market, it may additionally support non-security related updates such as application version, performance, and bug-fix upgrades.

In one embodiment, an IDS may be provided that accurately determines if the targeted machine is actually vulnerable to an attack; virtually eliminates false positives and false negatives; and adds vulnerability remediation and policy compliance and enforcement functionalities.

In one embodiment, a scanner may be provided that virtually eliminates false positive and false negatives, and adds vulnerability remediation and policy compliance and enforcement functionalities.

In one embodiment, a firewall may be provided that virtually eliminates false positive and false negatives, preventing the security system from denying valid traffic to the organization—self-inflicted denial of service attacks—and adds vulnerability remediation, and policy compliance and enforcement functionalities.

In one embodiment, vulnerability management may be provided, as set forth above.

In one embodiment, multiple products are provided including an IDS, scanner, and firewall. Each may communicate with the same back-end data warehouse, sharing the same vulnerability information, attaining intelligence and more accurate information about the target and its vulnerabilities, thereby more effectively mitigating complex threats.

In one embodiment, change management may be provided, which may automatically create a change request in the system, specifying what update/patch is applicable to what system or groups of systems by vulnerability. After approval of the request, they may automatically deploy and install the update/patch. Finally, they may also verify correct operation after installation and automatically provide all necessary documentation and logging required.

Lastly, the platform may also provide product upgrades and signature updates to each of these various security products.

The platform is comprised of the following software components: SDK, client agent, logic engine, and data warehouse stored on a dedicated on-site server. Network operations center (NOC) Servers periodically synchronize the customers' servers with the latest vulnerability and update data. See FIG. 5B.

The same client agent and on-site server support all security applications that are integrated onto the platform, thereby providing the added anti-vulnerability functionalities presented in the previous section.

There are two system requirements: TCP/IP connectivity, and supported network machines and devices. In one embodiment, platforms supported are set forth below in Table 1.

TABLE 1

All Windows Operating Systems and their applications
All UNIX variants
Cisco routers and firewalls
Toshiba network devices
Netgear network devices
Linksys network devices, including wireless access points Platform support is scalable to any network size or architecture; consumer, small office home office (SOHO), enterprise, and distributed networks.

In one embodiment, technology may be provided that includes a backend platform that includes a logic engine and vulnerability data warehouse. It may easily integrate with and enable network security products such as IDS, scanners, or firewalls to intelligently reference and share the same vulnerability data set, and independently provide complete vulnerability remediation (patching) functionalities such as that provided by the patch management and vulnerability remediation application, update application and the intelligent IDS. Thereby, the technology may improve system accuracy and efficiencies, minimize false positives and false negatives, and provide policy compliance and enforcement capabilities.

As shown in FIG. 5B, the technology may meet market requirements, presented in the next section.

For example, networks are probed at an ever-increasing frequency for vulnerabilities, which may be exploited with compromise attacks. To protect the network, administrators have traditionally set up perimeter defense strategies.

These strategies generally call for network managers to lock down core servers, and monitor/scan/filter all incoming and outgoing traffic at the network perimeter with several network security products such as antivirus and firewalls to identify and attempt to neutralize hackers and malicious code. In the past, these strategies worked well, however new threats are becoming more complex.

The latest malicious code may combine qualities of viruses, worms, and direct compromise attacks into new blended attacks. Virus payloads are becoming more complex and by using metamorphic or polymorphic abilities, viruses are able to change their signatures to avoid the fingerprint-type filtering that most applications employ.

To mitigate these new risks, organizations deploy a multi-tiered network defense strategy comprised of a variety of additional network security products layered at the perimeter and to internal network machines and devices. Such network security products include antivirus, firewall, scanners, and network and host based intrusion detection systems.

Each of these systems is based on specific signatures, rules, or anomalies of each attack and their variants, and do not identify and remediate the specific network vulnerabilities the attack is targeting. So each attack, and its variants, must be identified and analyzed, a signature prepared, then finally deployed to each point product on each customer's network. This process is uncoordinated among multiple disparate systems, and creates an ever-increasing number of signatures producing more and more attack alerts requiring immediate attention—many of which are erroneous. The security components are managed separately, and possibly their data is ported into a security information management system (SIMS) correlation engine.

Additionally, to proactively remediate the vulnerabilities the malicious code is targeting, administrators quickly and diligently update or "patch" each network machine and device, which is a time-consuming and costly process. Further compounding the burden on administrators, best practice and government compliance directives may require higher standards of network security and integrity to protect consumer privacy, and they are documented with change tracking and audit trail reports.

Therefore, it is increasingly difficult and costly to effectively mitigate new threats and manage numerous systems—particularly in an environment of rising security standards and policy compliance requirements.

Thus, the multi-tiered network defense strategy is falling short primarily for four reasons. First, there is an inability of multi-tiered network security products to communicate and share information necessary to mitigate blended threats, and minimize false positives and false negatives. The vulnerabilities targeted by malicious code are not accurately identified nor proactively remediated. The associated excessive aggregate cost of ownership of multiple systems. The excessive administrative burden and cost of managing and maintaining multiple systems.

Hence, there is a need to integrate systems, share information intelligently to better defend against blended threats, reduce management and cost requirements, and automate vulnerability identification and remediation functionalities, as presented in the high-level requirements.

In one embodiment, technology is provided to meet the following market requirements: integrate network security products to share information; provide system intelligence; and remediate network vulnerabilities.

In one embodiment, technology may integrate with and enable network security products to intelligently reference and share information from the same vulnerability data set, provide vulnerability identification and remediation functionalities, and efficiently meet policy compliance and enforcement requirements.

In one embodiment, the platform is a complimentary network security technology. When integrated into the defense strategy, it adds intelligence that more accurately and efficiently mitigates blended threats and offloads the time-consuming functions that burden network administrators.

In one embodiment, the platform enables network security products to share information via its proprietary logic engine to automatically cross-reference the threat identifier with the targeted machine's configuration to determine if it is actually vulnerable to that threat. Previously separate and uncoordinated processes are now more intelligent and automated, resulting in improved system accuracy and efficiency. Therefore the need to layer more and more point products and add a SIMS is reduced, in-turn decreasing the amount of data—particularly erroneous data—to manage. Subsequently, the costs to acquire, operate, and manage the additional multiple point products, and the need to implement a SIMS, are also reduced.

In one embodiment, the platform may also remotely and proactively remediate vulnerabilities by first determining which updates are needed and compatible with each machine or device, taking into account the OS, applications, or firmware installed. Then, the updates may be deployed, installed, and validated. Thereby, policy compliance is effectively and efficiently enforced, and documented.

In one embodiment, the present technology fulfills market requirements noted in the previous section. For example, it may integrate network security products and provides system intelligence. The same vulnerability data warehouse information is shared with all products so that more intelligent actions may then be taken to mitigate complex threats.

Still yet, it may cross-reference the threat's identifier with the target's configuration. The threat's CVE ID, or other identifier, and the destination IP address are fed into the logic engine where it cross-references the threat with the machine's existing OS, application, and patch configuration profile. An answer is returned accurately indicating if the machine is vulnerable. Thereby, minimizes erroneous, benign, and false positive data produced by each security product.

One embodiment identifies network vulnerabilities. The platform may independently identify which network machines and devices have vulnerabilities by querying a client agent, or a device's OS or firmware directly.

One embodiment proactively remediates the vulnerability. Once a vulnerability is identified, a remediation function may be provided that may remotely and automatically deploy the appropriate update to each machine or device, install it, and document it with change tracking and audit trail reports.

Various possible benefits include blended attacks being more effectively mitigated and the overwhelming management and maintenance burden on administrators to purchase, operate, and maintain multiple network security products being reduced, while increasing productivity, reducing costs, and more effectively and efficiently meeting policy compliance and enforcement requirements.

Table 2 illustrates a plurality of end user details.

TABLE 2

Supplements existing technology to better defend against blended attacks
Intelligently accesses the vulnerability data warehouse, and remediates vulnerabilities.
Offers policy compliance and enforcement functionality
Vulnerabilities may be automatically remediated, verified and documented, therefore enforcing compliance.
No additional software or hardware implementation costs
Anti-Vulnerability functionalities may be integrated into existing product platforms.
Reduces cost of ownership of multi network security products
Shared vulnerability data sets and added vulnerability remediation functionalities may reduce the number of network security products needed to adequately attain defense strategy requirements.
Reduces management and maintenance costs TABLE 2-continued Increased accuracy of vulnerability identification, remediation and policy enforcement, and reduction of false positives, false negatives and denial of service (DoS), significantly reduces management time and costs.
Manage more machines and devices on the network through one portal
Vulnerability remediation and policy compliance and enforcement may be integrated with existing security network security products, and their respective interfaces.
Minimize end user education/absorption costs
Anti-Vulnerability applications are transparently integrated, retaining pre-existing architecture, processes, and interfaces. Therefore, the end user experience remains the same, or improved with simplified or automated processes.
User experience remains the same - additional time or costs to understand and execute new technologies are minimized
Anti-Vulnerability applications may be integrated transparently and seamlessly, and the pre-existing operational processes and user interfaces are virtually unchanged.
Supports both the enterprise and SOHO networks
Data warehouse contains vulnerabilities and updates for many machines and devices that operate on both enterprise and SOHO networks.
Applications presented hereinafter Examples of applications that may be made available for enterprise and small office home office (SOHO) networks when integrated with Anti-Vulnerability technology via the SDK will now be set forth.

In one embodiment, update or patch deployment is provided. In one embodiment, a patch management and vulnerability remediation solution is provided. The technology enables products to add accurate vulnerability identification, remediation, verification, and policy compliance functions. With such technology, products may gain intelligence, accuracy and efficiency, eliminate false positives and false negatives, and ensure policy compliance, thereby saving the organization time and money. Such functionalities and benefits are available for both the enterprise and SOHO networks. And, for the consumer market, it may additionally support non-security related updates such as application version, performance, and bug-fix updates for widely distributed programs, which may optimize system performance and enhance the consumer experience.

In one embodiment, an IDS is provided. IDS products attempt to identify malicious code by signatures at both the network and host client level. While they may be able to identify malicious code by CVE ID or other identifier, and targeted machines by IP address, but they generally do not have the intelligence to determine if the any of the machines on the network are susceptible to that attack, or with finer granularity, if any machine has a specific vulnerability to that specific attack, or if the targeted vulnerability has already been patched. For example, if the malicious code has been written as a Windows based attack targeting a Windows vulnerability, is the Destination IP actually running Windows, or a UNIX variant? And, if Windows, is it vulnerable to the attack, or has it already been patched? IDS do not have the intelligence to answer these questions, and incident alerts are generated indiscriminately. Lastly, even if the targeted machine is vulnerable—it remains unremediated—an IDS does not have the capability to remediate it.

With the present embodiment, a product architect can integrate functionalities listed in the previous section to enable the IDS to access the Anti-Vulnerability logic engine and platform. It may then have the intelligence to determine if any machine on the network is susceptible to the attack, remediate the vulnerability, mitigate the attack, and verify policy compliance. Now, if no machines were susceptible to the attack, it is identified as an event but not an incident, no further data or alert is generated, and a management response is not required. Integrated products may gain intelligence, accuracy, and efficiency, eliminate false positives and false negatives, and ensure policy compliance, thereby saving the organization time and money. Such functionalities and benefits are available for both the enterprise and SOHO networks.

In one embodiment, scanners may be provided. Vulnerability scanners assess each machine on the network for vulnerabilities, and create lists of potential vulnerabilities to the system managers. The lists commonly contain many false positives and false negatives, burdening the system and managers with inaccuracies.

With the present embodiment, a product architect can integrate functionalities listed in the previous section to enable the scanner to access the logic engine and platform, and then have the intelligence to determine if the machine has actual vulnerabilities, remediate them, and verify policy compliance. Integrated products may gain intelligence, accuracy, and efficiency, eliminated false positives and false negatives, and ensured policy compliance, thereby saving the organization time and money.

In one embodiment, a firewall may be provided. "Smart" firewalls are based in part on signatures and other similar functionalities as the IDS products described above.

With the present embodiment, the firewall can determine whether an attack is valid or a false positive, thereby preventing the security system from denying valid traffic to the organization—self-inflicted DoS attacks. Such functionalities and benefits may be available for both the enterprise and SOHO networks.

In one embodiment, vulnerability management may be provided. Vulnerability management products enable managers to set policy and identify potential network vulnerabilities. They typically do not accurately identify each vulnerability on each network machine and device, nor remediate each vulnerability, meeting policy compliance enforcement requirements.

The present embodiment offers similar functionalities and benefits as the patch deployment products described above. In short, it enables products to add accurate vulnerability identification, remediation, verification, and policy compliance and enforcement. Such functionalities and benefits are available for both the enterprise and SOHO networks.

To this end, multiple products may be provided: IDS, scanner, firewall, and vulnerability management. Each product functions as the individual products noted above. Each may be deployed and operated on the network in a multi-tiered network defense strategy. They may be disparate system, and their signatures and update deployment schedules may vary. Therefore, the probability of mitigating a new and complex threat decreases, while management requirements and cost increases.

In one embodiment, they each may communicate with the same backend data warehouse, sharing the same vulnerability information, attaining intelligence and more accurate information about the target and its vulnerabilities, thereby more effectively mitigating complex threats. It may also enable the products to add accurate vulnerability identification, remediation, verification, and policy compliance and enforcement functionalities.

In one embodiment, change management (CM) may be provided. Existing CM applications control the documentation and logging of change throughout the enterprise. These applications ensure that an organization maintains consistent records of what happened and when. Currently administrators must independently recognize that a security patch/update must be deployed to a computer or group of computers.

The user enters the request in the system, through the pipelined process of change management the request would be approved, the patch/update would be manually installed by a user, then documented in the change management software that the process has been completed. While CM software assists in documentation, very little if any assistance may be provided to identify the patches/updates needed, nor verifying correct function after the update/patch is installed.

With the current possible embodiment, change management integration may greatly streamline this process further reducing total cost of ownership, ease of use, and a higher standard of documentation. The products may then automatically create a change request in the system, specifying what update/patch is applicable to what system or groups of systems by vulnerability. After approval of the request, they may automatically deploy and install the update/patch. Finally, they may also verify correct operation after installation and automatically provide all necessary documentation and logging required.

Lastly, one possible embodiment may also provide product upgrades and signature updates to each of these various security products—including all of the technology benefits such as ensuring compliance of signature versions, logging, reporting, and verification of installation.

Thus, one possible embodiment includes an intelligent platform that may supplement any existing defense strategy. Once integrated with the technology, security products may share the same vulnerability data set to improve automation and accuracy—increasing efficiencies and minimizing false positives and false negatives. It also enables remote identification, management, and remediation of network vulnerabilities, and provides update deployment, validation, and reporting capabilities. Thereby, the technology improves network security and integrity, mitigation of blended threats, while increasing productivity, reducing total cost ownership, and more effectively and efficiently attaining policy compliance and enforcement requirements.

One embodiment provides IDS intelligence, accuracy and remote patching functions—IDS data output integrated with the aforementioned platform via the SDK. The platform's underlying backend including a logic engine and vulnerability data warehouse provides the added functions and performance.

Conventional IDS produce an ever-increasing quantity of alert data, including erroneous and false positive data. They also lack the intelligence to identify or remediate the vulnerabilities targeted by the attack. Furthermore, the cost of the acquiring, managing, and maintaining conventional IDS is overwhelming the end user.

Therefore, a more sophisticated, intelligent technology is provided to resolve these issues. In one embodiment, an intelligent IDS is provided to meet market requirements. The alert data output from a distribution of Snort is integrated with the platform via the SDK, which may add the following functions.

In one embodiment, it cross-references the threat's identifier with the target's configuration. The CVE ID, or other identifier, and the Destination IP address are fed into the logic engine where it cross-references the threat with the machine's configuration profile.

In one embodiment, it virtually eliminates false positives and false negatives. The backend accurately determines in real time if the targeted machine is susceptible to the attack.

And, if the machine is not susceptible, it is filtered and reported back as an event and not an incident. No further data or alert is generated, and a management response is not required.

In one embodiment, it remotely remediates the vulnerability. When a machine is identified as vulnerable to an attack, an incident, a remediation function may be provided to the administrator to remotely deploy the appropriate update to the machine or device, install it, verifies the files and hashes, and document it with change tracking and audit trail reports.

Table 3 sets forth a plurality of features.

TABLE 3

Supports Windows and UNIX variants
Determines if targeted machine is vulnerable to an attack in real time
Filters out erroneous, benign and false positive alerts
Remotely patches targeted vulnerabilities in one click
Installs in minutes To this end, erroneous, benign, and false positive data is filtered out, and incidents may be remotely remediated. Therefore, complex threats are more effectively and efficiently mitigated. Correspondingly, the management and maintenance burden on administrators is reduced, saving time and effort.

Figure 7:
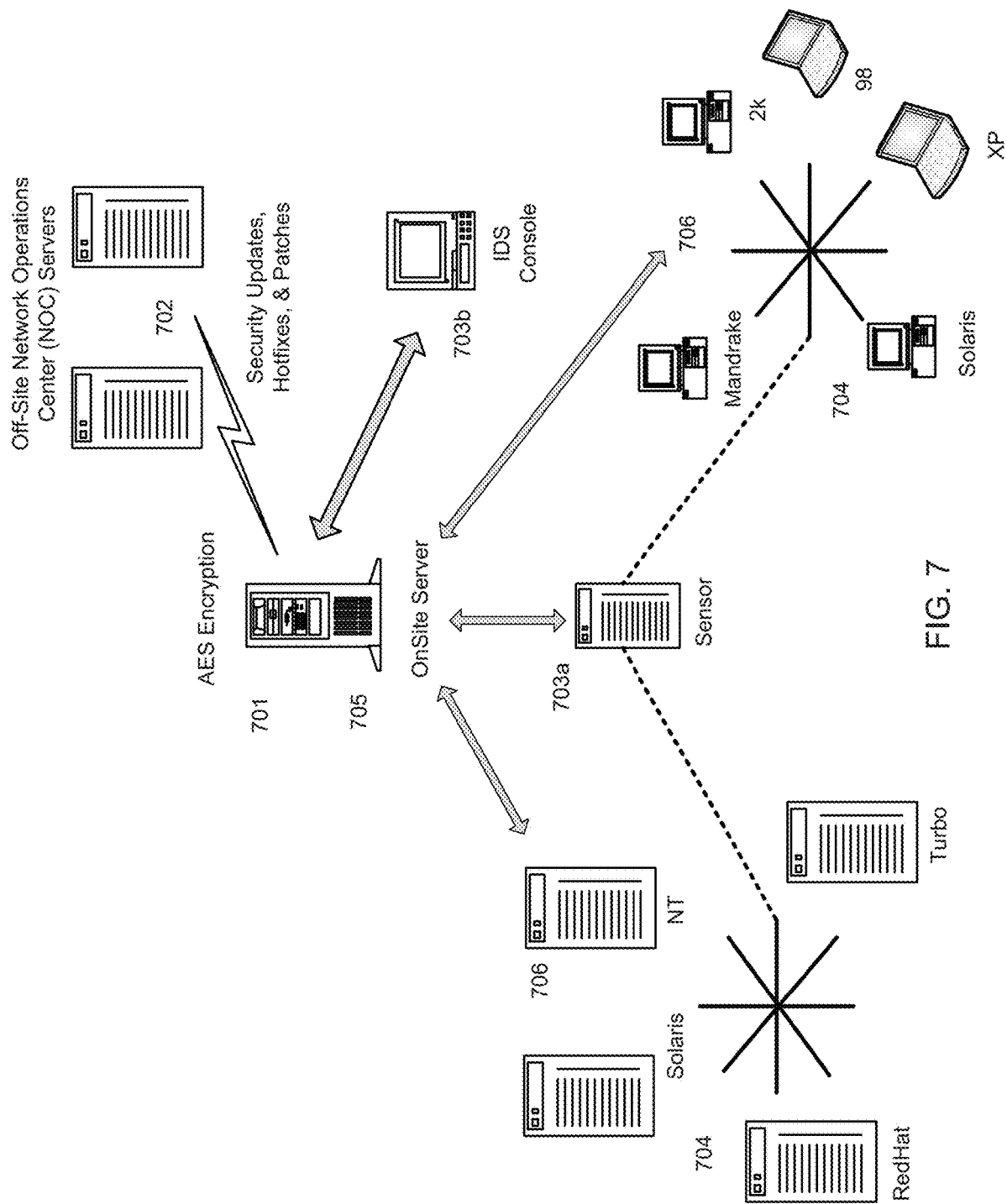
FIG. 7 illustrates an intelligent IDS, in accordance with one embodiment.

FIG. 7 illustrates an intelligent IDS, in accordance with one embodiment. As shown in 701, the on-site server periodically initiates communication with the NOC servers. In 702, updates are pulled from the NOC servers to the on-site server. In 703a, a sensor monitors and processes network traffic, and sends real time alert data to the on-site server where it cross-references the data with the backend. In 703b, centralized IDS console filters alerts; separating events from incidents. It also offers administrators remote patching function. In 704, agents are deployed to each client, accurately identifying which OS, apps, and updates are installed. In 705, the logic engine automatically determines which updates are needed to remediate the targeted machine. As shown in 706, appropriate updates are remotely deployed, installed, and validated on each client.

In one embodiment, the intelligent patch management and vulnerability remediation application automatically updates computer OS and application vulnerabilities before they can be exploited by hackers and viruses.

Networks are probed at an ever-increasing frequency for vulnerabilities, which may be exploited with directed compromise attacks. To protect the network, administrators must diligently update or "patch" server and workstation vulnerabilities, which is a time-consuming and costly process. Further compounding the burden on administrators, best practice and government compliance directives now require higher standards of network security to protect consumer privacy and proprietary data, which must be documented with change tracking and audit trail reports. Therefore, fully automated technology is provided to resolve these issues.

In one embodiment, a intelligent application called Sys-Update—the first technology to fully automate the updating and reporting processes, as described below.

In terms of function, one possible embodiment automatically researches updates. In collaboration with software development companies, it receives updates and their respective compatibility and installation guidelines, which are thoroughly reviewed and tested in a lab for system compatibility and stability. One embodiment automatically and securely downloads, and archives, all updates. Once the updates and guidelines are thoroughly reviewed and tested, they are automatically downloaded to each customer's on-site server, verified with MD5 hashes, and archived in a self-populating patch repository database.

One possible embodiment automatically determines the update and dependency requirements for all computers on a network, based on their individual operating systems, applications, and previously installed updates. The logic engine automatically matches the tested updates and their guidelines across each computer's configuration profile.

One possible embodiment remotely, securely, and automatically deploys updates to each computer and device. Updates may be tested on a test group, and then queued for release to each computer on the network, consistently in accordance with the policy determined by the network administrator.

One possible embodiment automatically verifies the updates are installed and running correctly. Each computer's client agent installs the updates, and verifies the files and hashes.

One possible embodiment automatically generates change tracking and audit trail reports. Change tracking and audit trail reports may be selected and printed from the management console reporting modules. Additionally, application license audit reports may be generated, which lists software installed on each machine, by license key.

Table 4 illustrates possible features in one embodiment.

TABLE 4

Figure 8:
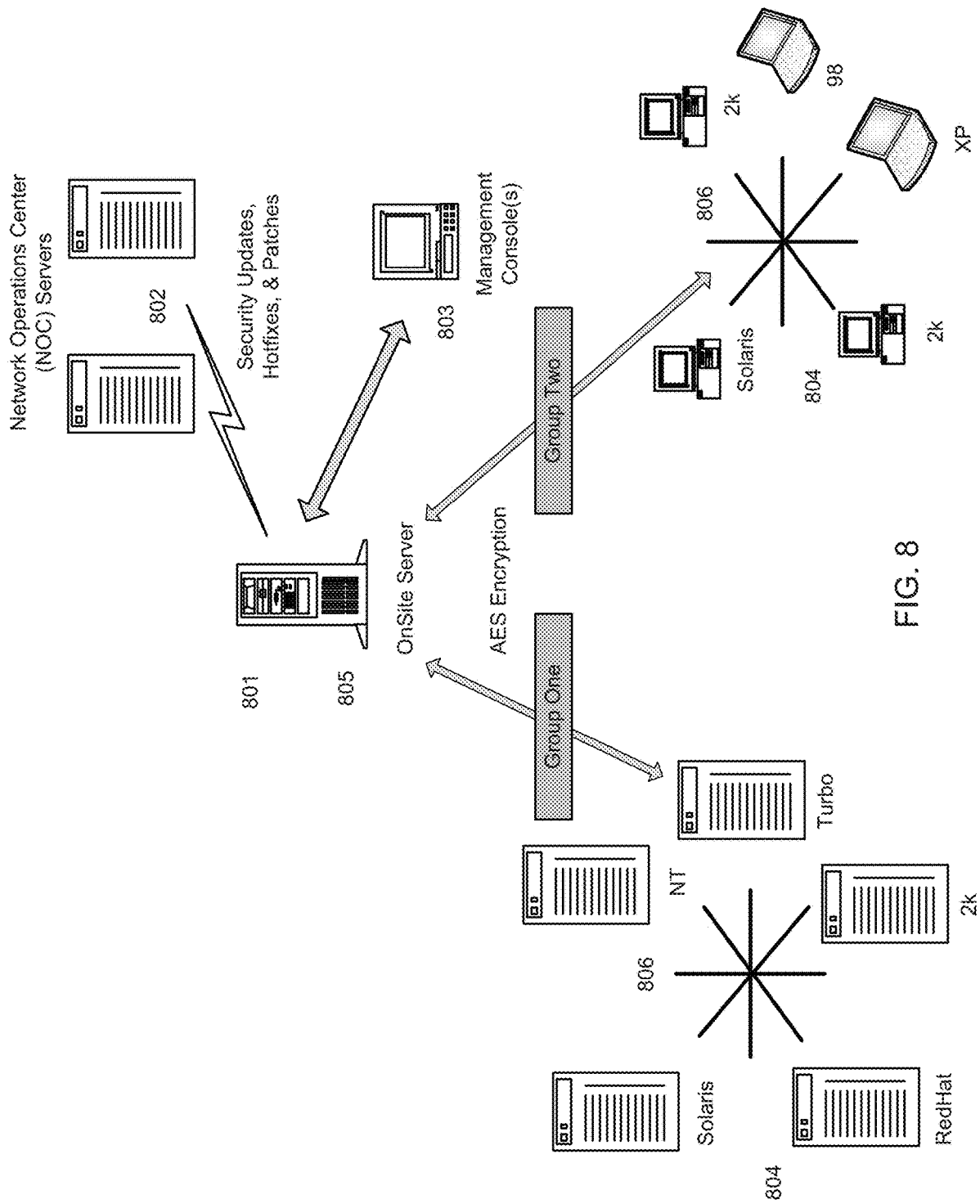
FIG. 8 illustrates an update system, in accordance with one embodiment.

Supports Windows, UNIX variants, and network devices
Supports non-Microsoft applications
Logic engine provides system intelligence
Files verified with SHA1 or MD5 hashes
MMC snap-in console with Crystal Reports
AES encryption FIG. 8 illustrates an update system, in accordance with one embodiment. As shown in 801, the on-site server periodically initiates communication with the off-site NOC servers. In 802, updates are pulled from the NOC servers to the on-site server. In 803, the centralized MMC snap-in console offers flexible security policy options and comprehensive reporting capabilities. In 804. agents accurately identifies OS, apps, and updates installed on each client by file versions and hashes. In 805, logic engine automatically determines which updates are needed on each client, taking into account OS, app, and update dependencies. In 806, appropriate updates are automatically deployed, installed, and validated on each client.

In one embodiment, a secure computer log management application is provided with fully automated archiving, querying, and reporting options.

Best practice directives and government compliancy regulations now require administrators to archive log events over an extended period of time, and extensively document log and audit trail reports. With existing tools, these are time-consuming processes. Furthermore, existing tools transfer logs in clear text and are subject to malicious manipulation, and logs may be lost since few utilize guaranteed delivery protocols. Therefore, the integrity and security of the log data is not assured. In the event of an internal or external compromise, logs may be deleted, manipulated, or the network flooded with decoy log data.

The present possible embodiment automatically and continuously transfers logs from each computer into a self-configuring, self-populating, maintenance-free database where they may be archived for years on end. The transfer process utilizes AES encryption for authentication between the client and server, and a guarantee delivery protocol—ensuring no data is compromised or lost. Flexible cross-correlation queries may be run from a single, remote viewer console, and the data is then automatically formatted into reports.

In one embodiment, cross-correlation query type descriptions are provided. Such embodiment may provide the following three flexible cross-correlation queries in Table 5, which provide increasing detail and breadth of filtering/sorting capabilities, respectively.

TABLE 5

General Queries - This is the default query. It filters or sorts the logs of any one computer, by any one of the three log types.
Specific Queries - Detailed queries across all machines, and all log types.
Advanced Queries - Query across any combination of machines, by any combination of sources, events, and log types, over any period of time.

In one embodiment, features shown in Table 6 may be provided.

TABLE 6

Continuously pulls all logs into a central database, which may be archived for years on end
AES encryption and a guarantee delivery protocol ensure logs are not compromised or lost
Queries may be across any computer, for any log type, over any time frame
Automatically generates event log reports - ideal for documenting audit and compliance requirements
Easy download installation In one embodiment, automated reports may be provided. Query data is automatically formatted into professional reports Also, a separate reporting interface is available to generate general, machine, and user statistics. The present embodiment quickly and easily fulfills best practice and government compliance requirements for log event archiving and reporting.

Figure 9:
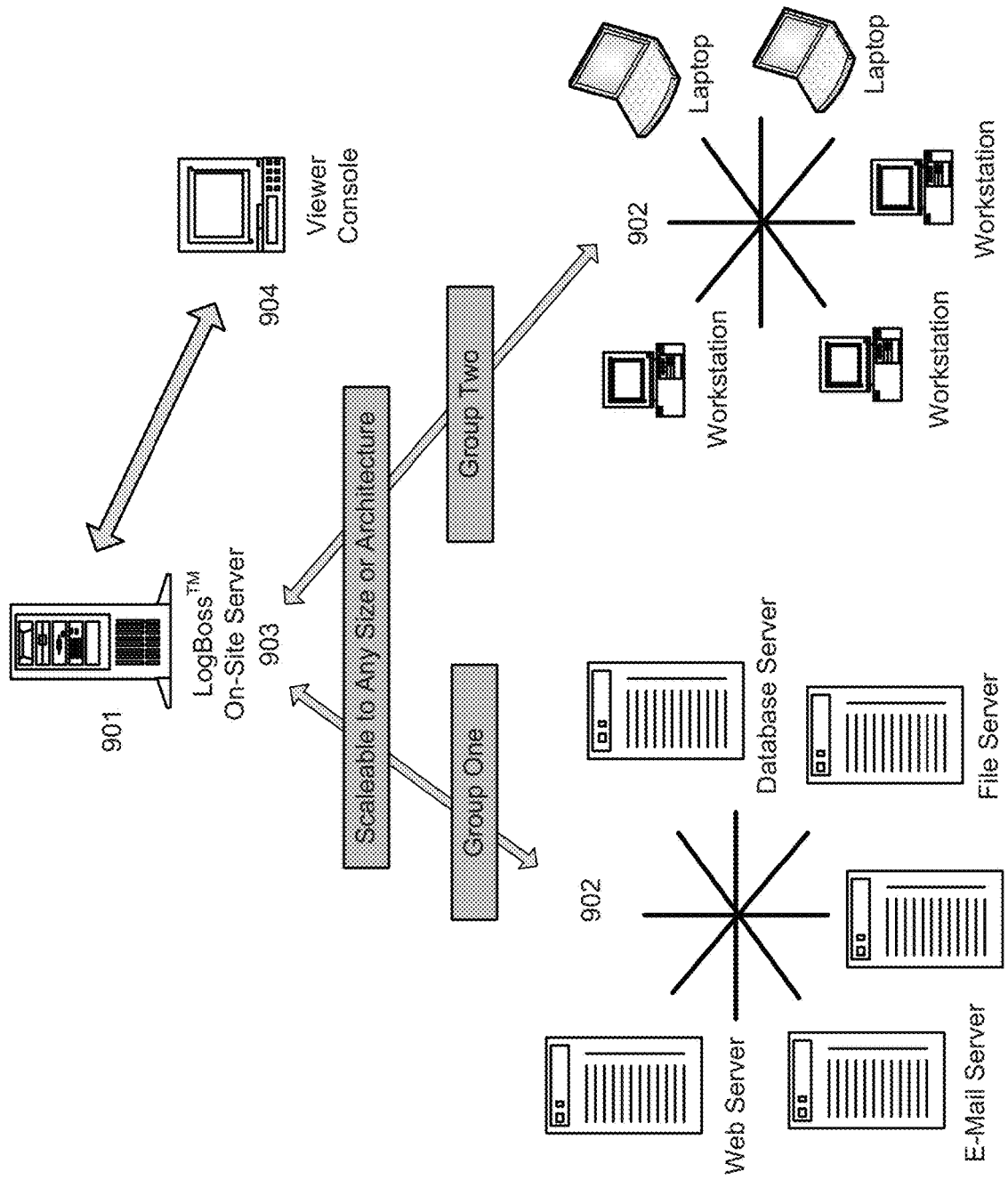
FIG. 9 shows a configured network, in accordance with one embodiment.

FIG. 9 shows a configured network, in accordance with one embodiment.

As shown in 901, the server component automatically configures the application, and the database and communicates with the client agents. In 902, client agents are deployed, which then identifies, manages, and continuously transfers all logs to the server. In 903, all client log data may be automatically archived the self-populating database, for years on end. In 904, from the centralized viewer, general, specific, or advanced cross-correlation queries may be run. See Table 7. Query and statistics data is automatically formatted into professional reports to easily document audit and compliance requirements.

TABLE 7

| Filter/Sort By: | General | Specific | Advanced |
| --- | --- | --- | --- |
| # of Computers | Any One | Any One | Any |
| # of Log Types | Any One | All | Any |
| Period of Time | Last or All | Last or All | Any |
| # of Event Detail Fields* | By ID Only | Any One | Any |

*Defined as Time/Date Written, UserID, ComputerID, EventID, Source, Type, and Category One possible embodiment provides best practice security policy templates to proactively and remotely manage and enforce enterprise security compliance policies.

Best practice and government compliance directives require higher standards of network security to protect consumer privacy and proprietary data, which must be consistently enforced, and documented with change tracking and audit trail reports for compliance verification. Therefore, a fully automated technology is provided to resolve these issues.

One embodiment offers an intelligent application to manage and enforce security policies—the first technology to fully automate the policy configuration, enforcement, and reporting processes, as described below.

In one embodiment, centralized, remote management is provided. The policy compliance and enforcement module is managed via the centralized management console—in MMC format, and automates the deployment, assessment, and enforcement of the policy chosen.

One embodiment provides standardized policies selected from many standardized policy templates recommended by NSA, SANS, US Navy, and ISO 17799, or custom policy options to formulate policies that meet the individual needs of any organization.

One possible embodiment automatically determines out-of-compliance parameters for all computers and devices on a network. Based on each client's individual policy parameter settings and configuration profile, the system's logic engine automatically reports back each client's out-of-compliance parameters.

In one embodiment, it remotely, securely, and automatically enforces policy to each computer or device. Policy changes may be automatically enforced to each computer or device individually, or by group, consistently in accordance with the policy selected by the network administrator. Policy configuration profiles are transmitted between client agent and server in an AES encrypted format for security and privacy. Policy options may be rolled back with one-click.

Automatically generates change tracking and audit trail reports. Change tracking and audit trail reports may be selected and printed from the Management Console's Reporting Center. Table 8 sets forth some possible features.

TABLE 8

Figure 10:
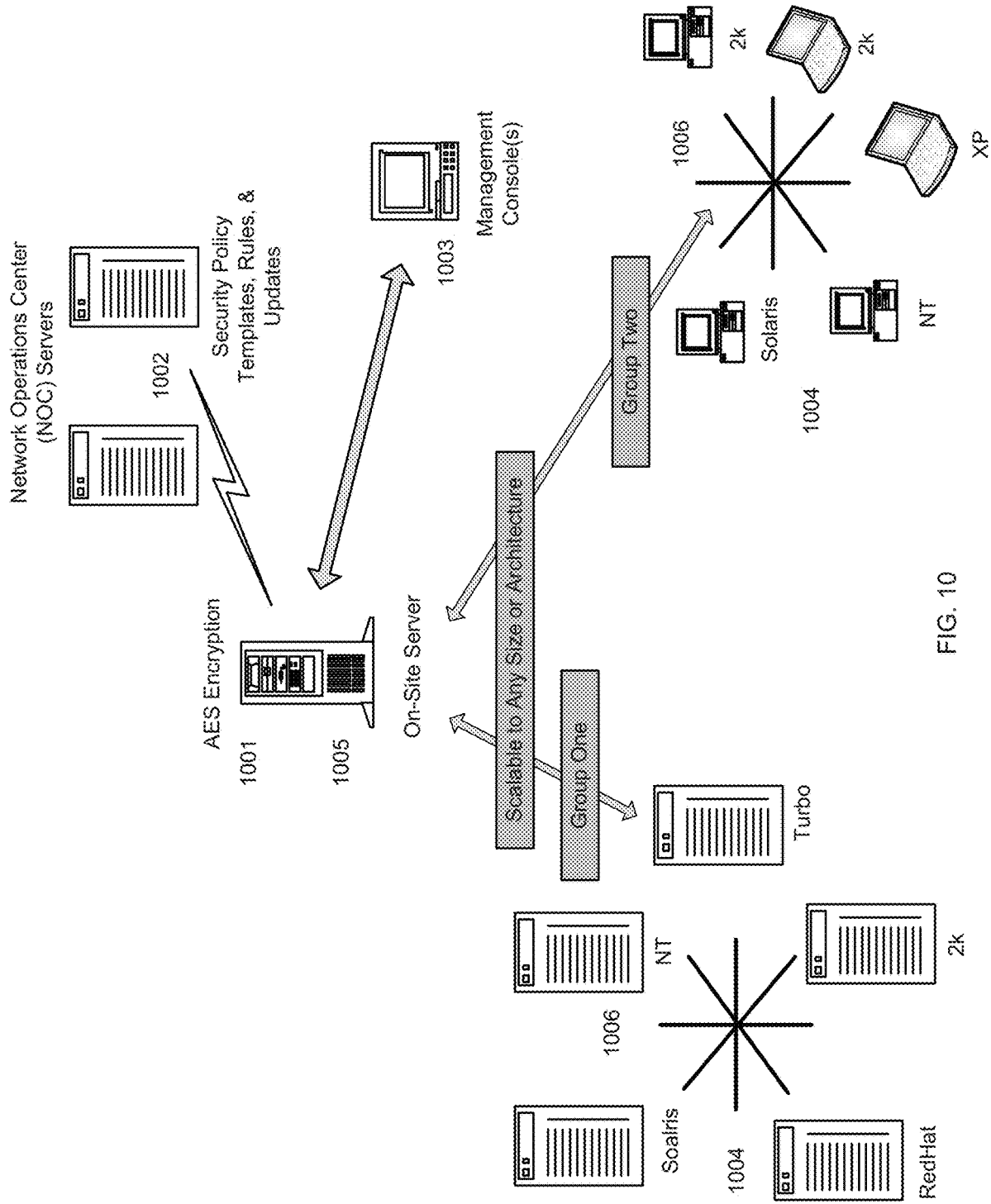
FIG. 10 shows policy compliance and enforcement, in accordance with one embodiment.

Supports Windows, UNIX variants, and network devices
Supports NSA, SANS, Navy, ISO 17799 and other standardized policies
Logic engine provides system intelligence
One-click policy rollback
Automatically generates change tracking and audit trail reports FIG. 10 shows policy compliance and enforcement, in accordance with one embodiment.

As shown in 1001, the on-site server periodically initiates communication with the off-site NOC servers. In 1002, templates, rules, and updates are pulled from the NOC servers to the on-site server. In 1003, a centralized management console offers flexible security policy templates, options, and comprehensive reporting capabilities. In 1004, agents are automatically deployed to each client, accurately identifying which policy parameters, OS, apps, and updates are applied or installed. In 1005, a logic engine automatically determines which clients are out of compliance. In 1006, appropriate policy changes are automatically enforced on each client.

In one embodiment an intelligent IPS may be provided that provides intelligence, accuracy, real-time prevention, and remote patching functions. In one embodiment, it accurately identifies and prevents malicious code from reaching their destination at the in-line IPS Sensor. Thereafter, a security officer may remotely patch the targeted vulnerability.

Conventional IDS/IPS produce an ever-increasing quantity of alert data, including erroneous and false positive data. They also lack the intelligence to identify or remediate the vulnerabilities targeted by the attack. Furthermore, the cost of the acquiring, managing, and maintaining conventional IPS is overwhelming the end user.

Therefore, a more sophisticated, intelligent technology is provided to resolve these issues, by offering an intelligent IPS to meet market requirements. The alert data output from a standard distribution of Snort is integrated with the platform via the SDK which accurately identifies attacks, and the attack is terminated at the in-line sensor—as described in the following functions.

One embodiment cross-references the threat's identifier with the target's configuration. The in-line Sensor monitors and processes traffic and sends alert data to the on-site server where its logic engine queries the backend in real-time to determine if the destination IP is vulnerable to the attack.

One possible embodiment provides enhanced flex response. If the destination IP is vulnerable to the attack, the in-line Sensor is commanded to immediately drop the exploit packets—preventing the attack. Further, it remotely remediates the vulnerability. When a machine is identified as vulnerable to an attack, an incident, a remediation function is also provided to the administrator to remotely deploy the appropriate update to the machine or device, install it, verifies the files and hashes, and documents it with change tracking and audit trail reports.

In one embodiment, attacks are accurately identified and mitigated before they reach their targets, and targeted vulnerabilities may be remotely remediated. Therefore, complex threats are more effectively and efficiently mitigated. Correspondingly, the management and maintenance burden on administrators is reduced, saving time and effort.

Table 9 illustrates some possible features.

TABLE 9

Figure 11:
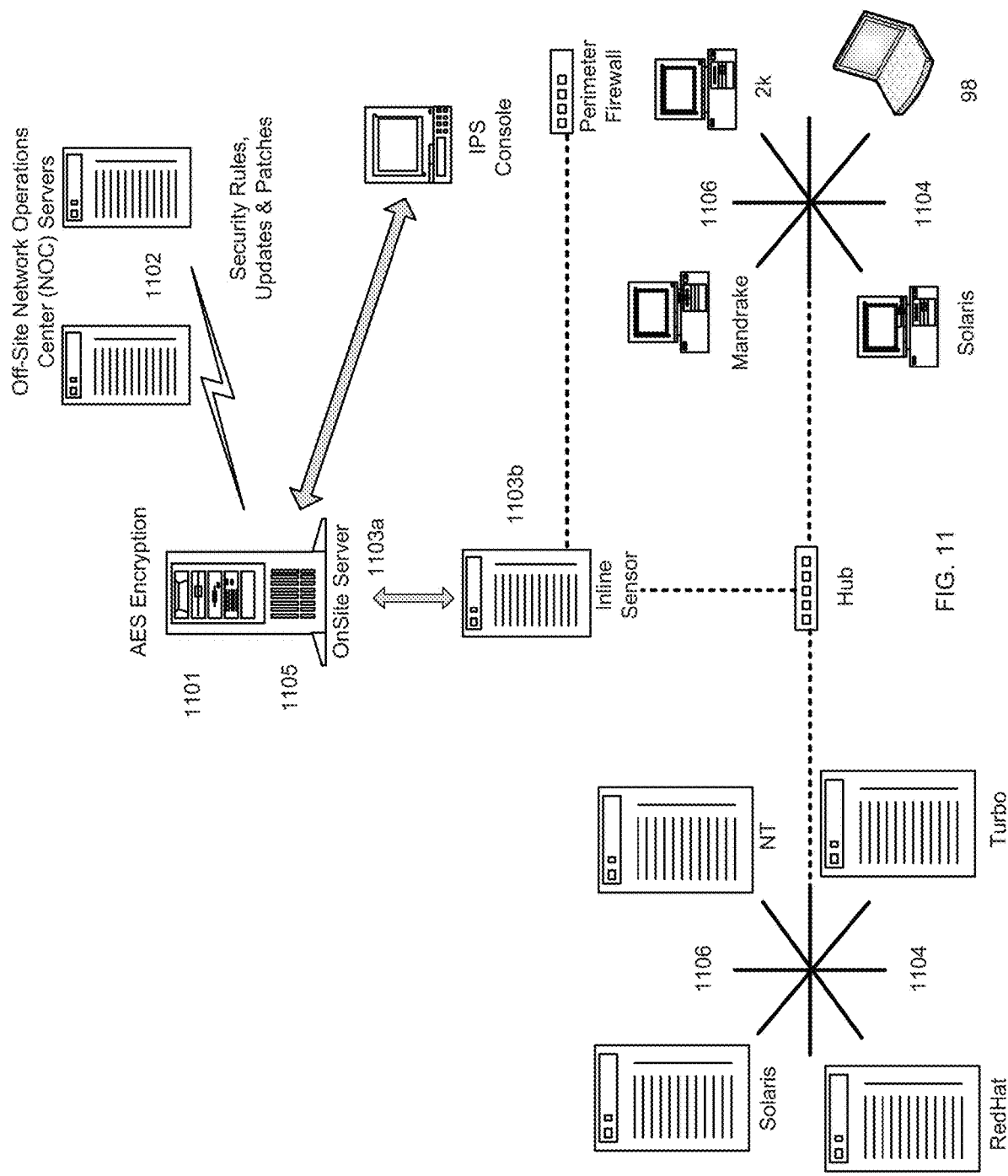
FIG. 11 illustrates an intelligent IPS, in accordance with one embodiment.

Supports Windows and UNIX variants
Determines in real-time if targeted machine is vulnerable to an attack, virtually eliminating false positives
in-line Sensor flex response terminates the attack
Remotely patches targeted vulnerabilities in one click
Installs in minutes FIG. 11 illustrates an intelligent IPS, in accordance with one embodiment.

As shown in 1101, the on-site server periodically initiates communication with the NOC servers. In 1102, updates are pulled from the NOC servers to the on-site server.

In 1103a, an IPS in-line sensor monitors and processes network traffic, and sends real time alert data to the on-site server where it cross-references the data with the backend. In 1103b, if the destination IP is vulnerable to the attack, the in-line Sensor is commanded in real-time to drop the malicious packets. As shown in 1104, agents are deployed to each client, accurately identifying which OS, apps, and updates are installed. In 1105, the logic engine automatically determines which updates are needed to remediate the targeted machine, and may be remotely deployed from the IPS console. In 1106, appropriate updates are remotely deployed, installed, and validated on each client.

In one embodiment, an anti-vulnerability SDK is provided. The SDK was designed to be a simple integration pathway to the Anti-Vulnerability platform backend. The SDK is documented and deliverable. The SDK is compatible with many different programming languages such as C, C++, VB, Java, and others.

The technology is sophisticated, yet all of the details of managing the communications are implemented in the library, requiring the developer to only learn a simple function calls as detailed hereinafter. A product architect chooses the functionality desired, inserts the provided functionality SDK code into the product code. The SDK code may then query—via the logic engine—the data warehouse, and in turn may return an answer to the point product. The architect can then show the results in any format desired in the product's interface. Full vulnerability remediation and policy compliance and enforcement functionalities may be integrated as well.

Figure 12:
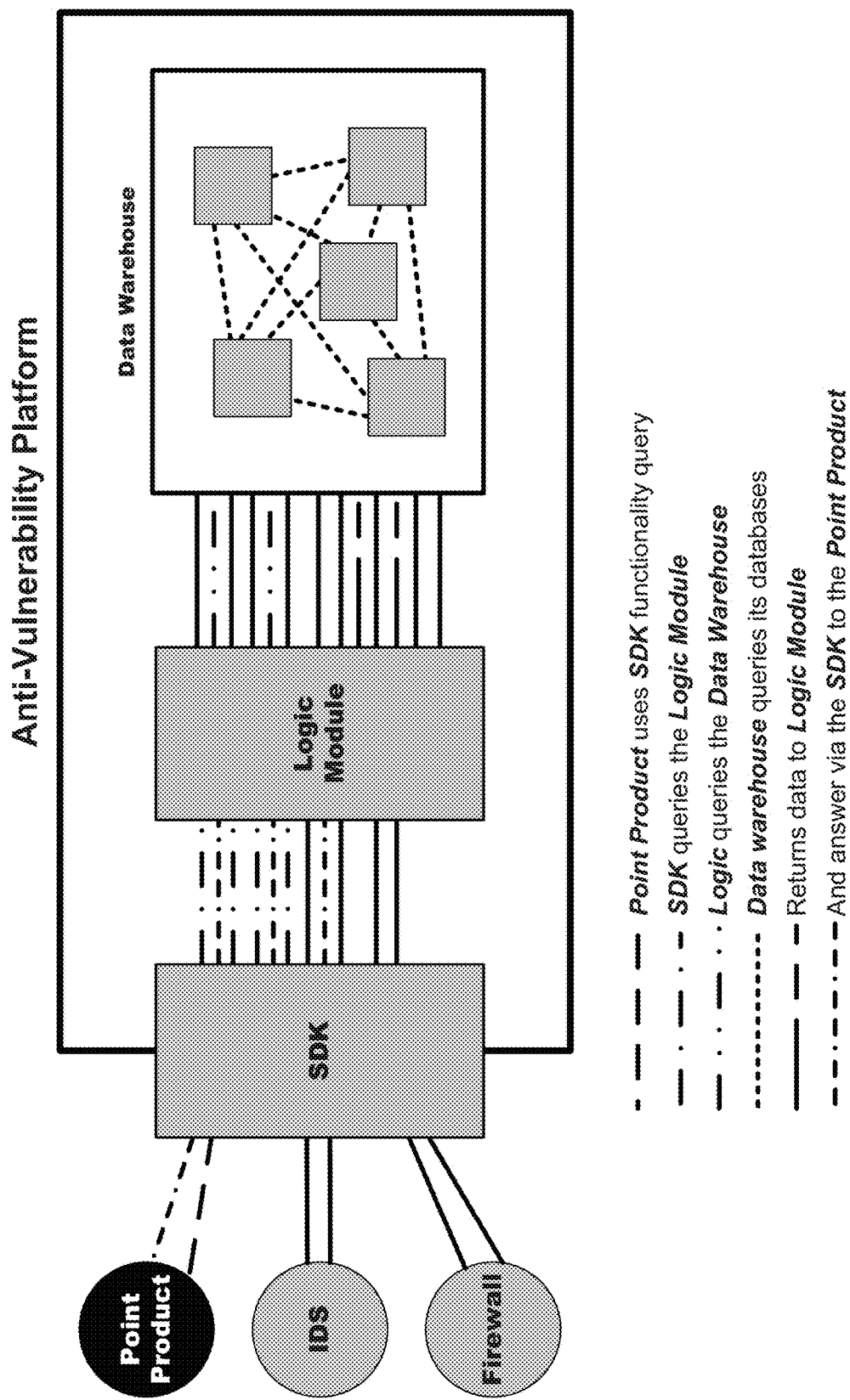
FIG. 12 illustrates an SDK function call flow, in accordance with one embodiment.

FIG. 12 illustrates an SDK function call flow, in accordance with one embodiment.

Hence, the SDK serves as the architect's tool belt or building blocks needed to quickly and transparently access the Anti-Vulnerability backend and seamlessly integrate the desired functionality into the product without changing or complicating the end user experience.

Furthermore, the SDK enables system architects to use the Anti-Vulnerability platform to integrate multiple security products and functionalities. Products may then share the same vulnerability data set, improve system automation and accuracy—increasing efficiencies and minimizing false positives and false negatives, and coordinate policy compliance and enforcement functionalities.

Anti-Vulnerability functions that are accessible via the SDK. The functions are presented in groups, as follows in Table 10.

TABLE 10

Session Management
Group Management Functions
Client Management Functions
Patch Management Functions
Polling Functions
User Management Functions
Miscellaneous Functions
Policy Compliance Functions
Session Management Functions Table 11 sets forth Session Management Functions

TABLE 11

OpenSession - Parameters: HOST name or IP address, LOGIN and PASSWORD for host
  Returns: new SESSION
  Description: This function opens a new session to the OnSite Server
CloseSession - Parameters: SESSION to close
  Returns: None
  Description: Closes a session that is no longer needed
IsSessionGood - Parameters: SESSION to test
  Returns: TRUE or FALSE
  Description: returns TRUE if the session is still valid FALSE if it is not
SUGetLastError - Parameters: None
  Returns: Error code of last error in the thread
  Description: Returns the error code of the last SDK error to occur in this thread
SUSetLastError - Parameters: ERROR code to set
  Returns: None
  Description: Sets the error code for the thread to be returned by SUGetLastError

TABLE 11-continued

GetSDKVersion - Parameters: None
  Returns: a WORD containing the version of the SDK
  Description: the MSB of the returned value is the major
  version number, the LSB is the minor version number

TABLE 11-continued

Ping - Parameters: SESSION to use, VALUE to ping with
  Returns: VALUE on success 0 on failure
  Description: attempts to pass VALUE to the OnSite Server,
  which should pass it back.

Table 12 sets forth Group Management Functions.

TABLE 12

CreateGroup - Parameters: Group NAME and Description
  Returns: GROUP that was just created or 0 on failure
  Description: This function creates a new group with the
  provided name and Description
GetGroups - Parameters: None
  Returns: A LIST of GROUPs.
  Description: This function Returns a list of all configured groups.
GetGroupsEx - Parameters: None
  Returns: A LIST of GROUPINFO structures
  Description: This function Returns a list of all configured groups' information
DeleteGroup - Parameters: GROUP to be deleted.
  Returns: Success or failure
  Description: This function permanently removes a group.
EditGroup - Parameters: GROUP to be edited, GROUPINFO to be applied
  Returns: Success or failure
  Description: This function changes a GROUP's information
GetGroupPolicyOSCategories - Parameters: GROUP to get information about
  Returns: A LIST of OPERATINGSYSYTEMCATEGORYs
  that have group policies configured
  Description: This function retrieves a list of operating system
  categories that have group policies configured
GetGroupPolicyOSSubCategories - Parameters: GROUP to get information about,
  OPERATINGSYSTEMCATEGORY to get sub category information about
  Returns: A LIST of OPERATINGSYSTEMSUBCATEGORYs
  Description: This function retrieves a list of operating system sub-categories of
  OPERATINGSYSTEMCATEGORY that have policies for the GROUP
GetGroupPolicyInfo - Parameters: GROUPPOLICY to get information about,
  GROUPPOLICYINFO pointer to receive the information
  Returns: Success or Failure
  Description: This function fills the passed GROUPPOLICYINFO structure with the
  information for the GROUPPOLICY
GetGroupPolicyInfoByOSCat - Parameters: GROUP to get information about,
  OPERATINGSYSTEMCATEGORY to get the policy for, GROUPPOLICYINFO
  pointer to receive the information
  Returns: Success or failure
  Description: This function retrieves the information for a policy for the
  OPERATINGSYSTEMCATEGORY in the GROUP
GetGroupPolicyInfoByOSSubCat - Parameters: GROUP to get information about,
  OPERATINGSYSTEMSUBCATEGORY to get the policy for, GROUPPOLICYINFO
  pointer to receive the information
  Returns: Success or failure
  Description: This function retrieves the information for a policy for the
  OPERATINGSYSTEMSUBCATEGORY in the GROUP
DeleteGroupPolicy - Parameters: GROUPPOLICY to delete
  Returns: Success or failure
  Description: This function permanently deletes the GROUPPOLICY
EditGroupPolicy - Parameters: GROUPPOLICYINFO with new information
  Returns: Success or failure
  Description: This function updates the group policy (contained in
  GROUPPOLICYINFO) with the information in GROUPPOLICYINFO
AddGroupPolicy - Parameters: GROUP to add the policy to, GROUPPOLICYINFO
  containg the policy information
  Returns: Success or Failure
  Description: This function creates a new group policy and applies it to the GROUP
GetClientsInGroup - Parameters: GROUP to retrieve the clients from
  Returns: LIST of CLIENTs belonging to the group
  Description: This function retrieves a list of clients that are members of a specific
  group
GetClientsInGroupEx - Parameters: GROUP to retrieve the clients from
  Returns: LIST of CLIENTINFOs for clients belonging to the group
  Description: This function Returns a list of CLIENTINFO structures containing
  information for the clients that belong to this group
AddClientToGroup - Parameters: CLIENT to add to a group, GROUP to add the client to.
  Returns: Success or failure
  Description: This function adds a client to a group
RemoveClientFromGroup - Parameters: CLIENT to remove from group, GROUP to
  remove the client from
  Returns: Success or failure.
  Description: This function removes a client from a group.

TABLE 12-continued

MoveClientToGroup - Parameters: CLIENT to move, GROUP to move client to
   Returns: Success or Failure
   Description: This function moves CLIENT to GROUP
GetUngroupedClients - Parameters: None
   Returns: LIST of ungrouped clients
   Description: This function Returns a LIST of the clients that do not belong to any
   group
GetUngroupedClientsEx - Parameters: None
   Returns: LIST of CLIENTINFO structures
   Description: This function Returns a LIST of CLIENTINFO structures for the clients
   that do not belong to any group
GetGroupInfo - Parameters: GROUP to get information about, GROUPINFO pointer to
   receive the information
   Returns: Success or failure
   Description: This function retrieves the information for the GROUP Table 13 sets forth Client Management Functions.

TABLE 13

GetClientInstalledSoftware - Parameters: CLIENT to get information about
   Returns: LIST of SOFTWARE installed on the client
   Description: This function retrieves a list of the software that has been
   detected on the client
GetClientInstalledSoftwareEx - Parameters: CLIENT to get information
   about
   Returns: LIST of SOFTWAREINFO for software installed on the client
   Description: This function returns a LIST of SOFTWAREINFO
   structures describing the software detected on the client
GetClientInstalledPatches - Parameters: CLIENT to get information from.
   Returns: LIST of PATCHes corresponding to the installed patches on
   the client
   Description: This function retrieves a list of patches that were
   verified as installed on the last polling
GetClientInstalledPatchesEx - Parameters: CLIENT to get information
   from
   Returns: LIST of PATCHINFO structures corresponding to the installed
   patches on the client
   Description: This function retrieves a LIST of PATCHINFO structures
   for patches that were verified as installed on the last polling
GetClientPendingPatches - Parameters: CLIENT to get information from.
   Returns: LIST of PATCHes corresponding to the pending patches for
   the client
   Description: This function returns a list of patches that the client needs
   (according to group policy) as of the last polling.
GetClientPendingPatchesEx - Parameters: CLIENT to get information
   from
   Returns: A LIST of PATCHINFO structures corresponding to the
   pending patches for the client
   Description: This function returns a LIST of PATCHINFO structures
   for patches that the client needs (according to group policy) as of the
   last polling.
GetClientPendingServicePack - Parameters: CLIENT to get information
   from
   Returns: SERVICEPACK if a service pack is pending or 0 if not
   Description: This function returns a SERVICEPACK if there is a service

TABLE 13-continued pack pending for the client (according to group policy) as of the last
   polling.
   If there is no service pack pending it returns 0
GetClientPendingSoftware - Parameters: CLIENT to get information from
   Returns: LIST of SOFTWARE that is pending
   Description: This function returns a list of software that is pending for
   the client (according to group policy) as of the last polling
GetClientLogs - Parameters: CLIENT to get information from
   Returns: LIST of LOGs for the client.
   Description: This function returns a list of logs for a particular client.
GetClientLogsEx - Parameters: CLIENT to get information from
   Returns: LIST of LOGINFO structures
   Description: This function returns a list of LOGINFO structures
   containing log entries for a particular client.
DeleteClient - Parameters: CLIENT to delete.
   Returns: Success or failure.
   Description: This function removes all information pertaining to this
   client from the SysUpdate database.
GetClientOS - Parameters: CLIENT to get information from
   Returns: OPERATINGSYSTEM installed on client
   Description: This function returns the OPERATINGSYSTEM
   installed on the client
GetClientServicePack - Parameters: CLIENT to get information from
   Returns: SERVICEPACK installed on client or 0
   Description: This function returns the service pack installed on the
   client or 0 if the client does not have a service pack installed, or if
   service packs are not applicable to the client's platform
GetClientInfo - Parameters: CLIENT to get information from
   CLIENTINFO pointer to receive the information
   Returns: Success or failure
   Description: This function fills the passed CLIENTINFO structure
   with information pertaining to the passed CLIENT
GetClientFromIP - Parameters: IP address of client
   Returns: CLIENT that corresponds to the passed IP address
   Description: This function maps IP addresses to clients Table 14 sets forth Patch Management Functions.

TABLE 14

GetPatchInfo - Parameters: PATCH to get information about, PATCHINIFO
   pointer to receive information
   Returns: Success or failure
   Description: This function fills the passed patch info structure with information about
   the passed patch
InstallPatchForClient - Parameters: CLIENT to install the patch on, PATCH to install
   Returns: Success or failure
   Description: This function deploys the patch to the client. Installation proceeds
   asynchronously
InstallPatchForGroup - Parameters: GROUP to install the patch on, PATCH to install
   Returns: Success or failure
   Description: This function deploys the patch to all clients in the group
InstallAllPendingForClient - Parameters: CLIENT to install patches on
   Returns: Success or failure
   Description: This function deploys all pending patches for a client to the client

TABLE 14-continued

InstallAllPendingForGroup - Parameters: GROUP to install patches on
   Returns: Success or failure
   Description: This function deploys all pending patches to all clients in a group
RejectPatchForClient - Parameters: CLIENT to reject patch for, PATCH to reject
   Returns: Success or failure
   Description: This function rejects a patch for a client. This patch will not be queued
   down or installed
RejectPatchForGroup - Parameters: GROUP to reject patch for, PATCH to reject
   Returns: Success or failure
   Description: This function rejects a patch for every client in a group. This patch will
   not be queued down or installed
RequeuePatchForClient - Parameters: CLIENT to requeue the patch for, PATCH to requeue
   Returns: Success or failure
   Description: This function requeues a previously rejected patch for a client
RequeuePatchForGroup - Parameters: GROUP to requeue the patch for, PATCH to requeue
   Returns: Success or failure
   Description: This function requeues a previously rejected patch for every client in a
   group
RemovePatchFromClient - Parameters: CLIENT to remove patch from, PATCH to remove
   Returns: Success or failure
   Description: This function will uninstall a patch from a client
RemovePatchFromGroup - Parameters: GROUP to remove patch from, PATCH to remove
   Returns: Success or failure
   Description: This function will uninstall a patch for every client in a group
InstallServicePackForClient - Parameters: CLIENT to install service pack on,
   SERVICEPACK to install on client
   Returns: Success or failure
   Description: This function will install a service pack on a client
InstallServicePackForGroup - Parameters: GROUP to install service pack on,
   SERVICEPACK to install
   Returns: Success or failure
   Description: This function will install a service pack on every client in a group
InstallSoftwareForClient - Parameters: CLIENT to install software update on,
   SOFTWARE to install
   Returns: Success or failure
   Description: This function will install a software update on a client
InstallSoftwareForGroup - Parameters: GROUP to install software update on,
   SOFTWARE to install
   Returns: Success or failure
   Description: This function will install a software update on every client in a group.
GetCveIDsFromPatch - Parameters: PATCH to get CveIDs from
   Returns: A LIST of CVEIDs
   Description: This function returns a list of CVEIDs the correspond to the PATCH Table 15 sets forth Polling Functions.

TABLE 15

PollClient - Parameters: CLIENT to poll
   Returns: Success or failure.
   Description: This function causes a client to be polled by the OnSite Server immediately.
PollGroup - Parameters: GROUP to poll
   Returns: Success or failure.
   Description: This function causes all the clients in a particular group to be polled immediately.
PollAll - Parameters: NONE
   Returns: Success or failure.
   Description: This function causes all clients to be polled immediately.

Table 16 sets forth User Management Functions.

TABLE 16

GetUsers - Parameters: None
   Returns: A LIST of USERs
   Description: This function returns a list of all users for the system
GetUserInfo - Parameters: USER to get information about, USERINFO pointer to
   receive the information
   Returns: Success or failure
   Description: This function populates the passed USERINFO structure with information
   about the passed USER
GetUserGroupPrivileges - Parameters: USER to get information about
   Returns: A LIST of USERGROUPPRIVILEGEs
   Description: This function returns a LIST of USERGROUPPRIVILEGES representing
   the privileges that a particular user has
GetUserGroupPrivilegesEx - Parameters: USER to get information about
   Returns: A LIST of USERGROUPPRIVILEGEINFO structures
   Description: This function returns a LIST of USERGROUPPRIVILEGEINFO
   structures representing the privileges that a particular user has

TABLE 16-continued

GetUserGroupPrivilegeInfo - Parameters: USERGROUPPRIVILEGE to get information about, USERGROUPPRIVILEGEINFO pointer to receive information
 Returns: Success or failure
 Description: This function populates the passed USERGROUPPRIVILEGEINFO structure with the details of the particular privilege
GetUserGroupPrivilegeInfoByGroup - Parameters: USER to get information about, GROUP to get information for, USERGROUPPRIVILEGEINFO pointer to populate
 Returns: Success or Failure
 Description: This function populates the passed USERGROUPPRIVILEGEINFO structure with the detailed information regarding the permissions that the passed user has on the passed group
AddUserGroupPrivilege - Parameters: USERGROUPPRIVILEGEINFO structure to add
 Returns: Success or failure
 Description: This function adds a USERGROUPPRIVILEGE
EditUserGroupPrivilege - Parameters: USERGROUPPRIVILEGEINFO with new values
 Returns: Success or failure
 Description: This function edits the USERGROUPPRIVILEGEINFO structure passed in, assign it the new values
DeleteUserGroupPrivilege - Parameters: USERGROUPPRIVILEGE to delete
 Returns: Success or failure
 Description: This function deletes the passed USERGROUPPRIVILEGE from the system
AddUser - Parameters: USERNAME, PASSWORD, and USERTYPE
 Returns: USER representing the user that was just created
 Description: This function creates a new user with the provided username, password, and type, and returns a USER representing the new user or 0 in the case of an error
DeleteUser - Parameters: USER to delete
 Returns: Success or failure
 Description: This function permanently deletes the USER from the system along with any privileges the user may have had
ChangeUserPassword - Parameters: USER to change password for, new PASSWORD
 Returns: Success or failure
 Description: This function changes the password for a user
ChangeUserRole - Parameters: USER to change role, ROLE to change to
 Returns: Success or failure
 Description: This Function changes a user's role
GetUserFromName - Parameters: USERNAME
 Returns: USER corresponding to the passed user name
 Description: This function provides a mapping from user names to USERs Table 17 sets forth Miscellaneous Functions.

TABLE 17

CreateList - Parameters: None
 Returns: A new, empty, LIST
 Description: This functions creates a new LIST that is initially empty
GetListItemEx - Parameters: LIST to retrieve item from, INDEX of item to retrieve, VOID pointer to receive item
 Returns: Success or failure
 Description: This function populates the memory pointed to by VOID with the contents of the LIST item at INDEX
GetListSize - Parameters: LIST to get the size of
 Returns: the size of the LIST
 Description: This function returns the number of elements currently in the list
AddItemToList - pointer to LIST to add the item to, LONG item to add
 Returns: None
 Description: This function adds an "item" (such as a GROUP or a CLIENT) to a LIST
AddClientInfoExToList - See AddItemToList
AddGroupInfoToList - See AddItemToList
AddPatchInfoExToList - See AddItemToList
AddSoftwareInfoToList - See AddItemToList
AddSoftwareCategoryInfoToList - See AddItemToList
AddUserGroupPrivilegeInfoExToList - See AddItemToList
RemoveItemFromList - Parameters: pointer to LIST to remove the item from, INDEX of item to remove
 Returns: None
 Description: This function removes the item at INDEX from the LIST
FreeList - LIST to deallocate
 Returns: None
 Description: This function deallocates the resources used by LIST

TABLE 17-continued

GetSoftwareInfo - Parameters: SOFTWARE to get information for, SOFTWAREINFO pointer to hold the information
 Returns: Success or failure
 Description: This function populates the SOFTWAREINFO structure pointed at with information regarding the SOFTWARE
GetLogInfo - Parameters: LOG to get information about, LOGINFO pointer to contain the information
 Returns: Success or failure
 Description: This function populates the LOGINFO structure pointed at with information regarding the LOG
GetSoftwareCategories - Parameters: None
 Returns: A LIST of SOFTWARECATEGORYs
 Description: This function returns a LIST of SOFTWARECATEGORYs
GetSoftwareCategoriesEx - Parameters: None
 Returns: A LIST of SOFTWARECATEGORYINFO structures
 Description: This function returns LIST of SOFTWARECATEGORYINFO structures for every software category known on the system
GetSoftwareCategoriesForOperatingSystemCategory - Parameters: an OPERATINGSYSTEMCATEGORY to get information for
 Returns: A LIST of SOFTWARECATEGORYs
 Description: This function returns a LIST of software categories for the passed operating system category.
GetSoftwareCategoriesForOperatingSystemCategoryEx - As above only, returning the appropriate "info" structures in the list
GetSoftwareCategoryInfo - Parameters: SOFTWARECATEGORY to get information for, SOFTWARECATEGORYIFNO pointer to contain the information
 Returns: Success or failure Table 18 sets forth Policy Compliance Functions.

These functions are provided in a separate source tree (policy tree) for the Policy Compliance and Enforcement module. Function include: Password/system access policies, log configurations, audit settings, user/group privilege rights, general service settings, service permissions, registry values, registry permissions, file permissions. It can also perform deltas on and get information about: groups, users, services, and all the "Run" registry keys.

The function calls are being integrated into the live production tree and subject to change.

TABLE 18

GetPolicyItemInfo - As GetOperatingSystemInfo
   for POLICYITEM and POLICYITEMINFO
InstallPolicyItemForClient - As InstallPatchForClient
   for POLICYITEM
InstallPolicyItemForGroup - As InstallPatchForGroup
   for POLICYITEM
InstallAllPendingPolicyItemsForClient - As
   InstallAllPendingPatchesForClient for POLICYITEM
InstallAllPendingPolicyItemsForGroup - As
   InstallAllPendingPatchesForGroup for POLICYITEM
RemovePolicyItemFromClient - As
   RemovePatchForClient for POLICYITEM
RemovePolicyItemFromGroup - As
   RemovePatchFromGroup for POLICYITEM All publications, prior applications, and other documents cited herein are hereby incorporated by reference in their entirety as if each had been individually incorporated by reference and fully set forth.

While the invention has been illustrated and described in detail in the drawings and foregoing description, the same is to be considered as illustrative and not restrictive in character, it being understood that only the preferred embodiments have been shown and described and that all changes and modifications that would occur to one skilled in the relevant art are desired to be protected.

The invention claimed is:

1. A method, comprising:
   at at least one component:
      causing addition of a first device of a plurality of devices to a first group of devices, where each device in the first group includes a first operating system and a first application;
      causing, before the first group of devices is attacked, addition of at least one first group policy to the first group of devices that causes at least one update to a first virus scanner and a first intrusion detection system installed on the first device, the at least one first group policy including, at least in part, a first already-existent policy;
      causing editing of the at least one first group policy;
      in response to a first attack being detected and prevented at the first device utilizing at least one of the first virus scanner or the first intrusion detection system, causing, in response to an administrator action, an administrator function that is different from and in addition to the prevention of the first attack;
      utilizing group management signals, causing performance of group management operations, the group management signals including at least five (5) of:
         a first group management signal for causing performance of a first group management operation to create a particular group,
         a second group management signal for causing performance of a second group management operation to retrieve a list of a plurality of different groups,
         a third group management signal for causing performance of a third group management operation to retrieve group information associated with at least one of the plurality of different groups,
         a fourth group management signal for causing performance of a fourth group management operation to delete at least one of the plurality of different groups,
         a fifth group management signal for causing performance of a fifth group management operation to edit at least one of the plurality of different groups,
         a sixth group management signal for causing performance of a sixth group management operation to add at least one group policy to at least one of the plurality of different groups,
         a seventh group management signal for causing performance of a seventh group management operation to edit the at least one group policy,
         an eighth group management signal for causing performance of an eighth group management operation to delete the at least one group policy, and
         a ninth group management signal for causing performance of a ninth group management operation to retrieve the at least one group policy;
   at at least one server:
      supporting deployment of a first client agent to the first group of devices for installing the first client agent on the first group of devices;
      causing sending, from the at least one server to the first device over at least one network, a first product upgrade to upgrade the first client agent and at least one of the first virus scanner, the first intrusion detection system, or a first firewall;
      in response to receiving a first one of a plurality of first device signals and based on the addition of the at least one first group policy to the first group of devices and the addition of the first device to the first group of devices, causing sending, from the at least one server to the first device over the at least one network, a first one of a plurality of first device-related server signals for being processed at the first device to apply the at least one first group policy at the first device;
      based on the first operating system, causing identification of a plurality of first device vulnerabilities including at least one first device vulnerability of the first operating system;
      in response to receiving a second one of the plurality of first device signals and based on the addition of the at least one first group policy to the first group of devices and the addition of the first device to the first group of devices, causing sending, from the at least one server to the first device over the at least one network, a second one of the plurality of first device-related server signals including first device vulnerability information to provide an update to be caused to be installed on the first device utilizing the first client agent for use at the first device in accordance with the at least one first group policy, the second one of the plurality of first device-related server signals including the first device vulnerability information corresponding with the first device vulnerabilities;
      receiving updated first device vulnerability information from at least one other server;

in response to receiving a third one of the plurality of first device signals and based on the addition of the at least one first group policy to the first group of devices and the addition of the first device to the first group of devices, causing sending, from the at least one server to the first device over the at least one network, a third one of the plurality of first device-related server signals including the updated first device vulnerability information to provide another update to be caused to be installed on the first device utilizing the first client agent for use at the first device in accordance with the at least one first group policy;

in response to receiving a fourth one of the plurality of first device signals and based on the editing the at least one first group policy, causing sending, from the at least one server to the first device over the at least one network, a fourth one of the plurality of first device-related server signals for being processed at the first device to apply the edited at least one first group policy at the first device;

in response to receiving a fifth one of the plurality of first device signals and based on the editing the at least one first group policy, causing sending, from the at least one server to the first device over the at least one network, a fifth one of the plurality of first device-related server signals to provide yet another update to be caused to be installed on the first device utilizing the first client agent for use at the first device in accordance with the edited at least one first group policy; and in response to receiving a sixth one of the plurality of first device signals, causing reporting of an application of the at least one first group policy at the first device;

in response to receiving a seventh one of the plurality of first device signals, causing reporting of an application of the edited at least one first group policy at the first device;

in response to receiving an eighth one of the plurality of first device signals, causing reporting of an installation of the yet another update at the first device; and at the first device with the first client agent, the first virus scanner, and the first intrusion detection system installed on the first device:

receiving, at the first device from the at least one server over the at least one network, the first product upgrade to upgrade the first client agent and at least one of the first virus scanner, the first intrusion detection system, or the first firewall;

causing sending, from the first device to the at least one server over the at least one network, the first one of the plurality of first device signals;

after sending the first one of the plurality of first device signals, receiving, at the first device from the at least one server over the at least one network, the first one of the plurality of first device-related server signals;

in response to receiving the first one of the plurality of first device-related server signals, causing processing of the first one of the plurality of first device-related server signals to apply the at least one first group policy at the first device, based on the addition of the at least one first group policy to the first group of devices and the addition of the first device to the first group of devices;

causing sending, from the first device to the at least one server over the at least one network, the second one of the plurality of first device signals;

after sending the second one of the plurality of first device signals, receiving, at the first device from the at least one server over the at least one network, the second one of the plurality of first device-related server signals including the first device vulnerability information to provide the update for use at the first device in accordance with the at least one first group policy;

in response to receiving the second one of the plurality of first device-related server signals, causing, utilizing the first client agent, installation of the update for use at the first device in accordance with the at least one first group policy;

causing sending, from the first device to the at least one server over the at least one network, the third one of the plurality of first device signals;

after sending the third one of the plurality of first device signals, receiving, at the first device from the at least one server over the at least one network, the third one of the plurality of first device-related server signals including the updated first device vulnerability information to provide the another update for use at the first device in accordance with the at least one first group policy;

in response to receiving the third one of the plurality of first device-related server signals, causing, utilizing the first client agent, installation of the another update for use at the first device in accordance with the at least one first group policy;

causing sending, from the first device to the at least one server over the at least one network, the fourth one of the plurality of first device signals;

after sending the fourth one of the plurality of first device signals, receiving, at the first device from the at least one server over the at least one network, the fourth one of the plurality of first device-related server signals;

in response to receiving the fourth one of the plurality of first device-related server signals, causing processing of the fourth one of the plurality of first device-related server signals to apply the edited at least one first group policy at the first device, based on the editing the at least one first group policy;

causing sending, from the first device to the at least one server over the at least one network, the fifth one of the plurality of first device signals;

after sending the fifth one of the plurality of first device signals, receiving, at the first device from the at least one server over the at least one network, the fifth one of the plurality of first device-related server signals to provide the yet another update for use at the first device in accordance with the edited at least one first group policy;

in response to receiving the fifth one of the plurality of first device-related server signals, causing, utilizing the first client agent, installation of the yet another update for use at the first device in accordance with the edited at least one first group policy;

identifying, utilizing the first client agent, the application of the at least one first group policy at the first device;

causing, utilizing the first client agent, sending, from the first device to the at least one server over the at least one network, the sixth one of the plurality of first device signals, for causing reporting of the application of the at least one first group policy at the first device;

identifying, utilizing the first client agent, the application of the edited at least one first group policy at the first device;

causing, utilizing the first client agent, sending, from the first device to the at least one server over the at least one network, the seventh one of the plurality of first device signals, for causing reporting of the application of the edited at least one first group policy at the first device;

identifying, utilizing the first client agent, the yet another update for use at the first device in accordance with the edited at least one first group policy;

causing, utilizing the first client agent, sending, from the first device to the at least one server over the at least one network, the eighth one of the plurality of first device signals, for causing reporting of the installation of the yet another update for use at the first device;

causing, utilizing the first client agent, identification of a first portion of the first device vulnerability information that includes virus scanner-related information that corresponds with at least one of the first device vulnerabilities;

causing, utilizing the first client agent, identification of a second portion of the first device vulnerability information that includes intrusion-related information that corresponds with at least one of the first device vulnerabilities;

causing identification of a first network traffic event in connection with the first device;

in response to identifying the first network traffic event, causing, utilizing the first intrusion detection system installed on the first device, a determination whether the at least one of the first device vulnerabilities corresponding with the intrusion-related information of the first device vulnerability information is susceptible to being taken advantage of by the first network traffic event identified in connection with the first device, utilizing the intrusion-related information of the first device vulnerability information, access to which is provided at the first device utilizing the first client agent;

in response to identifying the first network traffic event, causing, utilizing the first virus scanner installed on the first device, a determination whether the at least one of the first device vulnerabilities corresponding with the virus scanner-related information of the first device vulnerability information is susceptible to being taken advantage of by the first network traffic event identified in connection with the first device, utilizing the virus scanner-related information of the first device vulnerability information, access to which is provided at the first device utilizing the first client agent;

identifying a determination that the at least one of the first device vulnerabilities corresponding with at least one of the intrusion-related information or the virus scanner-related information of the first device vulnerability information is susceptible to being taken advantage of by the first network traffic event identified in connection with the first device; and in response to the identification of the determination that the at least one of the first device vulnerabilities corresponding with at least one of the intrusion-related information or the virus scanner-related information of the first device vulnerability information is susceptible to being taken advantage of by the first network traffic event identified in connection with the first device:

detecting the first network traffic event as the first attack, causing prevention of the first attack, and causing, utilizing the first client agent, sending, from the first device over the at least one network, a first incident signal for reporting the first attack.

2. The method of claim 1, wherein:

the first product upgrade is capable of including an upgrade to the first virus scanner and the first intrusion detection system;

the at least one update includes the update and the another update;

the administrator function is caused to be provided as an option in response to receipt of the first incident signal;

the administrator function further prevents the first attack; and the at least five (5) includes at least seven (7).

3. The method of claim 1, wherein the at least one first group policy is automatically modified in accordance with a predetermined prioritization, in response to the determination that the at least one of the first device vulnerabilities corresponding with at least one of the intrusion-related information, the virus scanner-related information, or the firewall-related information of the first device vulnerability information is susceptible to being taken advantage of by the first network traffic event identified in connection with the first device; and further comprising:

at the first device:

in response to identifying the first network traffic event, causing performance of an analysis involving a first source of the first network traffic event; and in response to receiving a result of the analysis involving the first source, conditionally causing another reaction, based on the result of the analysis involving the first source.

4. The method of claim 1, wherein:

the second one of the plurality of first device-related server signals including the first device vulnerability information is selected by the at least one server based on a content of the second one of the plurality of first device signals, where such content of the second one of the plurality of first device signals corresponds with the first operating system;

the third one of the plurality of first device-related server signals including the updated device vulnerability information is selected by the at least one server based on a content of the third one of the plurality of first device signals, where such content of the third one of the plurality of first device signals corresponds with the first operating system; and the fifth one of the plurality of first device-related server signals is selected by the at least one server based on a content of the fifth one of the plurality of first device signals, where such content of the fifth one of the plurality of first device signals corresponds with the first operating system.

5. The method of claim 1, wherein the processing of the first one of the plurality of first device-related server signals to apply the at least one first group policy at the first device and the processing of the fourth one of the plurality of first device-related server signals to apply the edited at least one first group policy at the first device, are each caused utilizing the first client agent so that the first client agent installs the at least one first group policy and the edited at least one first group policy on the first device.

6. The method of claim 1, wherein the first network traffic event includes one or more packets including data and a first destination, and further comprising:
in response to identifying the first network traffic event, causing sending, from the first device over the at least one network, a first destination signal for performing an analysis involving the first destination;
after sending the first destination signal, receiving, at the first device over the at least one network, a result of the analysis involving the first destination; and
in response to receiving the result of the analysis involving the first destination, conditionally causing a reaction, based on the result of the analysis involving the first destination.

7. The method of claim 1, wherein:
the fourth group management operation results in a fourth group management operation-related message being sent over the at least one network to the first device,
the fifth group management operation results in a fifth group management operation-related message being sent over the at least one network to the first device, and
the eighth group management operation results in an eighth group management operation-related message being sent over the at least one network to the first device, and further comprising:
at the first device:
receiving, over the at least one network, the fourth group management operation-related message for, in response thereto, processing the fourth group management operation-related message at the first device in connection with deletion of the first group of devices,
receiving, over the at least one network, the fifth group management operation-related message for, in response thereto, processing the fifth group management operation-related message at the first device in connection with editing of the first group of devices; and
receiving, over the at least one network, the eighth group management operation-related message for, in response thereto, processing the eighth group management operation-related message at the first device in connection with deletion of the at least first one group policy.

8. The method of claim 7, wherein the at least one component includes or is part of at least one of the plurality of devices including the first device of the first group of devices, and the addition of the first device, the addition of the at least one first group policy, the editing, and the administrator function are caused by signal transmission from the first device of the first group of devices.

9. The method of claim 7, wherein the at least one component includes or is part of at least one of the plurality of devices that is not in the first group of devices and therefor is not the first device, and the addition of the first device, the addition of the at least one first group policy, the editing, and the administrator function are caused by signal transmission from the at least one of the plurality of devices that is not in the first group of devices.

10. The method of claim 7, wherein:
the application of the at least one first group policy at the first device is reported, such that the reporting of the application of the at least one first group policy at the first device is accessible via the at least one component, that includes or is part of at least one of the plurality of devices that is not in the first group of devices nor includes the first device;
the application of the edited at least one first group policy at the first device is reported, such that the reporting of the application of the edited at least one first group policy at the first device is accessible via the at least one component, that includes or is part of the at least one of the plurality of devices that is not in the first group of devices nor includes the first device;
the use of the yet another update at the first device in accordance with the edited at least one first group policy is reported, such that the reporting of the use of the yet another update at the first device is accessible via the at least one component, that includes or is part of the at least one of the plurality of devices that is not in the first group of devices nor includes the first device; and
in response to receiving the sixth one of the plurality of first device signals, the application of the at least one first group policy, as edited, is performed at the first device, such that the reporting of the application of the at least one first group policy, as edited, at the first device is accessible via the at least one component, that includes or is part of the at least one of the plurality of devices that is not in the first group of devices nor includes the first device.

11. The method of claim 2, wherein:
the first intrusion detection system includes a first intrusion prevention system that includes, as part of the first intrusion prevention system, firewall capabilities;
the virus scanner-related information of the first device vulnerability information includes virus signatures utilized by the first virus scanner, and the intrusion-related information of the first device vulnerability information includes intrusion signatures utilized by the first intrusion prevention system; and further comprising:
at the first device:
causing, utilizing the first client agent, identification of a third portion of the first device vulnerability information that includes firewall-related information that corresponds with at least one of the first device vulnerabilities; and
in response to identifying the first network traffic event, causing, utilizing the first firewall, a determination whether the at least one of the first device vulnerabilities corresponding with the firewall-related information of the first device vulnerability information is susceptible to being taken advantage of by the first network traffic event identified in connection with the first device, utilizing the firewall-related information of the first device vulnerability information, access to which is provided at the first device utilizing the first client agent;
wherein:
the first device vulnerability information excludes at least a portion of potential vulnerability information that does not correspond with the first device vulnerabilities;
the first portion of the first device vulnerability information excludes other virus scanner-related information of the potential vulnerability information that does not correspond with the first device vulnerabilities;
the second portion of the first device vulnerability information excludes other intrusion-related information of the potential vulnerability information that does not correspond with the first device vulnerabilities;

the third portion of the first device vulnerability information excludes other firewall-related information of the potential vulnerability information that does not correspond with the first device vulnerabilities; and further comprising:

at the first device:
- identifying a second network traffic event in connection with the first device;
- causing a determination whether the at least one of the first device vulnerabilities corresponding with the virus scanner-related information of the first device vulnerability information that corresponds with at least one of the first device vulnerabilities is not susceptible to being taken advantage of by the second network traffic event identified in connection with the first device, utilizing the virus scanner-related information of the first device vulnerability information;
- identifying a third network traffic event in connection with the first device;
- causing a determination whether the at least one of the first device vulnerabilities corresponding with the intrusion-related information of the first device vulnerability information that corresponds with at least one of the first device vulnerabilities is not susceptible to being taken advantage of by the third network traffic event identified in connection with the first device, utilizing the intrusion-related information of the first device vulnerability information;
- identifying a fourth network traffic event in connection with the first device; and
- causing a determination whether the at least one of the first device vulnerabilities corresponding with the firewall-related information of the first device vulnerability information that corresponds with at least one of the first device vulnerabilities is not susceptible to being taken advantage of by the fourth network traffic event identified in connection with the first device, utilizing the first firewall-related information of the first device vulnerability information;

at the at least one component:
- causing addition of a second device of a plurality of devices to a second group of devices, where each device in the second group includes a second operating system and a second application;
- causing, before the second group of devices is attacked, addition of at least one second group policy to the second group of devices that causes at least one update to a second virus scanner and a second intrusion detection system installed on the second device, the at least one second group policy including, at least in part, a second already-existent policy;
- causing editing of the at least one second group policy; and
- in response to a second attack being detected and prevented at the second device utilizing at least one of the second virus scanner or the second intrusion detection system, causing, in response to an administrator action, an administrator function that is different from and in addition to the prevention of the second attack; and at the at least one server:
- supporting deployment of a second client agent to the second group of devices for installing the second client agent on the second group of devices;
- causing sending, from the at least one server to the second device over the at least one network, a second product upgrade to upgrade at least one of the second virus scanner, the second intrusion detection system, or a second firewall;
- in response to receiving a first one of a plurality of second device signals and based on the addition of the at least one second group policy to the second group of devices and the addition of the second device to the second group of devices, causing sending, from the at least one server to the second device over the at least one network, a first one of a plurality of second device-related server signals for being processed at the second device to apply the at least one second group policy at the second device;
- based on the second operating system, causing identification of a plurality of second device vulnerabilities including at least one second device vulnerability of the second operating system;
- in response to receiving a second one of the plurality of second device signals and based on the addition of the at least one second group policy to the second group of devices and the addition of the second device to the second group of devices, causing sending, from the at least one server to the second device over the at least one network, a second one of the plurality of second device-related server signals including second device vulnerability information to provide an update to be caused to be installed on the second device utilizing the second client agent for use at the second device in accordance with the at least one second group policy, the second one of the plurality of second device-related server signals including the second device vulnerability information corresponding with the second device vulnerabilities;
- receiving updated second device vulnerability information from at least one other server;
- in response to receiving a third one of the plurality of second device signals and based on the addition of the at least one second group policy to the second group of devices and the addition of the second device to the second group of devices, causing sending, from the at least one server to the second device over the at least one network, a third one of the plurality of second device-related server signals including the updated second device vulnerability information to provide another update to be caused to be installed on the second device utilizing the second client agent for use at the second device in accordance with the at least one second group policy;
- in response to receiving a fourth one of the plurality of second device signals and based on the editing the at least one second group policy, causing sending, from the at least one server to the second device over the at least one network, a fourth one of the plurality of second device-related server signals for being processed at the second device to apply the edited at least one second group policy at the second device;
- in response to receiving a fifth one of the plurality of second device signals and based on the editing the at least one second group policy, causing sending, from the at least one server to the second device over the at least one network, a fifth one of the plurality of second device-related server signals to provide yet another update to be caused to be installed on the second device utilizing the second client agent for use at the second device in accordance with the edited at least one second group policy; and in response to receiving a sixth one of the plurality of second device signals, causing reporting of an application of the at least one second group policy at the second device;

in response to receiving a seventh one of the plurality of second device signals, causing reporting of an application of the edited at least one second group policy at the second device;

in response to receiving an eighth one of the plurality of second device signals, causing reporting of an installation of the yet another update at the second device; and at the second device with the second client agent, the second virus scanner, and the second intrusion detection system installed on the second device:

receiving, at the second device from the at least one server over the at least one network, the second product upgrade to upgrade at least one of the second virus scanner, the second intrusion detection system, or the second firewall;

causing sending, from the second device to the at least one server over the at least one network, the first one of the plurality of second device signals;

after sending the first one of the plurality of second device signals, receiving, at the second device from the at least one server over the at least one network, the first one of the plurality of second device-related server signals;

in response to receiving the first one of the plurality of second device-related server signals, causing processing of the first one of the plurality of second device-related server signals to apply the at least one second group policy at the second device, based on the addition of the at least one second group policy to the second group of devices and the addition of the second device to the second group of devices;

causing sending, from the second device to the at least one server over the at least one network, the second one of the plurality of second device signals;

after sending the second one of the plurality of second device signals, receiving, at the second device from the at least one server over the at least one network, the second one of the plurality of second device-related server signals including the second device vulnerability information to provide the update for use at the second device in accordance with the at least one second group policy;

in response to receiving the second one of the plurality of second device-related server signals, causing, utilizing the second client agent, installation of the update for use at the second device in accordance with the at least one second group policy;

causing sending, from the second device to the at least one server over the at least one network, the third one of the plurality of second device signals;

after sending the third one of the plurality of second device signals, receiving, at the second device from the at least one server over the at least one network, the third one of the plurality of second device-related server signals including the updated second device vulnerability information to provide the another update for use at the second device in accordance with the at least one second group policy;

in response to receiving the third one of the plurality of second device-related server signals, causing, utilizing the second client agent, installation of the another update for use at the second device in accordance with the at least one second group policy;

causing sending, from the second device to the at least one server over the at least one network, the fourth one of the plurality of second device signals;

after sending the fourth one of the plurality of second device signals, receiving, at the second device from the at least one server over the at least one network, the fourth one of the plurality of second device-related server signals;

in response to receiving the fourth one of the plurality of second device-related server signals, causing processing of the fourth one of the plurality of second device-related server signals to apply the edited at least one second group policy at the second device, based on the editing the at least one second group policy;

causing sending, from the second device to the at least one server over the at least one network, the fifth one of the plurality of second device signals;

after sending the fifth one of the plurality of second device signals, receiving, at the second device from the at least one server over the at least one network, the fifth one of the plurality of second device-related server signals to provide the yet another update for use at the second device in accordance with the edited at least one second group policy;

in response to receiving the fifth one of the plurality of second device-related server signals, causing, utilizing the second client agent, installation of the yet another update for use at the second device in accordance with the edited at least one second group policy;

identifying, utilizing the second client agent, the application of the at least one second group policy at the second device;

causing, utilizing the second client agent, sending, from the second device to the at least one server over the at least one network, the sixth one of the plurality of second device signals, for causing reporting of the application of the at least one second group policy at the second device;

identifying, utilizing the second client agent, the application of the edited at least one second group policy at the second device;

causing, utilizing the second client agent, sending, from the second device to the at least one server over the at least one network, the seventh one of the plurality of second device signals, for causing reporting of the application of the edited at least one second group policy at the second device;

identifying, utilizing the second client agent, the yet another update for use at the second device in accordance with the edited at least one second group policy;

causing, utilizing the second client agent, sending, from the second device to the at least one server over the at least one network, the eighth one of the plurality of second device signals, for causing reporting of the installation of the yet another update for use at the second device;

causing, utilizing the second client agent, identification of a first portion of the second device vulnerability information that includes virus scanner-related information that corresponds with at least one of the second device vulnerabilities;

43 causing, utilizing the second client agent, identification of a second portion of the second device vulnerability information that includes intrusion-related information that corresponds with at least one of the second device vulnerabilities;

causing identification of a fifth network traffic event in connection with the second device;

in response to identifying the fifth network traffic event, causing, utilizing the second intrusion detection system installed on the second device, a determination whether the at least one of the second device vulnerabilities corresponding with the intrusion-related information of the second device vulnerability information is susceptible to being taken advantage of by the fifth network traffic event identified in connection with the second device, utilizing the intrusion-related information of the second device vulnerability information, access to which is provided at the second device utilizing the second client agent;

in response to identifying the fifth network traffic event, causing, utilizing the second virus scanner installed on the second device, a determination whether the at least one of the second device vulnerabilities corresponding with the virus scanner-related information of the second device vulnerability information is susceptible to being taken advantage of by the fifth network traffic event identified in connection with the second device, utilizing the virus scanner-related information of the second device vulnerability information, access to which is provided at the second device utilizing the second client agent;

in response to identifying the fifth network traffic event, causing, utilizing the second firewall, a determination whether the at least one of the second device vulnerabilities corresponding with the firewall information of the second device vulnerability information is susceptible to being taken advantage of by the fifth network traffic event identified in connection with the second device, utilizing the firewall-related information of the second device vulnerability information, access to which is provided at the second device utilizing the second client agent;

identifying a determination that the at least one of the second device vulnerabilities corresponding with at least one of the intrusion-related information, the virus scanner-related information, or the firewall-related information of the second device vulnerability information is susceptible to being taken advantage of by the fifth network traffic event identified in connection with the second device; and in response to the identification of the determination that the at least one of the second device vulnerabilities corresponding with at least one of the intrusion-related information, the virus scanner-related information, or the firewall-related information of the second device vulnerability information is susceptible to being taken advantage of by the fifth network traffic event identified in connection with the second device:
  detecting the fifth network traffic event as the second attack,
  causing prevention of the second attack, and
  causing, utilizing the second client agent, sending, from the second device over the at least one network, a second incident signal for reporting the second attack.

44

12. The method of claim 1, wherein
each of the plurality of the first device signals are sent from the first device utilizing the first client agent;
the second one of the plurality of first device-related server signals including the first device vulnerability information is selected by the at least one server based on a content of the second one of the plurality of first device signals, where such content of the second one of the plurality of first device signals corresponds with the first operating system;
the third one of the plurality of first device-related server signals including the updated device vulnerability information is selected by the at least one server based on a content of the third one of the plurality of first device signals, where such content of the third one of the plurality of first device signals corresponds with the first operating system;
the fifth one of the plurality of first device-related server signals is selected by the at least one server based on a content of the fifth one of the plurality of first device signals, where such content of the fifth one of the plurality of first device signals corresponds with the first operating system;
the processing of the first one of the plurality of first device-related server signals to apply the at least one first group policy at the first device and the processing of the fourth one of the plurality of first device-related server signals to apply the edited at least one first group policy at the first device, are each caused utilizing the first client agent so that the first client agent installs the at least one first group policy and the edited at least one first group policy on the first device;
the first network traffic event includes one or more packets including data and a first destination, and further comprising:
  in response to identifying the first network traffic event, causing sending, from the first device over the at least one network, a first destination signal for performing an analysis involving the first destination;
  after sending the first destination signal, receiving, at the first device over the at least one network, a result of the analysis involving the first destination; and
  in response to receiving the result of the analysis involving the first destination, conditionally causing a reaction, based on the result of the analysis involving the first destination;
wherein:
the fourth group management operation results in a fourth group management operation-related message being sent over the at least one network to the first device,
the fifth group management operation results in a fifth group management operation-related message being sent over the at least one network to the first device, and
the eighth group management operation results in an eighth group management operation-related message being sent over the at least one network to the first device, and further comprising:
at the first device:
  receiving, over the at least one network, the fourth group management operation-related message for, in response thereto, processing the fourth group management operation-related message at the first device in connection with deletion of the first group of devices,
  receiving, over the at least one network, the fifth group management operation-related message for, in response thereto, processing the fifth group management operation-related message at the first device in connection with editing of the first group of devices; and receiving, over the at least one network, the eighth group management operation-related message for, in response thereto, processing the eighth group management operation-related message at the first device in connection with deletion of the at least first one group policy;

wherein:

the at least one component includes or is part of at least one of the plurality of devices that is not in the first group of devices and therefor is not the first device, and the addition of the first device, the addition of the at least one first group policy, the editing, and the administrator function are caused by signal transmission from the at least one of the plurality of devices that is not in the first group of devices nor includes the first device;

the application of the at least one first group policy at the first device is reported, such that the reporting of the application of the at least one first group policy at the first device is accessible via the at least one component, that includes or is part of the at least one of the plurality of devices that is not in the first group of devices nor includes the first device;

the application of the edited at least one first group policy at the first device is reported, such that the reporting of the application of the edited at least one first group policy at the first device is accessible via the at least one component, that includes or is part of the at least one of the plurality of devices that is not in the first group of devices nor includes the first device;

the use of the yet another update at the first device in accordance with the edited at least one first group policy is reported, such that the reporting of the use of the yet another update at the first device is accessible via the at least one component, that includes or is part of the at least one of the plurality of devices that is not in the first group of devices nor includes the first device;

in response to receiving the sixth one of the plurality of first device signals, the application of the at least one first group policy, as edited, is performed at the first device, such that the reporting of the application of the at least one first group policy, as edited, at the first device is accessible via the at least one component, that includes or is part of the at least one of the plurality of devices that is not in the first group of devices nor includes the first device;

the first intrusion detection system includes a first intrusion prevention system that includes, as part of the first intrusion prevention system, firewall capabilities;

the virus scanner-related information of the first device vulnerability information includes virus signatures utilized by the first virus scanner, and the intrusion-related information of the first device vulnerability information includes intrusion signatures utilized by the first intrusion prevention system; and further comprising:

at the first device:

causing, utilizing the first client agent, identification of a third portion of the first device vulnerability information that includes firewall-related information that corresponds with at least one of the first device vulnerabilities; and in response to identifying the first network traffic event, causing, utilizing the first firewall, a determination whether the at least one of the first device vulnerabilities corresponding with the firewall-related information of the first device vulnerability information is susceptible to being taken advantage of by the first network traffic event identified in connection with the first device, utilizing the firewall-related information of the first device vulnerability information, access to which is provided at the first device utilizing the first client agent;

wherein:

the first device vulnerability information excludes at least a portion of potential vulnerability information that does not correspond with the first device vulnerabilities;

the first portion of the first device vulnerability information excludes other virus scanner-related information of the potential vulnerability information that does not correspond with the first device vulnerabilities;

the second portion of the first device vulnerability information excludes other intrusion-related information of the potential vulnerability information that does not correspond with the first device vulnerabilities;

the third portion of the first device vulnerability information excludes other firewall-related information of the potential vulnerability information that does not correspond with the first device vulnerabilities; and further comprising:

at the first device:

identifying a second network traffic event in connection with the first device;

causing a determination whether the at least one of the first device vulnerabilities corresponding with the virus scanner-related information of the first device vulnerability information that corresponds with at least one of the first device vulnerabilities is not susceptible to being taken advantage of by the second network traffic event identified in connection with the first device, utilizing the virus scanner-related information of the first device vulnerability information;

identifying a third network traffic event in connection with the first device;

causing a determination whether the at least one of the first device vulnerabilities corresponding with the intrusion-related information of the first device vulnerability information that corresponds with at least one of the first device vulnerabilities is not susceptible to being taken advantage of by the third network traffic event identified in connection with the first device, utilizing the intrusion-related information of the first device vulnerability information;

identifying a fourth network traffic event in connection with the first device; and causing a determination whether the at least one of the first device vulnerabilities corresponding with the firewall-related information of the first device vulnerability information that corresponds with at least one of the first device vulnerabilities is not susceptible to being taken advantage of by the fourth network traffic event identified in connection with the first device, utilizing the first firewall-related information of the first device vulnerability information;

at the at least one component:

causing addition of a second device of a plurality of devices to a second group of devices, where each device in the second group includes a second operating system and a second application;

causing, before the second group of devices is attacked, addition of at least one second group policy to the second group of devices that causes at least one update to a second virus scanner and a second intrusion detection system installed on the second device, the at least one second group policy including, at least in part, a second already-existent policy;

causing editing of the at least one second group policy; and in response to a second attack being detected and prevented at the second device utilizing at least one of the second virus scanner or the second intrusion detection system, causing, in response to an administrator action, an administrator function that is different from and in addition to the prevention of the second attack; and at the at least one server:

supporting deployment of a second client agent to the second group of devices for installing the second client agent on the second group of devices;

causing sending, from the at least one server to the second device over the at least one network, a second product upgrade to upgrade at least one of the second virus scanner, the second intrusion detection system, or a second firewall;

in response to receiving a first one of a plurality of second device signals and based on the addition of the at least one second group policy to the second group of devices and the addition of the second device to the second group of devices, causing sending, from the at least one server to the second device over the at least one network, a first one of a plurality of second device-related server signals for being processed at the second device to apply the at least one second group policy at the second device;

based on the second operating system, causing identification of a plurality of second device vulnerabilities including at least one second device vulnerability of the second operating system;

in response to receiving a second one of the plurality of second device signals and based on the addition of the at least one second group policy to the second group of devices and the addition of the second device to the second group of devices, causing sending, from the at least one server to the second device over the at least one network, a second one of the plurality of second device-related server signals including second device vulnerability information to provide an update to be caused to be installed on the second device utilizing the second client agent for use at the second device in accordance with the at least one second group policy, the second one of the plurality of second device-related server signals including the second device vulnerability information corresponding with the second device vulnerabilities;

receiving updated second device vulnerability information from at least one other server;

in response to receiving a third one of the plurality of second device signals and based on the addition of the at least one second group policy to the second group of devices and the addition of the second device to the second group of devices, causing sending, from the at least one server to the second device over the at least one network, a third one of the plurality of second device-related server signals including the updated second device vulnerability information to provide another update to be caused to be installed on the second device utilizing the second client agent for use at the second device in accordance with the at least one second group policy;

in response to receiving a fourth one of the plurality of second device signals and based on the editing the at least one second group policy, causing sending, from the at least one server to the second device over the at least one network, a fourth one of the plurality of second device-related server signals for being processed at the second device to apply the edited at least one second group policy at the second device;

in response to receiving a fifth one of the plurality of second device signals and based on the editing the at least one second group policy, causing sending, from the at least one server to the second device over the at least one network, a fifth one of the plurality of second device-related server signals to provide yet another update to be caused to be installed on the second device utilizing the second client agent for use at the second device in accordance with the edited at least one second group policy; and in response to receiving a sixth one of the plurality of second device signals, causing reporting of an application of the at least one second group policy at the second device;

in response to receiving a seventh one of the plurality of second device signals, causing reporting of an application of the edited at least one second group policy at the second device; and in response to receiving an eighth one of the plurality of second device signals, causing reporting of an installation of the yet another update at the second device; and at the second device with the second client agent, the second virus scanner, and the second intrusion detection system installed on the second device:

receiving, at the second device from the at least one server over the at least one network, the second product upgrade to upgrade at least one of the second virus scanner, the second intrusion detection system, or the second firewall;

causing sending, from the second device to the at least one server over the at least one network, the first one of the plurality of second device signals;

after sending the first one of the plurality of second device signals, receiving, at the second device from the at least one server over the at least one network, the first one of the plurality of second device-related server signals;

in response to receiving the first one of the plurality of second device-related server signals, causing processing of the first one of the plurality of second device-related server signals to apply the at least one second group policy at the second device, based on the addition of the at least one second group policy to the second group of devices and the addition of the second device to the second group of devices;

causing sending, from the second device to the at least one server over the at least one network, the second one of the plurality of second device signals;

after sending the second one of the plurality of second device signals, receiving, at the second device from the at least one server over the at least one network, the second one of the plurality of second device-related server signals including the second device vulnerability information to provide the update for use at the second device in accordance with the at least one second group policy;

in response to receiving the second one of the plurality of second device-related server signals, causing, utilizing the second client agent, installation of the update for use at the second device in accordance with the at least one second group policy;

causing sending, from the second device to the at least one server over the at least one network, the third one of the plurality of second device signals;

after sending the third one of the plurality of second device signals, receiving, at the second device from the at least one server over the at least one network, the third one of the plurality of second device-related server signals including the updated second device vulnerability information to provide the another update for use at the second device in accordance with the at least one second group policy;

in response to receiving the third one of the plurality of second device-related server signals, causing, utilizing the second client agent, installation of the another update for use at the second device in accordance with the at least one second group policy;

causing sending, from the second device to the at least one server over the at least one network, the fourth one of the plurality of second device signals;

after sending the fourth one of the plurality of second device signals, receiving, at the second device from the at least one server over the at least one network, the fourth one of the plurality of second device-related server signals;

in response to receiving the fourth one of the plurality of second device-related server signals, causing processing of the fourth one of the plurality of second device-related server signals to apply the edited at least one second group policy at the second device, based on the editing the at least one second group policy;

causing sending, from the second device to the at least one server over the at least one network, the fifth one of the plurality of second device signals;

after sending the fifth one of the plurality of second device signals, receiving, at the second device from the at least one server over the at least one network, the fifth one of the plurality of second device-related server signals to provide the yet another update for use at the second device in accordance with the edited at least one second group policy;

in response to receiving the fifth one of the plurality of second device-related server signals, causing, utilizing the second client agent, installation of the yet another update for use at the second device in accordance with the edited at least one second group policy;

identifying, utilizing the second client agent, the application of the at least one second group policy at the second device;

causing, utilizing the second client agent, sending, from the second device to the at least one server over the at least one network, the sixth one of the plurality of second device signals, for causing reporting of the application of the at least one second group policy at the second device;

identifying, utilizing the second client agent, the application of the edited at least one second group policy at the second device;

causing, utilizing the second client agent, sending, from the second device to the at least one server over the at least one network, the seventh one of the plurality of second device signals, for causing reporting of the application of the edited at least one second group policy at the second device;

identifying, utilizing the second client agent, the yet another update for use at the second device in accordance with the edited at least one second group policy;

causing, utilizing the second client agent, sending, from the second device to the at least one server over the at least one network, the eighth one of the plurality of second device signals, for causing reporting of the installation of the yet another update for use at the second device;

causing, utilizing the second client agent, identification of a first portion of the second device vulnerability information that includes virus scanner-related information that corresponds with at least one of the second device vulnerabilities;

causing, utilizing the second client agent, identification of a second portion of the second device vulnerability information that includes intrusion-related information that corresponds with at least one of the second device vulnerabilities;

causing identification of a fifth network traffic event in connection with the second device;

in response to identifying the fifth network traffic event, causing, utilizing the second intrusion detection system installed on the second device, a determination whether the at least one of the second device vulnerabilities corresponding with the intrusion-related information of the second device vulnerability information is susceptible to being taken advantage of by the fifth network traffic event identified in connection with the second device, utilizing the intrusion-related information of the second device vulnerability information, access to which is provided at the second device utilizing the second client agent;

in response to identifying the fifth network traffic event, causing, utilizing the second virus scanner installed on the second device, a determination whether the at least one of the second device vulnerabilities corresponding with the virus scanner-related information of the second device vulnerability information is susceptible to being taken advantage of by the fifth network traffic event identified in connection with the second device, utilizing the virus scanner-related information of the second device vulnerability information, access to which is provided at the second device utilizing the second client agent;

in response to identifying the fifth network traffic event, causing, utilizing the second firewall, a determination whether the at least one of the second device vulnerabilities corresponding with the firewall information of the second device vulnerability information is susceptible to being taken advantage of by the fifth network traffic event identified in connection with the second device, utilizing the firewall-related information of the second device vulnerability information, access to which is provided at the second device utilizing the second client agent;

identifying a determination that the at least one of the second device vulnerabilities corresponding with at least one of the intrusion-related information, the virus scanner-related information, or the firewall-related information of the second device vulnerability information is susceptible to being taken advantage of by the fifth network traffic event identified in connection with the second device; and in response to the identification of the determination that the at least one of the second device vulnerabilities corresponding with at least one of the intrusion-related information, the virus scanner-related information, or the firewall-related information of the second device vulnerability information is susceptible to being taken advantage of by the fifth network traffic event identified in connection with the second device:

detecting the fifth network traffic event as the second attack, causing prevention of the second attack, and causing, utilizing the second client agent, sending, from the second device over the at least one network, a second incident signal for reporting the second attack.

13. The method of claim 1, and further comprising:
in response to the determination that the at least one of the first device vulnerabilities corresponding with at least one of the intrusion-related information or the virus scanner-related information of the first device vulnerability information is susceptible to being taken advantage of by the first network traffic event identified in connection with the first device, automatically modifying the at least one first group policy, wherein the at least one first group policy is automatically modified, in accordance with a predetermined prioritization schedule.

14. The method of claim 1, and further comprising:
in response to the determination that the at least one of the first device vulnerabilities corresponding with at least one of the intrusion-related information or the virus scanner-related information of the first device vulnerability information is susceptible to being taken advantage of by the first network traffic event identified in connection with the first device, automatically modifying the at least one first group policy, wherein the at least one first group policy is automatically modified, by adding the first device to another group with the modified policy.

15. The method of claim 1, wherein the at least one first group policy has associated therewith a first priority that is selected based on receipt of an administrator selection and that is different from a second priority of at least one other policy, such that, based on the first priority and the second priority, at least one aspect of the at least one first group policy is applied to at least one device that is not in the first group.

16. The method of claim 1, wherein at least one of the plurality of first device-related server signals is sent by the at least one server after a first delay that is based on received administrator input, and at least one other of the plurality of first device-related server signals is sent by the at least one server after a second delay that is different from the first delay and that is based on received other administrator input.

17. The method of claim 11, where at least one of:
the at least one network includes the Internet;
the at least one component is part of the at least one server, and the addition of the first device, the addition of the at least one first group policy, the editing, and the administrator function are caused by signal receipt at the at least one server, where the at least one server causes performance of the group management operations in response to receipt, by the at least one server, of the group management signals each device in the first group includes only the first operating system and only the first application;

the at least one group policy includes the at least one first group policy;

the at least one group policy does not include the at least one first group policy;

the at least one of the plurality of different groups includes the first group;

the at least one of the plurality of different groups does not include the first group;

the group management signal is for group management by the signal being used to manage at least one aspect of a group;

the group management signal is related to group management by the signal being used to manage at least one aspect of a group;

the group management operation is for group management by the operation being to manage at least one aspect of a group;

the group management operation is related to group management by the operation being used to manage at least one aspect of a group;

the first device-related server signals are first device-related because the first device-related server signals are sent from the at least one server to the first device;

the first device signals are for the first device because the first device signals are sent from the first device to the at least one server;

the first one of a plurality of first device signals is not first in order;

the first device-related server signals is not first in order;

the first group management signal is not first in order;

the first one of a plurality of first device signals is not first in time;

the first device-related server signals is not first in time;

the first group management signal is not first in time;

the first device vulnerability information is not first in time;

the first device vulnerability information is not unique to the first device;

the first device vulnerability information is relevant to all of the first group of devices;

the first device vulnerability information includes device vulnerability information that is different from separate device vulnerability information of second device vulnerability information;

the at least one first device vulnerability of the first operating system of the plurality of first device vulnerabilities, includes the first operating system itself;

the at least one first device vulnerability of the first operating system of the plurality of first device vulnerabilities, includes a part of the first operating system;

the at least one first device vulnerability of the first operating system of the plurality of first device vulnerabilities, includes the first application itself;

at least one first device vulnerability of the first application of the plurality of first device vulnerabilities is addressed;

at least one first device vulnerability of the first application of the plurality of first device vulnerabilities is included;

at least one first device vulnerability of the first application of the plurality of first device vulnerabilities, includes a part of the first application;

the at least one component includes at least one of the plurality of devices;
the at least one component includes at least one of the plurality of devices of the first group;
the at least one component includes at least one of the plurality of devices that is not of the first group;
the at least one component is part of the at least one server;
the at least one component is not part of the at least one server;
the at least one component includes a console-equipped computer;
the at least one component includes an administrator computer;
each device in the first group includes only the first operating system and the first application;
the addition of the at least one first group policy to the first group of device, is caused before any attack on the first group of devices, by being applied at set up;
the addition of at least one first group policy to the first group of devices causes the at least one update to the first virus scanner and the first intrusion detection system installed on the first device, by the at least one update including separate updates for each of the first virus scanner and the first intrusion detection system;
the addition of at least one first group policy to the first group of devices causes the at least one update to the first virus scanner and the first intrusion detection system installed on the first device, by the at least one update including a single update including separate components for each of the first virus scanner and the first intrusion detection system;
the at least one update includes the update, the another update, and the yet another update;
the at least one update includes the update and the another update;
the update includes the first device vulnerability information;
the update includes a portion of the first device vulnerability information;
the update includes only a portion of the first device vulnerability information;
the update includes an entirety of the first device vulnerability information;
the another update includes the updated first device vulnerability information;
the another update includes a portion of the updated first device vulnerability information;
the another update includes only a portion of the updated first device vulnerability information;
the another update includes an entirety of the updated first device vulnerability information;
the yet another update includes the updated first device vulnerability information;
the yet another update includes a portion of the updated first device vulnerability information;
the yet another update includes only a portion of the updated first device vulnerability information;
the yet another update includes an entirety of the updated first device vulnerability information;
the yet another update includes additionally updated first device vulnerability information;
the yet another update includes a portion of the additionally updated first device vulnerability information;
the yet another update includes only a portion of the additionally updated first device vulnerability information;
the yet another update includes an entirety of the additionally updated first device vulnerability information;
the at least one update to the first virus scanner and the first intrusion detection system installed on the first device, includes the update, the another update, and the yet another update;
the at least one update to the first virus scanner and the first intrusion detection system installed on the first device is not part of the update, the another update, and the yet another update;
the at least one update to the first virus scanner and the first intrusion detection system installed on the first device is at least part of one or more of the update, the another update, and the yet another update;
the at least one update to the first virus scanner and the first intrusion detection system installed on the first device, is included in at least part of one or more of the update, the another update, and the yet another update, and is also included in at least part of still yet another update;
the at least one update to the first virus scanner and the first intrusion detection system installed on the first device, is sent as separate updates;
the at least one update to the first virus scanner and the first intrusion detection system installed on the first device, is sent as a single update;
the at least one update to the first virus scanner and the first intrusion detection system installed on the first device, is sent as a same update;
the at least one update to at least one of the first virus scanner or the first intrusion detection system, includes at least one of a rule, a template, a path, or a signature;
the at least one first group policy includes, in its entirety, the first already-existent policy;
the at least one first group policy does not include, in its entirety, the first already-existent policy;
the at least one first group policy includes, at least in part, the first already-existent policy, by including only a portion of the first already-existent policy;
the first already-existent policy includes a first group policy template;
the first already-existent policy is a first predetermined policy;
the first already-existent policy is a first predetermined policy that is capable of being duplicated for use;
the first already-existent policy is a first predetermined policy that is capable of being edited for use;
the first already-existent policy is a first predetermined policy option;
the first already-existent policy is a first predetermined policy option that is capable of being customized;
the editing of the at least one first group policy includes updating the at least one first group policy;
the editing of the at least one first group policy includes updating the at least one first group policy with information included with a signal;
the first attack is detected and prevented at the first device, utilizing the first virus scanner and the first intrusion detection system;
the first attack is detected and prevented at the first device, utilizing the first virus scanner;
the first attack is detected and prevented at the first device, utilizing only the first virus scanner;
the first attack is detected and prevented at the first device, utilizing the first intrusion detection system;
the first attack is detected and prevented at the first device, utilizing only the first intrusion detection system;

the first intrusion detection system is part of a first intrusion prevention system;
the first intrusion detection system is not part of a first intrusion prevention system;
the first intrusion detection system prevents attacks;
the first intrusion detection system does not prevent attacks;
the administrator function is an option for an administrator;
the administrator function includes a remediation function;
the administrator function mitigates an effect of an attack;
the administrator function includes a remediation function involving a patch;
the administrator function includes a remediation function involving an update;
the administrator function includes a patch;
the administrator function includes an update;
the administrator function includes an option;
the administrator function includes an option of an interface that is capable of being clicked by an administrator;
the administrator function is an administrator function because it caused by an administrator;
the administrator function is one of a plurality of administrator functions;
the administrator function also prevents the first attack;
the administrator function does not also prevent the first attack;
the administrator function is in addition to the prevention of the first attack, by further preventing the first attack;
the administrator function is in addition to the prevention of the first attack, by further preventing another attack like the first attack;
the administrator function is in addition to the prevention of the first attack, by further preventing another attack from a source of the first attack;
the administrator function is in addition to the prevention of the first attack, by additionally preventing the first attack after the first attack is prevented;
the administrator function is in addition to the prevention of the first attack, by additionally preventing the first attack after the first attack is initially prevented;
the administrator function is different from the prevention of the first attack, by being of a different type;
the administrator function is different from the prevention of the first attack, by being of a different type of attack prevention;
the administrator function is different from the prevention of the first attack, by preventing the first attack in a different way;
the administrator function is different from the prevention of the first attack, by preventing the first attack from happening again;
the administrator function further prevents the first attack, by removing a corresponding vulnerability;
the administrator function further prevents the first attack, by sending an update for a corresponding vulnerability;
the administrator function further prevents the first attack, by providing a patch for a corresponding vulnerability;
the administrator action is an administrator action because it is received from an administrator;
the administrator action is one of a plurality of administrator actions;
the administrator action includes a click;
the administrator action includes administrator input;

causing a creation of the first group of devices, results from the performance of the first group management operation;
the causing the addition of the first device, results from the fifth group management signal for causing performance of the fifth group management operation;
the causing the addition of the at least one first group policy, results from the sixth group management signal for causing performance of the sixth group management operation;
the causing the editing of the at least one first group policy, results from the seventh group management signal for causing performance of the seventh group management operation;
causing a creation of the first group of devices, involves the first group management signal for causing performance of the first group management operation;
the causing the addition of the first device, involves the fifth group management signal for causing performance of the fifth group management operation;
the causing the addition of the at least one first group policy, involves the sixth group management signal for causing performance of the sixth group management operation;
the causing the editing of the at least one first group policy, involves the seventh group management signal for causing performance of the seventh group management operation;
causing a creation of the first group of devices, does not involve the first group management signal for causing performance of the first group management operation;
the causing the addition of the first device, involves the fifth group management signal for causing performance of the fifth group management operation;
the causing the addition of the at least one first group policy, does not involve the sixth group management signal for causing performance of the sixth group management operation;
the causing the editing of the at least one first group policy, does not involve the seventh group management signal for causing performance of the seventh group management operation;
the group management signals are utilized via a software development kit (SDK);
each of the group management signals are used to generate a response thereto;
each of the group management operations are used to generate a response;
each of the group management signals are utilized by the at least one server;
each of the group management signals are utilized by the first device;
each of the group management signals are utilized by one of the plurality of devices other than the first device;
each of the group management signals cause performance by being utilized;
the first group management signal includes a CreateGroup function;
the first group management signal does not include a CreateGroup function;
the first group management signal provides at least one of a name or a description of the first group;
the first group management signal does not provide at least one of a name or a description of the first group;
a response to the first group management signal includes an indication of success or failure;

the first group management operation involves a CreateGroup function;
the first group management operation does not result in a CreateGroup function;
the first group management operation results in at least one of a name or a description of the first group;
the second group management signal includes a GetGroup function;
the second group management signal does not include a GetGroup function;
the second group management signal provides information on configured groups;
the second group management signal does not provide information on configured groups;
the first group is configured;
the first group management operation involves a GetGroup function;
the first group management operation does not involve a GetGroup function;
the third group management signal includes a GetGroupsEx function;
the third group management signal does not include a GetGroupsEx function;
the third group management signal provides information in a form of a list;
the third group management signal does not provide information in a form of a list;
a response to the third group management signal includes an indication of success or failure;
the third group management operation involves a GetGroupsEx function;
the third group management operation does not involve a GetGroupsEx function;
the third group management operation results in information provided in a form of a list;
the fourth group management signal includes a DeleteGroup function;
the fourth group management signal does not include a DeleteGroup function;
the fourth group management signal removes a group permanently;
the fourth group management signal does not remove a group permanently;
a response to the fourth group management signal includes an indication of success or failure;
the fourth group management operation involves a DeleteGroup function;
the fourth group management operation does not result in a DeleteGroup function;
the fourth group management operation results in a group being removed;
the fifth group management signal includes a EditGroup function;
the fifth group management signal does not include a EditGroup function;
the fifth group management signal changes members of a group;
the fifth group management signal does not change members of a group;
the fifth group management signal changes group information;
the fifth group management signal does not change group information;
the fifth group management signal changes information related to the first group;
a response to the fifth group management signal includes an indication of success or failure;
the fifth group management operation involves a CreEditGroupateGroup function;
the fifth group management operation does not result in a EditGroup function;
the fifth group management operation results in group-related information being changed;
the sixth group management signal includes an AddGroupPolicy function;
the sixth group management signal does not include an AddGroupPolicy function;
the sixth group management signal creates a new group policy;
the sixth group management signal does not create a new group policy;
the sixth group management signal creates a new group policy that did not exist prior;
the sixth group management signal creates a new group policy that did exist prior, as a template;
the first group policy includes a new group policy;
a response to the sixth group management signal includes an indication of success or failure;
the sixth group management operation involves a AddGroupPolicy function;
the sixth group management operation does not result in a AddGroupPolicy function;
the sixth group management operation results in a creation of a new group policy;
the seventh group management signal includes an EditGroupPolicy function;
the seventh group management signal does not include an EditGroupPolicy function;
the seventh group management signal updates a group policy;
the seventh group management signal updates a group policy, by changing an existing group policy;
the seventh group management signal does not update a group policy;
a response to the seventh group management signal includes an indication of success or failure;
the seventh group management operation involves a EditGroupPolicy function;
the seventh group management operation does not result in a EditGroupPolicy function;
the seventh group management operation results in an update to a group policy;
the seventh group management operation does not result in an update to a group policy;
the eighth group management signal includes an DeleteGroupPolicy function;
the eighth group management signal does not include an DeleteGroupPolicy function;
the eighth group management signal deletes a group policy;
a response to the eighth group management signal includes an indication of success or failure;
the eighth group management operation involves a DeleteGroupPolicy function;
the eighth group management operation does not result in a DeleteGroupPolicy function;
the eighth group management operation results in a deletion of a group policy;
the eighth group management operation does not result in a deletion of a group policy;
the ninth group management signal includes an GetGroupPolicyInfoByOSCat function;
the ninth group management signal does not include an GetGroupPolicyInfoByOSCat function;

the ninth group management signal retrieves information for a group policy;

a response to the ninth group management signal includes an indication of success or failure;

the ninth group management operation involves a GetGroupPolicyInfoByOSCat function;

the ninth group management operation does not result in a GetGroupPolicyInfoByOSCat function;

the ninth group management operation results in retrieval of information for a group policy;

the ninth group management operation does not result in retrieval of information for a group policy;

the ninth group management signal includes an GetGroupPolicyInfoByOSSubCat function;

the ninth group management signal does not include an GetGroupPolicyInfoByOSSubCat function;

the ninth group management operation involves a GetGroupPolicyInfoByOSSubCat function;

the ninth group management operation does not result in a GetGroupPolicyInfoByOSSubCat function;

the ninth group management operation results in categorized information;

the ninth group management operation results in providing information that is categorized;

the at least one server includes a first server that performs some functionality, and a second server that performs other functionality;

the at least one server includes a single server;

the at least one network includes multiple networks;

the at least one network includes a single network;

the at least one network does not include a single network;

the over the at least one network includes over a single network;

the over the at least one network includes over a first network for at least one of the plurality of device signals and over a second network for another one of the plurality of device signals;

the over the at least one network includes over a same network for all of the plurality of device signals;

the over the at least one network includes over a single network for all of the plurality of device signals;

the over the at least one network does not include over a same network for all of the plurality of device signals;

the over the at least one network does not include over a single network for all of the plurality of device signals;

the at least one network includes a first network for sending or receiving a first subset of the plurality of device signals, and a second network for sending or receiving a second subset of the plurality of device signals that is different from the first subset;

the over the at least one network includes over a single network;

the over the at least one network includes over a first network for at least one of the plurality of first device-related server signals and over a second network for another one of the plurality of first device-related server signals;

the over the at least one network includes over a same network for all of the plurality of first device-related server signals;

the over the at least one network includes over a single network for all of the plurality of first device-related server signals;

the over the at least one network does not include over a same network for all of the plurality of first device-related server signals;

the over the at least one network does not include over a single network for all of the plurality of first device-related server signals;

the at least one network includes a first network for sending or receiving a first subset of the plurality of first device-related server signals, and a second network for sending or receiving a second subset of the plurality of first device-related server signals that is different from the first subset;

the deployment of the first client agent is supported by the at least one server, by the at least one server controlling the deployment;

the deployment of the first client agent is supported by the at least one server, by the at least one server administering the deployment;

the deployment of the first client agent is supported by the at least one server, by the at least one server tracking the deployment;

the deployment of the first client agent is supported by the at least one server, by the at least one server communicating with the first client agent;

the deployment of the first client agent is supported by the at least one server, by the at least one server being capable of supporting reporting of the deployment;

the deployment of the first client agent is for installing the first client agent;

the deployment of the first client agent is supported for installing the first client agent;

the support of the deployment of the first client agent is for installing the first client agent;

at least a subset plurality of the plurality of first device signals each includes another instance of a same one of the plurality of first device signals;

at least a subset plurality of the plurality of first device signals each includes another identical instance of a same one of the plurality of first device signals;

at least a subset plurality of the plurality of first device signals each includes different signals;

at least a subset plurality of the plurality of first device signals each includes different commands;

at least a subset plurality of the plurality of first device signals each includes different functions;

each of the plurality of first device signals includes another instance of a same one of the plurality of first device signals;

each of the plurality of first device signals includes different signals;

each of the plurality of first device signals includes different commands;

each of the plurality of first device signals includes different functions;

each of the plurality of first device signals includes a different purpose;

at least a subset plurality of the plurality of first device-related server signals each includes another instance of a same one of the plurality of first device-related server signals;

at least a subset of the plurality of first device-related server signals each includes another identical instance of a same one of the plurality of first device-related server signals;

at least a subset plurality of the plurality of first device-related server signals each includes different signals;

at least a subset plurality of the plurality of first device-related server signals each includes different commands;

at least a subset plurality of the plurality of first device-related server signals each includes different functions;
each of the plurality of first device-related server signals includes another instance of a same one of the plurality of first device-related server signals;
each of the plurality of first device-related server signals includes different signals;
each of the plurality of first device-related server signals includes different commands;
each of the plurality of first device-related server signals includes different functions;
each of the plurality of first device-related server signals includes a different purpose;
at least a subset plurality of the plurality of first device-related server signals each include identical instances of a same first device-related server signal, that are each responsive to different ones of the plurality of first device signals;
each of the plurality of first device-related server signals each include one of a plurality of identical instances of a same first device-related server signal, that are each responsive to a same one of the plurality of first device signals;
at least one of the plurality of first device signals includes a plurality of parts;
at least one of the plurality of first device signals includes a single part;
at least one of the plurality of first device signals includes a single signal;
at least one of the plurality of first device-related server signals includes a plurality of parts;
at least one of the plurality of first device-related server signals includes a single part;
at least one of the plurality of first device-related server signals includes a single signal;
at least a subset of the plurality of first device signals results in at least one of the plurality of first device-related server signals being sent to each of devices of the first group;
at least a subset of the plurality of first device signals results in at least one of the plurality of first device-related server signals being sent to only the first device;
at least a subset of the plurality of first device signals do not result in at least one of the plurality of first device-related server signals being sent to each of devices of the first group;
at least a subset of the plurality of first device signals do not result in at least one of the plurality of first device-related server signals being sent to only the first device;
at least one of the first, second, third, fourth, or fifth one of the plurality of first device-related server signals includes a single signal;
at least one of the first, second, third, fourth, or fifth one of the plurality of first device-related server signals includes multiple sub-signals;
each of the plurality of the first device signals are not different instances of a same signal;
each of the plurality of the first device signals are different instances of a same type of signal;
each of the plurality of the first device signals are different instances of a same type of signal, including a group management signal;
each of the plurality of the first device signals are periodic;
each of the plurality of the first device signals are not periodic;
each of the plurality of the first device signals do not involve a poll;
each of the plurality of the first device signals are sent from the first client agent on the first device;
each of the plurality of the first device signals are not sent from a point product on the first device;
each of the plurality of the first device signals are sent from a point product on the first device;
the first one of the plurality of first device signals includes one of: InstallPolicyItemForGroup, InstallAllPendingPolicyItemsForGroup, InstallPolicyItemForClient, or InstallAllPendingPolicyItemsForClient;
the first one of the plurality of first device signals includes InstallPolicyItemForGroup;
the first one of the plurality of first device signals includes InstallAllPendingPolicyItemsForGroup;
the first one of the plurality of first device signals includes InstallPolicyItemForClient;
the first one of the plurality of first device signals includes InstallAllPendingPolicyItemsForClient;
the first one of the plurality of first device signals includes a click-prompted signal;
the first one of the plurality of first device signals is part of a click-prompted signal;
the first one of the plurality of first device signals includes a log;
the first one of the plurality of first device signals is part of a log;
the first one of the plurality of first device signals includes a poll;
the first one of the plurality of first device signals is part of a poll;
the first one of the plurality of first device signals includes a poll-responsive signal;
the first one of the plurality of first device signals is part of a poll-responsive signal;
the first one of the plurality of first device signals includes a query result;
the first one of the plurality of first device signals is part of a query result;
the first one of the plurality of first device signals includes a verification;
the first one of the plurality of first device signals is part of a verification;
the first one of the plurality of first device signals includes a profile;
the first one of the plurality of first device signals is part of a profile;
the first one of the plurality of first device signals includes the first device vulnerability information;
the first one of the plurality of first device signals is part of the first device vulnerability information;
the first one of the plurality of first device signals is not part of nor includes a log, query response, a verification, a poll, a poll-responsive signal, a profile, nor the first device vulnerability information;
the first one of the plurality of first device-related server signals includes a response to one of: InstallPolicyItemForGroup, InstallAllPendingPolicyItemsForGroup, InstallPolicyItemForClient, or InstallAllPendingPolicyItemsForClient;
the first one of the plurality of first device-related server signals includes a response to InstallPolicyItemForGroup;
the first one of the plurality of first device-related server signals includes a response to InstallAllPendingPolicyItemsForGroup;

the first one of the plurality of first device-related server signals includes a response to InstallPolicyItemForClient;

the first one of the plurality of first device-related server signals includes a response to InstallAllPendingPolicyItemsForClient;

the first one of the plurality of first device-related server signals includes a response to one of: a log, a query response, a verification, a poll, a poll-responsive signal, a profile, a click-prompted signal, or first device vulnerability information;

the first one of the plurality of first device-related server signals does not include a response to one of: a log, a query response, a verification, a poll, a poll-responsive signal, a profile, a click-prompted signal, or first device vulnerability information;

the first one of the plurality of first device signals is received from the first device and the first one of the plurality of first device-related server signals is sent to each of the devices in the first group, including the first device;

the first one of the plurality of first device signals is capable of being also received from a particular device that is not in the first group, and the first one of the plurality of first device-related server signals is sent to each of the devices in the first group, including the first device;

the second one of the plurality of first device signals includes one of: InstallSoftwareForGroup, InstallSoftwareForClient, InstallPatchForClient, InstallPatchForGroup, InstallAllPendingForClient, or InstallAllPendingForGroup;

the second one of the plurality of first device signals includes InstallSoftwareForGroup;

the second one of the plurality of first device signals includes InstallSoftwareForClient;

the second one of the plurality of first device signals includes InstallPatchForClient;

the second one of the plurality of first device signals includes InstallPatchForGroup;

the second one of the plurality of first device signals includes InstallAllPendingForClient;

the second one of the plurality of first device signals includes InstallAllPendingForGroup;

the second one of the plurality of first device signals includes a click-prompted signal;

the second one of the plurality of first device signals is part of a click-prompted signal;

the second one of the plurality of first device signals includes a log;

the second one of the plurality of first device signals is part of a log;

the second one of the plurality of first device signals includes a poll;

the second one of the plurality of first device signals is part of a poll;

the second one of the plurality of first device signals includes a poll-responsive signal;

the second one of the plurality of first device signals is part of a poll-responsive signal;

the second one of the plurality of first device signals includes a verification;

the second one of the plurality of first device signals is part of a verification;

the second one of the plurality of first device signals includes a query result;

the second one of the plurality of first device signals is part of a query result;

the second one of the plurality of first device signals includes a profile;

the second one of the plurality of first device signals is part of a profile;

the second one of the plurality of first device signals includes the first device vulnerability information;

the second one of the plurality of first device signals is part of the first device vulnerability information;

the second one of the plurality of first device signals is not part of nor includes a log, query response, a verification, a poll, a poll-responsive signal, a profile, nor the first device vulnerability information;

the second one of the plurality of first device-related server signals is responsive to one of: InstallSoftwareForGroup, InstallSoftwareForClient, InstallPatchForClient, InstallPatchForGroup, InstallAllPendingForClient, or InstallAllPendingForGroup;

the second one of the plurality of first device-related server signals is responsive to InstallSoftwareForGroup;

the second one of the plurality of first device-related server signals is responsive to InstallSoftwareForClient;

the second one of the plurality of first device-related server signals is responsive to InstallPatchForClient;

the second one of the plurality of first device-related server signals is responsive to InstallPatchForGroup;

the second one of the plurality of first device-related server signals is responsive to InstallAllPendingForClient;

the second one of the plurality of first device-related server signals is responsive to InstallAllPendingForGroup;

the second one of the plurality of first device-related server signals is responsive to a click-prompted signal;

the second one of the plurality of first device-related server signals is responsive to at least one of a log, a poll, or a poll-responsive signal;

the second one of the plurality of first device-related server signals is responsive to a query response;

the second one of the plurality of first device-related server signals is responsive to a verification;

the second one of the plurality of first device-related server signals is responsive to a profile;

the second one of the plurality of first device-related server signals is responsive to the first device vulnerability information;

the second one of the plurality of first device-related server signals is not responsive to a log, a profile, a query response, a poll, a poll-responsive signal, a verification, nor the first device vulnerability information;

the second one of the plurality of first device signals is received from the first device and the second one of the plurality of first device-related server signals is sent to each of the devices in the first group, including the first device;

the second one of the plurality of first device signals is capable of being also received from a particular device that is not in the first group, and the second one of the plurality of first device-related server signals is sent to each of the devices in the first group, including the first device;

the third one of the plurality of first device signals includes one of: InstallSoftwareForGroup, InstallSoftwareForClient, InstallPatchForClient, InstallPatchForGroup, InstallAllPendingForClient, or InstallAllPendingForGroup;

the third one of the plurality of first device signals includes InstallSoftwareForGroup;

the third one of the plurality of first device signals includes InstallSoftwareForClient;

the third one of the plurality of first device signals includes InstallPatchForClient;

the third one of the plurality of first device signals includes InstallPatchForGroup;

the third one of the plurality of first device signals includes InstallAllPendingForClient;

the third one of the plurality of first device signals includes InstallAllPendingForGroup;

the third one of the plurality of first device signals includes a click-prompted signal;

the third one of the plurality of first device signals is part of a click-prompted signal;

the third one of the plurality of first device signals includes a log;

the third one of the plurality of first device signals is part of a log;

the third one of the plurality of first device signals includes a poll;

the third one of the plurality of first device signals is part of a poll;

the third one of the plurality of first device signals includes a poll-responsive signal;

the third one of the plurality of first device signals is part of a poll-responsive signal;

the third one of the plurality of first device signals includes a query response;

the third one of the plurality of first device signals is part of a query response;

the third one of the plurality of first device signals includes a verification;

the third one of the plurality of first device signals is part of a verification;

the third one of the plurality of first device signals includes a profile;

the third one of the plurality of first device signals is part of a profile;

the third one of the plurality of first device signals includes the first device vulnerability information;

the third one of the plurality of first device signals is part of the first device vulnerability information;

the third one of the plurality of first device signals is not part of nor includes a log, a query response, a verification, a poll, a poll-responsive signal, a profile, nor the first device vulnerability information;

the third one of the plurality of first device-related server signals is responsive to one of: InstallSoftwareForGroup, InstallSoftwareForClient, InstallPatchForClient, InstallPatchForGroup, InstallAllPendingForClient, or InstallAllPendingForGroup;

the third one of the plurality of first device-related server signals is responsive to InstallSoftwareForGroup;

the third one of the plurality of first device-related server signals is responsive to InstallSoftwareForClient;

the third one of the plurality of first device-related server signals is responsive to InstallPatchForClient;

the third one of the plurality of first device-related server signals is responsive to InstallPatchForGroup;

the third one of the plurality of first device-related server signals is responsive to InstallAllPendingForClient;

the third one of the plurality of first device-related server signals is responsive to InstallAllPendingForGroup;

the third one of the plurality of first device-related server signals is responsive to a click-prompted signal;

the third one of the plurality of first device-related server signals is responsive to a log;

the third one of the plurality first device-related server signals is responsive to a profile;

the third one of the plurality of first device-related server signals is responsive to a query response;

the third one of the plurality of first device-related server signals is responsive to a verification;

the third one of the plurality of first device-related server signals is responsive to the first device vulnerability information;

the third one of the plurality of first device-related server signals is not responsive to a log, a query response, a verification, a poll, a poll-responsive signal, a profile, nor the first device vulnerability information;

the third one of the plurality of first device signals is received from the first device and the third one of the plurality of first device-related server signals is sent to each of the devices in the first group, including the first device;

the third one of the plurality of first device signals is capable of being also received from a particular device that is not in the first group, and the third one of the plurality of first device-related server signals is sent to each of the devices in the first group, including the first device;

the fourth one of the plurality of first device signals includes one of: InstallPolicyItemForGroup, InstallAllPendingPolicyItemsForGroup, InstallPolicyItemForClient, or InstallAllPendingPolicyItemsForClient;

the fourth one of the plurality of first device signals includes InstallPolicyItemForGroup;

the fourth one of the plurality of first device signals includes InstallAllPendingPolicyItemsForGroup;

the fourth one of the plurality of first device signals includes InstallPolicyItemForClient;

the fourth one of the plurality of first device signals includes InstallAllPendingPolicyItemsForClient;

the fourth one of the plurality of first device signals includes a log;

the fourth one of the plurality of first device signals is part of a log;

the fourth one of the plurality of first device signals includes a poll;

the fourth one of the plurality of first device signals is part of a poll;

the fourth one of the plurality of first device signals includes a poll-responsive signal;

the fourth one of the plurality of first device signals is part of a poll-responsive signal;

the fourth one of the plurality of first device signals includes a query response;

the fourth one of the plurality of first device signals is part of a query response;

the fourth one of the plurality of first device signals includes a verification;

the fourth one of the plurality of first device signals is part of a verification;

the fourth one of the plurality of first device signals includes a profile;

the fourth one of the plurality of first device signals is part of a profile;

the fourth one of the plurality of first device signals includes the first device vulnerability information;

the fourth one of the plurality of first device signals is part of the first device vulnerability information;

the fourth one of the plurality of first device signals is not part of nor includes a log, query response, a verification, a poll, a poll-responsive signal, a profile, nor the first device vulnerability information;

the fourth one of the plurality of first device-related server signals includes a response to one of: InstallPolicyItemForGroup, InstallAllPendingPolicyItemsForGroup, InstallPolicyItemForClient, or InstallAllPendingPolicyItemsForClient;

the fourth one of the plurality of first device-related server signals includes a response to InstallPolicyItemForGroup;

the fourth one of the plurality of first device-related server signals includes a response to InstallAllPendingPolicyItemsForGroup;

the fourth one of the plurality of first device-related server signals includes a response to InstallPolicyItemForClient;

the fourth one of the plurality of first device-related server signals includes a response to InstallAllPendingPolicyItemsForClient;

the fourth one of the plurality of first device-related server signals includes a response to one of: a log, a query response, a verification, a poll, a poll-responsive signal, a profile, or first device vulnerability information;

the fourth one of the plurality of first device-related server signals does not include a response to one of: a log, a query response, a verification, a poll, a poll-responsive signal, a profile, or first device vulnerability information;

the fourth one of the plurality of first device signals is received from the first device, and the fourth one of the plurality of first device-related server signals is sent to each of the devices in the first group, including the first device;

the fourth one of the plurality of first device signals is capable of being also received from a particular device that is not in the first group, and the fourth one of the plurality of first device-related server signals is sent to each of the devices in the first group, including the first device;

the first and fourth one of the plurality of first device signals are different instances of the same signal;

the first and fourth one of the plurality of first device signals are different signals;

the fifth one of the plurality of first device signals includes one of: InstallSoftwareForGroup, InstallSoftwareForClient, InstallPatchForClient, InstallPatchForGroup, InstallAllPendingForClient, or InstallAllPendingForGroup;

the fifth one of the plurality of first device signals includes InstallSoftwareForGroup;

the fifth one of the plurality of first device signals includes InstallSoftwareForClient;

the fifth one of the plurality of first device signals includes InstallPatchForClient;

the fifth one of the plurality of first device signals includes InstallPatchForGroup;

the fifth one of the plurality of first device signals includes InstallAllPendingForClient;

the fifth one of the plurality of first device signals includes InstallAllPendingForGroup;

the fifth one of the plurality of first device signals includes a click-prompted signal;

the fifth one of the plurality of first device signals is part of a click-prompted signal;

the fifth one of the plurality of first device signals includes a log;

the fifth one of the plurality of first device signals is part of a log;

the fifth one of the plurality of first device signals includes a poll;

the fifth one of the plurality of first device signals is part of a poll;

the fifth one of the plurality of first device signals includes a poll-responsive signal;

the fifth one of the plurality of first device signals is part of a poll-responsive signal;

the fifth one of the plurality of first device signals includes a query response;

the fifth one of the plurality of first device signals is part of a query response;

the fifth one of the plurality of first device signals includes a verification;

the fifth one of the plurality of first device signals is part of a verification;

the fifth one of the plurality of first device signals includes a profile;

the fifth one of the plurality of first device signals is part of a profile;

the fifth one of the plurality of first device signals includes the first device vulnerability information;

the fifth one of the plurality of first device signals is part of the first device vulnerability information;

the fifth one of the plurality of first device signals is not part of nor includes a log, a query response, a verification, a poll, a poll-responsive signal, a profile, nor the first device vulnerability information;

the fifth one of the plurality of first device-related server signals is responsive to one of: InstallSoftwareForGroup, InstallSoftwareForClient, InstallPatchForClient, InstallPatchForGroup, InstallAllPendingForClient, or InstallAllPendingForGroup;

the fifth one of the plurality of first device-related server signals is responsive to InstallSoftwareForGroup;

the fifth one of the plurality of first device-related server signals is responsive to InstallSoftwareForClient;

the fifth one of the plurality of first device-related server signals is responsive to InstallPatchForClient;

the fifth one of the plurality of first device-related server signals is responsive to InstallPatchForGroup;

the fifth one of the plurality of first device-related server signals is responsive to InstallAllPendingForClient;

the fifth one of the plurality of first device-related server signals is responsive to InstallAllPendingForGroup;

the fifth one of the plurality of first device-related server signals is responsive to a click-prompted signal;

the fifth one of the plurality of first device-related server signals is responsive to at leas one of a log, a poll, or a poll-responsive signal;

the fifth one of the plurality of first device-related server signals is responsive to a query response;

the fifth one of the plurality of first device-related server signals is responsive to a verification;

the fifth one of the plurality first device-related server signals is responsive to a profile;

the fifth one of the plurality of first device-related server signals is responsive to the first device vulnerability information;

the fifth one of the plurality of first device-related server signals is not responsive to a log, a profile, a query response, a poll, a poll-responsive signal, a verification, nor the first device vulnerability information;

the fifth one of the plurality of first device signals is received from the first device and the fifth one of the plurality of first device-related server signals is sent to each of the devices in the first group, including the first device;

the fifth one of the plurality of first device-related server signals is capable of being also received from a particular device that is not in the first group, and the fifth one of the plurality of first device-related server signals is sent to each of the devices in the first group, including the first device;

the second, third and fifth one of the plurality of first device signals are different instances of the same signal;

the second, third and fifth one of the plurality of first device signals are different signals;

the sixth one of the plurality of first device signals includes one of: GetGroupPolicyInfo, GetGroupPolicyInfoByOSCat, or GetGroupPolicyInfoByOSSubCat;

the sixth one of the plurality of first device signals includes GetGroupPolicyInfo;

the sixth one of the plurality of first device signals includes GetGroupPolicyInfoByOSCat;

the sixth one of the plurality of first device signals includes GetGroupPolicyInfoByOSSubCat;

the sixth one of the plurality of first device signals includes a log;

the sixth one of the plurality of first device signals is part of a log;

the sixth one of the plurality of first device signals includes a poll;

the sixth one of the plurality of first device signals is part of a poll;

the sixth one of the plurality of first device signals includes a poll-responsive signal;

the sixth one of the plurality of first device signals is part of a poll-responsive signal;

the sixth one of the plurality of first device signals includes a query response;

the sixth one of the plurality of first device signals is part of a query response;

the sixth one of the plurality of first device signals includes a verification;

the sixth one of the plurality of first device signals is part of a verification;

the sixth one of the plurality of first device signals includes a profile;

the sixth one of the plurality of first device signals is part of a profile;

the sixth one of the plurality of first device signals includes the first device vulnerability information;

the sixth one of the plurality of first device signals is part of the first device vulnerability information;

the sixth one of the plurality of first device signals is not part of nor includes a log, query response, a verification, a poll, a poll-responsive signal, a profile, nor the first device vulnerability information;

the sixth one of the plurality of first device signals results in categorized information;

the sixth one of the plurality of first device signals results in providing information that is categorized;

the sixth one of the plurality of first device signals fills a data structure;

use of the sixth one of the plurality of first device signals involves use of a pointer;

use of the sixth one of the plurality of first device signals involves a pointer;

the sixth one of the plurality of first device signals involves a pointer;

the sixth one of the plurality of first device-related server signals includes a response to one of: GetGroupPolicyInfo, GetGroupPolicyInfoByOSCat, or GetGroupPolicyInfoByOSSubCat;

the sixth one of the plurality of first device-related server signals includes a response to GetGroupPolicyInfo;

the sixth one of the plurality of first device-related server signals includes a response to GetGroupPolicyInfoByOSCat;

the sixth one of the plurality of first device-related server signals includes a response to GetGroupPolicyInfoByOSSubCat;

the sixth one of the plurality of first device-related server signals includes a response to one of: a log, a query response, a verification, a poll, a poll-responsive signal, a profile, or first device vulnerability information;

the sixth one of the plurality of first device-related server signals does not include a response to one of: a log, a query response, a poll, a poll-responsive signal, a verification, a profile, or first device vulnerability information;

the sixth one of the plurality of first device-related server signals results in categorized information;

the sixth one of the plurality of first device-related server signals results in providing information that is categorized;

the sixth one of the plurality of first device-related server signals fills a data structure;

use of the sixth one of the plurality of first device-related server signals involves use of a pointer;

use of the sixth one of the plurality of first device-related server signals involves a pointer;

the sixth one of the plurality of first device-related server signals involves a pointer;

the seventh one of the plurality of first device signals includes one of: GetGroupPolicyInfo, GetGroupPolicyInfoByOSCat, or GetGroupPolicyInfoByOSSubCat;

the seventh one of the plurality of first device signals includes GetGroupPolicyInfo;

the seventh one of the plurality of first device signals includes GetGroupPolicyInfoByOSCat;

the seventh one of the plurality of first device signals includes GetGroupPolicyInfoByOSSubCat;

the seventh one of the plurality of first device signals includes a log;

the seventh one of the plurality of first device signals is part of a log;

the seventh one of the plurality of first device signals includes a poll;

the seventh one of the plurality of first device signals is part of a poll;

the seventh one of the plurality of first device signals includes a poll-responsive signal;

the seventh one of the plurality of first device signals is part of a poll-responsive signal;

the seventh one of the plurality of first device signals includes a query response;

the seventh one of the plurality of first device signals is part of a query response;

the seventh one of the plurality of first device signals includes a verification;

the seventh one of the plurality of first device signals is part of a verification;
the seventh one of the plurality of first device signals includes a profile;
the seventh one of the plurality of first device signals is part of a profile;
the seventh one of the plurality of first device signals includes the first device vulnerability information;
the seventh one of the plurality of first device signals is part of the first device vulnerability information;
the seventh one of the plurality of first device signals is not part of nor includes a log, query response, a verification, a poll, a poll-responsive signal, a profile, nor the first device vulnerability information;
the seventh one of the plurality of first device signals results in categorized information;
the seventh one of the plurality of first device signals results in providing information that is categorized;
the seventh one of the plurality of first device signals fills a data structure;
use of the seventh one of the plurality of first device signals involves use of a pointer;
use of the seventh one of the plurality of first device signals involves a pointer;
the seventh one of the plurality of first device signals involves a pointer;
the seventh one of the plurality of first device-related server signals includes a response to one of: GetGroupPolicyInfo, GetGroupPolicyInfoByOSCat, or GetGroupPolicyInfoByOSSubCat;
the seventh one of the plurality of first device-related server signals includes a response to GetGroupPolicyInfo;
the seventh one of the plurality of first device-related server signals includes a response to GetGroupPolicyInfoByOSCat;
the seventh one of the plurality of first device-related server signals includes a response to GetGroupPolicyInfoByOSSubCat;
the seventh one of the plurality of first device-related server signals includes a response to one of: a log, a query response, a verification, a poll, a poll-responsive signal, a profile, or first device vulnerability information;
the seventh one of the plurality of first device-related server signals does not include a response to one of: a log, a query response, a verification, a poll, a poll-responsive signal, a profile, or first device vulnerability information;
the seventh one of the plurality of first device-related server signals results in categorized information;
the seventh one of the plurality of first device-related server signals results in providing information that is categorized;
the seventh one of the plurality of first device-related server signals fills a data structure;
use of the seventh one of the plurality of first device-related server signals involves use of a pointer;
use of the seventh one of the plurality of first device-related server signals involves a pointer;
the seventh one of the plurality of first device-related server signals involves a pointer;
the eighth one of the plurality of first device signals includes one of: GetClientInstalledSoftware, GetClientInstalledSoftwareEx, GetClientInstalledPatches, or GetClientInstalledPatchesEx;
the eighth one of the plurality of first device signals includes GetClientInstalledSoftware;
the eighth one of the plurality of first device signals includes GetClientInstalledSoftwareEx;
the eighth one of the plurality of first device signals includes GetClientInstalledPatches;
the eighth one of the plurality of first device signals includes GetClientInstalledPatchesEx;
the eighth one of the plurality of first device signals includes a log;
the eighth one of the plurality of first device signals is part of a log;
the eighth one of the plurality of first device signals includes a poll;
the eighth one of the plurality of first device signals is part of a poll;
the eighth one of the plurality of first device signals includes a poll-responsive signal;
the eighth one of the plurality of first device signals is part of a poll-responsive signal;
the eighth one of the plurality of first device signals includes a query response;
the eighth one of the plurality of first device signals is part of a query response;
the eighth one of the plurality of first device signals includes a verification;
the eighth one of the plurality of first device signals is part of a verification;
the eighth one of the plurality of first device signals includes a profile;
the eighth one of the plurality of first device signals is part of a profile;
the eighth one of the plurality of first device signals includes the first device vulnerability information;
the eighth one of the plurality of first device signals is part of the first device vulnerability information;
the eighth one of the plurality of first device signals is not part of nor includes a log, query response, a verification, a poll, a poll-responsive signal, a profile, nor the first device vulnerability information;
the eighth one of the plurality of first device signals results in categorized information;
the eighth one of the plurality of first device signals results in providing information that is categorized;
the eighth one of the plurality of first device signals fills a data structure;
use of the eighth one of the plurality of first device signals involves use of a list;
use of the eighth one of the plurality of first device signals involves a list;
the eighth one of the plurality of first device signals involves a list;
the eighth one of the plurality of first device-related server signals includes a response to one of: GetClientInstalledSoftware, GetClientInstalledSoftwareEx, GetClientInstalledPatches, or GetClientInstalledPatchesEx;
the eighth one of the plurality of first device-related server signals includes a response to GetClientInstalledSoftware;
the eighth one of the plurality of first device-related server signals includes a response to GetClientInstalledSoftwareEx;
the eighth one of the plurality of first device-related server signals includes a response to GetClientInstalledPatches;

the eighth one of the plurality of first device-related server signals includes a response to GetClientInstalledPatchesEx;
the eighth one of the plurality of first device-related server signals includes a response to one of: a log, a query response, a verification, a poll, a poll-responsive signal, a profile, or first device vulnerability information;
the eighth one of the plurality of first device-related server signals does not include a response to one of: a log, a query response, a verification, a profile, or first device vulnerability information;
the eighth one of the plurality of first device-related server signals results in categorized information;
the eighth one of the plurality of first device-related server signals results in providing information that is categorized;
the eighth one of the plurality of first device-related server signals fills a data structure;
use of the eighth one of the plurality of first device-related server signals involves use of a list;
use of the eighth one of the plurality of first device-related server signals involves a list;
the eighth one of the plurality of first device-related server signals involves a list;
the ninth one of the plurality of first device signals includes one of: GetClientInstalledSoftware, GetClientInstalledSoftwareEx, GetClientInstalledPatches, or GetClientInstalledPatchesEx;
the ninth one of the plurality of first device signals includes GetClientInstalledSoftware;
the ninth one of the plurality of first device signals includes GetClientInstalledSoftwareEx;
the ninth one of the plurality of first device signals includes GetClientInstalledPatches;
the ninth one of the plurality of first device signals includes GetClientInstalledPatchesEx;
the ninth one of the plurality of first device signals includes a log;
the ninth one of the plurality of first device signals is part of a log;
the ninth one of the plurality of first device signals includes a poll;
the ninth one of the plurality of first device signals is part of a poll;
the ninth one of the plurality of first device signals includes a poll-responsive signal;
the ninth one of the plurality of first device signals is part of a poll-responsive signal;
the ninth one of the plurality of first device signals includes a query response;
the ninth one of the plurality of first device signals is part of a query response;
the ninth one of the plurality of first device signals includes a verification;
the ninth one of the plurality of first device signals is part of a verification;
the ninth one of the plurality of first device signals includes a profile;
the ninth one of the plurality of first device signals is part of a profile;
the ninth one of the plurality of first device signals includes the first device vulnerability information;
the ninth one of the plurality of first device signals is part of the first device vulnerability information;
the ninth one of the plurality of first device signals is not part of nor includes a log, query response, a verification, a poll, a poll-responsive signal, a profile, nor the first device vulnerability information;
the ninth one of the plurality of first device signals results in categorized information;
the ninth one of the plurality of first device signals results in providing information that is categorized;
the ninth one of the plurality of first device signals fills a data structure;
use of the ninth one of the plurality of first device signals involves use of a list;
use of the ninth one of the plurality of first device signals involves a list;
the ninth one of the plurality of first device signals involves a list;
the ninth one of the plurality of first device-related server signals includes a response to one of: GetClientInstalledSoftware, GetClientInstalledSoftwareEx, GetClientInstalledPatches, or GetClientInstalledPatchesEx;
the ninth one of the plurality of first device-related server signals includes a response to GetClientInstalledSoftware;
the ninth one of the plurality of first device-related server signals includes a response to GetClientInstalledSoftwareEx;
the ninth one of the plurality of first device-related server signals includes a response to GetClientInstalledPatches;
the ninth one of the plurality of first device-related server signals includes a response to GetClientInstalledPatchesEx;
the ninth one of the plurality of first device-related server signals includes a response to one of: a log, a query response, a verification, a poll signal, a poll-responsive signal, a profile, or first device vulnerability information;
the ninth one of the plurality of first device-related server signals does not include a response to one of: a log, a query response, a verification, a poll, a poll-responsive signal, a profile, or first device vulnerability information;
the ninth one of the plurality of first device-related server signals results in categorized information;
the ninth one of the plurality of first device-related server signals results in providing information that is categorized;
the ninth one of the plurality of first device-related server signals fills a data structure;
use of the ninth one of the plurality of first device-related server signals involves use of a list;
use of the ninth one of the plurality of first device-related server signals involves a list;
the ninth one of the plurality of first device-related server signals involves a list;
the first product upgrade is caused to be sent in response to receiving a tenth one of the first device signals;
the processing of the first one of the plurality of first device-related server signals and the fourth one of the plurality of first device-related server signals is performed utilizing the first client agent to apply the at least one first group policy and the edited at least one first group policy;
the first virus scanner is installed on the first device by being installed, in its entirety, on the first device;
the first virus scanner is installed on the first device by being installed, at least in part, on the first device;

the first virus scanner is installed on the first device by being installed on the first device, by at least some first virus scanner code being installed on the first device to control at least a portion of the first virus scanner that is not physically on the first device;

the first intrusion detection system is installed on the first device by being installed, in its entirety, on the first device;

the first intrusion detection system is installed on the first device by being installed, at least in part, on the first device;

the first intrusion detection system is installed on the first device by being installed on the first device, by at least some first intrusion detection system code being installed on the first device to control at least a portion of the first intrusion detection system that is not physically on the first device;

the first firewall is installed on the first device;

the first firewall is not installed on the first device;

the first firewall is installed on the first device by being installed, in its entirety, on the first device;

the first firewall is installed on the first device by being installed, at least in part, on the first device;

the first firewall is installed on the first device by being installed on the first device, by at least some first firewall code being installed on the first device to control at least a portion of the first firewall that is not physically on the first device;

each instance of a receipt of any signal at the first device from the at least one server over the at least one network, includes receipt of such any signal directly from the at least one server;

each instance of a receipt of any signal at the first device from the at least one server over the at least one network, includes receipt of such any signal indirectly from the at least one server;

each instance of after sending one of the plurality of first device signals, includes in response to sending one of the plurality of first device signals;

each instance of after sending one of the plurality of first device signals, includes immediately thereafter;

each instance of after sending one of the plurality of first device signals, includes immediately thereafter, without any intermediary operation after sending one of the plurality of first device signals;

each instance of after sending one of the plurality of first device signals, includes after an intermediary operation that occurs after sending one of the plurality of first device signals;

the first product upgrade is to upgrade only one of the first virus scanner, the first intrusion detection system, or the first firewall;

the first product upgrade is to upgrade each of the first virus scanner, the first intrusion detection system, or the first firewall;

the first product upgrade is to upgrade only one of the first virus scanner or the first intrusion detection system;

the first product upgrade is to upgrade each of the first virus scanner and the first intrusion detection system;

the first product upgrade is to upgrade each of the first client agent, the first virus scanner, and the first intrusion detection system;

the first product upgrade is to upgrade each of the first client agent, the first virus scanner, and the first intrusion detection system together;

the first product upgrade is to upgrade each of the first client agent, the first virus scanner, and the first intrusion detection system separately;

the first product upgrade is for upgrading logic that uses the at least one update;

the first product upgrade is for upgrading software that uses the at least one update;

the first product upgrade is for upgrading code that is separate from and uses the at least one update;

the first client agent installs updates on the first device, and the updates include signature updates and policy updates;

the processing of the first one of the plurality of first device-related server signals to apply the at least one first group policy at the first device, is caused by creating or sending a signal to cause the processing;

the processing of the first one of the plurality of first device-related server signals to apply the at least one first group policy at the first device, is performed by installing the at least one first group policy on the first device;

the processing of the first one of the plurality of first device-related server signals to apply the at least one first group policy at the first device, is performed by updating the first device to include the at least one first group policy;

the processing of the first one of the plurality of first device-related server signals to apply the at least one first group policy at the first device, is caused based on the addition of the at least one first group policy to the first group of devices and the addition of the first device to the first group of devices, by virtue of the first one of the plurality of first device-related server signals being sent, based on the addition of the at least one first group policy to the first group of devices and the addition of the first device to the first group of devices;

the receipt of the first one of the plurality of first device-related server signals causes installation of the at least one first group policy;

the installation of the at least one first group policy includes storing the at least one first group policy on the first device;

the installation of the at least one first group policy includes storing at least a portion of the at least one first group policy on the first device;

the installation of the at least one first group policy does not include storing the at least one first group policy on the first device;

the installation of the at least one first group policy does not include storing the at least one first group policy, in its entirety, on the first device;

the installation of the at least one first group policy includes storing at least one of: a policy-related template, a policy-related rule, or a policy-related update on least one first group policy on the first device;

the installation of the at least one first group policy includes taking at least one action at the first device that results in a capability to use the at least one first group policy;

the installation of the at least one first group policy includes taking at least one action at the first device that does not necessarily include storage of the at least one group policy and that results in a capability to receive a benefit of the use of the at least one first group policy;

the installation of the at least one first group policy includes taking at least one action at the first device that does not necessarily include storage of the at least one group policy and that results in a capability to receive a benefit of the use of the at least one first group policy, where said use of the at least one first group policy is remote from the first device;

the first one of the plurality of first device-related server signals is received, in accordance with the at least one first group policy;

the receipt of the second one of the plurality of first device-related server signals provides the update for use at the first device, where the use of the update further includes performance of one or more actions required by the at least one first group policy;

the receipt of the second one of the plurality of first device-related server signals provides the update for use at the first device, where the use of the update includes an installation thereof;

the receipt of the second one of the plurality of first device-related server signals provides the update for use at the first device, where the use of the update includes only an installation thereof;

the receipt of the second one of the plurality of first device-related server signals provides the update for use at the first device, where the second one of the plurality of first device-related server signals includes the update;

the receipt of the second one of the plurality of first device-related server signals provides the update for use at the first device, where the second one of the plurality of first device-related server signals is the update;

the receipt of the second one of the plurality of first device-related server signals provides the update for use at the first device, where the second one of the plurality of first device-related server signals includes signatures;

the receipt of the second one of the plurality of first device-related server signals provides the update for use at the first device, where the second one of the plurality of first device-related server signals includes a signature update;

the update is provided, in accordance with the at least one first group policy;

the update is used at the first device, in accordance with the at least one first group policy;

only the second one of the plurality of first device-related server signals is received, in accordance with the at least one first group policy;

only the update is provided, in accordance with the at least one first group policy;

only the update is used at the first device, in accordance with the at least one first group policy;

the second one of the plurality of first device-related server signals is received, the update is provided, and the update is used at the first device, all in accordance with the at least one first group policy;

at least one of: the second one of the plurality of first device-related server signals is received, the update is provided, and the update is used at the first device, in accordance with the at least one first group policy;

the receipt of the third one of the plurality of first device-related server signals provides the another update for use at the first device, where the use of the another update further includes performance of one or more actions required by the at least one first group policy;

the receipt of the third one of the plurality of first device-related server signals provides the another update for use at the first device, where the use of the another update includes an installation thereof on the first device;

the receipt of the third one of the plurality of first device-related server signals provides the another update for use at the first device, where the use of the another update includes only an installation thereof on the first device;

the receipt of the third one of the plurality of first device-related server signals provides the another update for use at the first device, where the third one of the plurality of first device-related server signals includes the another update;

the receipt of the third one of the plurality of first device-related server signals provides the another update for use at the first device, where the third one of the plurality of first device-related server signals is the another update;

the receipt of the third one of the plurality of first device-related server signals provides the another update for use at the first device, where the third one of the plurality of first device-related server signals includes signatures;

the receipt of the third one of the plurality of first device-related server signals provides the another update for use at the first device, where the third one of the plurality of first device-related server signals includes a signature update;

the receipt of the third one of the plurality of first device-related server signals provides the another update for use at the first device, where the third one of the plurality of first device-related server signals includes the updated first device vulnerability information from the at least one other server;

the receipt of the third one of the plurality of first device-related server signals provides the another update for use at the first device, where the third one of the plurality of first device-related server signals includes only a portion of the updated first device vulnerability information;

the receipt of the third one of the plurality of first device-related server signals provides the another update for use at the first device, where the third one of the plurality of first device-related server signals includes an entirety of the updated first device vulnerability information;

the another update is provided, in accordance with the at least one first group policy;

the another update is used at the first device, in accordance with the at least one first group policy;

only the third one of the plurality of first device-related server signals is received, in accordance with the at least one first group policy;

only the another update is provided, in accordance with the at least one first group policy;

only the another update is used at the first device, in accordance with the at least one first group policy;

the third one of the plurality of first device-related server signals is received, the another update is provided, and the another update is used at the first device, all in accordance with the at least one first group policy;

at least one of: the third one of the plurality of first device-related server signals is received, the another update is provided, and the another update is used at the first device, in accordance with the at least one first group policy;

the processing of the fourth one of the plurality of first device-related server signals to apply the edited at least one first group policy at the first device, is caused by creating or sending a signal to cause the processing;

the processing of the fourth one of the plurality of first device-related server signals to apply the edited at least one first group policy at the first device, is performed by altering the at least one first group policy on the first device;

the processing of the fourth one of the plurality of first device-related server signals to apply the edited at least one first group policy at the first device, is performed by altering, at the first device, the at least one first group policy;

the processing of the fourth one of the plurality of first device-related server signals to apply the edited at least one first group policy at the first device, is performed by altering the at least one first group policy remotely and then installing the edited at least one first group policy on the first device;

the processing of the fourth one of the plurality of first device-related server signals to apply the edited at least one first group policy at the first device, is performed by updating the first device to include the edited at least one first group policy;

the processing of the fourth one of the plurality of first device-related server signals to apply the edited at least one first group policy at the first device, is performed by replacing, at the first device, the at least one first group policy with the edited at least one first group policy;

the processing of the fourth one of the plurality of first device-related server signals to apply the edited at least one first group policy at the first device, is caused based on the editing the at least one first group policy, by virtue of the fourth one of the plurality of first device-related server signals being sent, based on the editing the at least one first group policy;

the receipt of the fourth one of the plurality of first device-related server signals causes installation of the edited at least one first group policy;

the installation of the edited at least one first group policy includes storing the edited at least one first group policy on the first device;

the installation of the edited at least one first group policy includes storing at least a portion of the edited at least one first group policy on the first device;

the installation of the edited at least one first group policy does not include storing the edited at least one first group policy on the first device;

the installation of the edited at least one first group policy does not include storing the edited at least one first group policy, in its entirety, on the first device;

the installation of the edited at least one first group policy includes storing at least one of: a policy-related template, a policy-related rule, or a policy-related update on least one first group policy on the first device;

the installation of the edited at least one first group policy includes taking at least one action at the first device that results in a capability to use the edited at least one first group policy;

the installation of the edited at least one first group policy includes taking at least one action at the first device that does not necessarily include storage of the at least one group policy and that results in a capability to receive a benefit of the use of the edited at least one first group policy;

the installation of the edited at least one first group policy includes taking at least one action at the first device that does not necessarily include storage of the at least one group policy and that results in a capability to receive a benefit of the use of the edited at least one first group policy, where said use is remote from the first device;

the fourth one of the plurality of first device-related server signals is received, in accordance with the edited at least one first group policy;

the receipt of the fifth one of the plurality of first device-related server signals provides the yet another update for use at the first device, where the use of the yet another update further includes performance of one or more actions required by the edited at least one first group policy;

the receipt of the fifth one of the plurality of first device-related server signals provides the yet another update for use at the first device, where the fifth one of the plurality of first device-related server signals includes the yet another update;

the receipt of the fifth one of the plurality of first device-related server signals provides the yet another update for use at the first device, where the fifth one of the plurality of first device-related server signals is the yet another update;

the receipt of the fifth one of the plurality of first device-related server signals provides the yet another update for use at the first device, where the fifth one of the plurality of first device-related server signals includes signatures;

the receipt of the fifth one of the plurality of first device-related server signals provides the yet another update for use at the first device, where the fifth one of the plurality of first device-related server signals includes a signature update;

the yet another update is provided, in accordance with the edited at least one first group policy;

the yet another update is used at the first device, in accordance with the edited at least one first group policy;

only the fifth one of the plurality of first device-related server signals is received, in accordance with the edited at least one first group policy;

only the yet another update is provided, in accordance with the edited at least one first group policy;

only the yet another update is used at the first device, in accordance with the edited at least one first group policy;

the fifth one of the plurality of first device-related server signals is received, the yet another update is provided, and the yet another update is used at the first device, all in accordance with the edited at least one first group policy;

at least one of: the fifth one of the plurality of first device-related server signals is received, the yet another update is provided, and the yet another update is used at the first device, in accordance with the edited at least one first group policy;

the seventh one of the plurality of first device signals, the eighth one of the plurality of first device signals, and the ninth one of the plurality of first device signals are each part sub-signals of a same overall signal;

the seventh one of the plurality of first device signals, the eighth one of the plurality of first device signals, and the ninth one of the plurality of first device signals are each parts of a single, same overall signal;

the seventh one of the plurality of first device signals, the eighth one of the plurality of first device signals, and the ninth one of the plurality of first device signals are each different instances of a same signal;

the seventh one of the plurality of first device signals, the eighth one of the plurality of first device signals, and the ninth one of the plurality of first device signals are each different instances of a same signal type;

the seventh one of the plurality of first device signals, the eighth one of the plurality of first device signals, and the ninth one of the plurality of first device signals are each separate signals;

the seventh one of the plurality of first device signals, the eighth one of the plurality of first device signals, and the ninth one of the plurality of first device signals are each different signals;

the seventh one of the plurality of first device signals, the eighth one of the plurality of first device signals, and the ninth one of the plurality of first device signals are each different signal types;

the seventh one of the plurality of first device signals, the eighth one of the plurality of first device signals, and the ninth one of the plurality of first device signals each have different formats;

at least one of: the application of the at least one first group policy at the first device, the application of the edited at least one first group policy at the first device, or the yet another update for use at the first device, is identified utilizing the first client agent, by verifying the same;

each of: the application of the at least one first group policy at the first device, the application of the edited at least one first group policy at the first device, and the yet another update for use at the first device, are identified utilizing the first client agent, by verifying the same;

at least one of: the application of the at least one first group policy at the first device, the application of the edited at least one first group policy at the first device, or the yet another update for use at the first device, is identified utilizing the first client agent, via a query response;

each of: the application of the at least one first group policy at the first device, the application of the edited at least one first group policy at the first device, and the yet another update for use at the first device, are identified utilizing the first client agent, via a query response;

at least one of: the application of the at least one first group policy at the first device, the application of the edited at least one first group policy at the first device, or the yet another update for use at the first device, is identified utilizing the first client agent, via a log;

each of: the application of the at least one first group policy at the first device, the application of the edited at least one first group policy at the first device, and the yet another update for use at the first device, are identified utilizing the first client agent, via a log;

at least one of: the application of the at least one first group policy at the first device, the application of the edited at least one first group policy at the first device, or the yet another update for use at the first device, is identified utilizing the first client agent, via an audit trail report;

each of: the application of the at least one first group policy at the first device, the application of the edited at least one first group policy at the first device, and the yet another update for use at the first device, are identified utilizing the first client agent, via an audit trail report;

at least one of: the application of the at least one first group policy at the first device, the application of the edited at least one first group policy at the first device, or the yet another update for use at the first device, is identified utilizing the first client agent, by tracking the same;

each of: the application of the at least one first group policy at the first device, the application of the edited at least one first group policy at the first device, and the yet another update for use at the first device, are identified utilizing the first client agent, by tracking the same;

at least two of: the application of the at least one first group policy at the first device, the application of the edited at least one first group policy at the first device, and the yet another update for use at the first device, are caused to be reported together;

at least two of: the application of the at least one first group policy at the first device, the application of the edited at least one first group policy at the first device, and the yet another update for use at the first device, are caused to be reported in a same report;

at least two of: the application of the at least one first group policy at the first device, the application of the edited at least one first group policy at the first device, and the yet another update for use at the first device, are caused to be reported in a same, single report;

each instance of reporting is caused, at the first device, by sending a corresponding signal;

each instance of reporting is caused, at the server, by sending a corresponding signal for review via a console;

at least two of: the application of the at least one first group policy at the first device, the application of the edited at least one first group policy at the first device, and the yet another update for use at the first device, are caused to be reported separately;

at least two of: the application of the at least one first group policy at the first device, the application of the edited at least one first group policy at the first device, and the yet another update for use at the first device, are caused to be reported in different reports;

each of: the application of the at least one first group policy at the first device, the application of the edited at least one first group policy at the first device, and the yet another update for use at the first device, are caused to be reported together;

each of: the application of the at least one first group policy at the first device, the application of the edited at least one first group policy at the first device, and the yet another update for use at the first device, are caused to be reported in a same report;

each of: the application of the at least one first group policy at the first device, the application of the edited at least one first group policy at the first device, and the yet another update for use at the first device, are caused to be reported in a same, single report;

each of: the application of the at least one first group policy at the first device, the application of the edited at least one first group policy at the first device, and the yet another update for use at the first device, are caused to be reported separately;

each of: the application of the at least one first group policy at the first device, the application of the edited at least one first group policy at the first device, and the yet another update for use at the first device, are caused to be reported in different reports;

the identification of the first, second, and third portion of the first device vulnerability information occur simultaneously;

the identification of the first, second, and third portion of the first device vulnerability information occur in response to the receipt thereof;

the identification of the first, second, and third portion of the first device vulnerability information is for installation thereof;

the identification of the first, second, and third portion of the first device vulnerability information is for change management;

the identification of the first, second, and third portion of the first device vulnerability information is for change management-related tracking;

the identification of the first, second, and third portion of the first device vulnerability information is for ensuring that the same are correctly installed on a corresponding one of: the first virus scanner, the first intrusion detection system, and the first firewall;

the identification of the first, second, and third portion of the first device vulnerability information is for reporting the same;

the first, second, and third portion of the first device vulnerability information are together;

the identification of the first, second, and third portion of the first device vulnerability information are together;

the first network traffic event is capable of being an incident;

the first network traffic event includes a single packet;

the first network traffic event includes one or more packets;

the first network traffic event includes at least a portion of a packet;

the first network traffic event includes at least a portion of traffic over a network;

the first network traffic event includes at least a portion of traffic communicated to the first device over the at least one network;

the data includes a payload of a packet;

the first network traffic event includes a first connection request;

the first network traffic event is caused to be identified using an in-line sensor;

the first network traffic event is caused to be identified without using an in-line sensor;

the first network traffic event is caused to be identified by monitoring the same;

the first network traffic event is caused to be identified by processing the same;

the first destination signal includes the first destination;

the first destination signal does not include the first destination;

the first destination is identified by an in-line sensor;

the first destination is not identified by an in-line sensor;

the first destination is identified utilizing the first client agent;

the analysis involving the destination, includes an analysis of a vulnerability or compliance of the destination;

the analysis involving the first destination is performed by the at least one server;

the analysis involving the first destination is performed by under the control of the at least one server;

the analysis involving the first destination is performed at at least one other server;

the analysis involving the first destination is performed at at least one other server so that results may be accessible via the at least one server;

the analysis involving the first destination, determines whether the first destination is vulnerable or not;

the result of the analysis involving the first destination, includes an indication whether the first destination is vulnerable or not;

the reaction includes a patch;

the reaction does not include a patch;

the reaction includes an update;

the reaction does not include an update;

the reaction includes at least one of reporting, dropping or blocking;

the reaction includes reporting;

the reaction includes dropping;

the reaction includes blocking;

the reaction includes all of reporting, dropping and blocking;

the reaction includes logging the first network traffic event as an incident;

the reaction includes the reporting of the first attack;

the reaction includes the prevention of the first attack;

the reaction does not include the prevention of the first attack;

the reaction does not include the prevention of the first attack, but prevents additional attacks that exploit a particular vulnerability;

the reaction is conditionally caused by causing the reaction if the result of the analysis includes a first result, and by not causing the reaction if the result of the analysis includes a second result;

the reaction is to the first network traffic event;

the reaction occurs in response to the first network traffic event, and the first network traffic is not prevented in response to the identification of a determination that the at least one of the first device vulnerabilities corresponding with at least one of the intrusion-related information or the virus scanner-related information of the first device vulnerability information is not susceptible to being taken advantage of by the first network traffic event identified in connection with the first device;

the reaction does not occur in response to the first network traffic event, and the first network traffic is prevented in response to the identification of a determination that the at least one of the first device vulnerabilities corresponding with at least one of the intrusion-related information or the virus scanner-related information of the first device vulnerability information is susceptible to being taken advantage of by the first network traffic event identified in connection with the first device;

the reaction occurs in response to the first network traffic event, and the first network traffic is prevented in response to the identification of a determination that the at least one of the first device vulnerabilities corresponding with at least one of the intrusion-related information or the virus scanner-related information of the first device vulnerability information is susceptible to being taken advantage of by the first network traffic event identified in connection with the first device;

in a first scenario, the reaction occurs in response to the first network traffic event, and, in a second scenario, the first network traffic is not prevented in response to the identification of a determination that the at least one of the first device vulnerabilities corresponding with at least one of the intrusion-related information or the virus scanner-related information of the first device vulnerability information is not susceptible to being taken advantage of by the first network traffic event identified in connection with the first device;

in a first scenario, the reaction does not occur in response to the first network traffic event, and, in a second scenario, the first network traffic is prevented in response to the identification of a determination that the at least one of the first device vulnerabilities corresponding with at least one of the intrusion-related information or the virus scanner-related information of the first device vulnerability information is susceptible to being taken advantage of by the first network traffic event identified in connection with the first device;

in a first use case scenario: the reaction occurs in response to the first network traffic event, and the first network traffic is not prevented in response to the identification of a determination that the at least one of the first device vulnerabilities corresponding with at least one of the intrusion-related information or the virus scanner-related information of the first device vulnerability information is not susceptible to being taken advantage of by the first network traffic event identified in connection with the first device; and in a second use case scenario: the reaction does not occur in response to the first network traffic event, and the first network traffic is prevented in response to the identification of a determination that the at least one of the first device vulnerabilities corresponding with at least one of the intrusion-related information or the virus scanner-related information of the first device vulnerability information is susceptible to being taken advantage of by the first network traffic event identified in connection with the first device; and in a third use case scenario: the reaction occurs in response to the first network traffic event, and the first network traffic is prevented in response to the identification of a determination that the at least one of the first device vulnerabilities corresponding with at least one of the intrusion-related information or the virus scanner-related information of the first device vulnerability information is susceptible to being taken advantage of by the first network traffic event identified in connection with the first device;

the analysis involves a vulnerability of the destination;

the analysis does not involve a vulnerability of the destination;

the analysis involves a security issue at the destination;

the analysis involves a security issue relating to a susceptibility to maliciousness at the destination;

the result of the analysis includes an indication of vulnerability;

the result of the analysis does not include an indication of vulnerability;

the determination whether the at least one of the first device vulnerabilities corresponding with the virus scanner-related information of the first device vulnerability information is susceptible to being taken advantage of by the first network traffic event identified in connection with the first device, is caused utilizing the first virus scanner installed on the first device, by the first virus scanner comparing virus scanner signatures with the one or more packets;

the determination whether the at least one of the first device vulnerabilities corresponding with the virus scanner-related information of the first device vulnerability information is susceptible to being taken advantage of by the first network traffic event identified in connection with the first device, is caused utilizing the first virus scanner installed on the first device, by the first virus scanner comparing virus scanner signatures of the virus scanner-related information of the first device vulnerability information, with the data of the one or more packets;

the determination whether the at least one of the first device vulnerabilities corresponding with the intrusion-related information of the first device vulnerability information is susceptible to being taken advantage of by the first network traffic event identified in connection with the first device, is caused utilizing the first intrusion detection system installed on the first device, by the first intrusion detection system comparing intrusion detection system signatures of the intrusion-related information of the first device vulnerability information, with the one or more packets;

the virus scanner-related information and the intrusion-related information correspond with different ones of the first device vulnerabilities;

the virus scanner-related information and the intrusion-related information correspond with a same one of the first device vulnerabilities;

the virus scanner-related information and the intrusion-related information correspond with a same at least one of the first device vulnerabilities;

the virus scanner-related information and the intrusion-related information correspond with a different at least one of the first device vulnerabilities;

the access to the virus scanner-related information of the first device vulnerability information, is provided at the first device utilizing the first client agent, by the first client agent installing the same;

the access to the virus scanner-related information of the first device vulnerability information, is provided at the first device utilizing the first client agent, by the first client agent reporting a configuration for prompting the receipt of the virus scanner-related information of the first device vulnerability information;

the access to the intrusion-related information of the first device vulnerability information, is provided at the first device utilizing the first client agent, by the first client agent installing the same;

the access to the intrusion-related information of the first device vulnerability information, is provided at the first device utilizing the first client agent, by the first client agent reporting a configuration for prompting the receipt of the intrusion-related information of the first device vulnerability information;

the processing the management operation-related messages involves generating a response thereto;

the additional first device vulnerability information to provide the update for use at the first device in accordance with the edited at least one first group policy, is the same as any additional first device vulnerability information to provide the update for use at the first device in accordance with the at least one first group policy;

the additional first device vulnerability information to provide the update for use at the first device in accordance with the edited at least one first group policy, is the different from any additional first device vulnerability information to provide the update for use at the first device in accordance with the at least one first group policy;

the determination is that the at least one of the first device vulnerabilities corresponding with each of the intrusion-related information, the virus scanner-related information, and the firewall-related information of the first device vulnerability information, is susceptible to being taken advantage of by the first network traffic event identified in connection with the first device;

the determination is that the at least one of the first device vulnerabilities corresponding with at least two of the intrusion-related information, the virus scanner-related information, and the firewall-related information of the first device vulnerability information, is susceptible to being taken advantage of by the first network traffic event identified in connection with the first device;

the determination is that the at least one of the first device vulnerabilities corresponding with only one of the intrusion-related information, the virus scanner-related information, or the firewall-related information of the first device vulnerability information, is susceptible to being taken advantage of by the first network traffic event identified in connection with the first device;

the first already-existent policy has not been already added to at least one group of the devices;

the first already-existent policy has been already added to at least one group of the devices;

the first incident signal includes the first network traffic event;

the first incident signal includes an indication of the first attack;

the first incident signal is for reporting the first attack, by reporting the first attack to the at least one server;

the first incident signal is for reporting the first attack, by reporting the first attack to the at least one server, so that the first attack is capable of being reported to an administrator;

the first incident signal is for reporting the first attack, by reporting first attack to the at least one server, so that the first attack is capable of being reported via a console;

the first incident signal is for reporting the first attack, by reporting the first network traffic event to the at least one server;

the first incident signal is for reporting the first attack, by reporting the first network traffic event to the at least one server, so that the first network traffic event is capable of being reported to an administrator;

the first incident signal is for reporting the first attack, by reporting the first network traffic event to the at least one server, so that the first network traffic event is capable of being reported via a console;

the first network traffic event is detected as the first attack, based on the determination that the at least one of the first device vulnerabilities corresponding with at least one of the intrusion-related information or the virus scanner-related information of the first device vulnerability information is susceptible to being taken advantage of by the first network traffic event identified in connection with the first device;

as a result of the first network traffic event being detected as the first attack, the first network traffic event is reported as an incident;

the prevention of the first attack includes at least one of blocking the first network traffic event;

the prevention of the first attack includes at least one of dropping the first network traffic event;

the prevention of the first attack includes at least one of dropping and blocking the first network traffic event;

the prevention of the first attack includes neutralizing the same;

the prevention of the first attack includes remediating the at least one of the first device vulnerabilities corresponding with at least one of the intrusion-related information or the virus scanner-related information of the first device vulnerability information;

the prevention of the first attack includes providing an update that addresses the at least one of the first device vulnerabilities corresponding with at least one of the intrusion-related information or the virus scanner-related information of the first device vulnerability information;

the prevention of the first attack includes providing a policy that addresses the at least one of the first device vulnerabilities corresponding with at least one of the intrusion-related information or the virus scanner-related information of the first device vulnerability information;

the prevention of the first attack utilizes the at least one of the first virus scanner or the first intrusion detection system to detect the first attack so that the first attack can be prevented;

the prevention of the first attack utilizes the at least one of the first virus scanner or the first intrusion detection system to detect the first attack for preventing the same;

the prevention of the first attack utilizes the at least one of the first virus scanner or the first intrusion detection system to detect the first attack so that the first attack can be prevented using the first firewall;

the prevention of the first attack utilizes the at least one of the first virus scanner or the first intrusion detection system to detect the first attack for preventing the same via at least one other component;

the first already-existent policy being customizable;

the first already-existent policy being customizable by being flexible;

the first already-existent policy being flexible;

the at least one first group policy includes a single policy associated with the first virus scanner and the first intrusion detection system associated with the first device;

the at least one first group policy includes separate policies each associated with separate ones of the first virus scanner and the first intrusion detection system associated with the first device;

the at least one first group policy to the first group of devices causes a single update to the first virus scanner and the first intrusion detection system associated with the first device;

the at least one first group policy to the first group of devices causes a single update to all of the first virus scanner and the first intrusion detection system associated with the first device;

the at least one first group policy to the first group of devices causes different updates to each of the first virus scanner and the first intrusion detection system associated with the first device; or the at least one first group policy to the first group of devices causes a different update at each of the first virus scanner and the first intrusion detection system associated with the first device; and wherein at least one network operations center (NOC) server, a data warehouse, and a software development kit (SDK) are used for allowing access to information associated with at least one vulnerability and at least one remediation technique; and wherein a determination is made as to which of the plurality of devices have vulnerabilities by directly querying a firmware or operating system of the devices.

18. A non-transitory computer readable storage medium storing one or more programs for at least one component, a first device, and at least one server in communication via at least one network, the one or more programs comprising instructions which, when executed by at least one of: the at least one component, the first device, or the at least one server, cause a plurality of actions including:
 causing addition of a first device of a plurality of devices to a first group of devices, where each device in the first group includes a first operating system and a first application;
 causing, before the first group of devices is attacked, addition of at least one first group policy to the first group of devices that causes at least one update to a first virus scanner and a first intrusion detection system installed on the first device;
 causing editing of the at least one first group policy;
 in response to a first attack being detected and prevented at the first device utilizing at least one of the first virus scanner or the first intrusion detection system, causing, in response to an administrator action, an administrator function that is different from and in addition to the prevention of the first attack;
 utilizing group management signals, causing performance of group management operations, the group management signals including at least five (5) of:
  a first group management signal for causing performance of a first group management operation to create a particular group,
  a second group management signal for causing performance of a second group management operation to retrieve a list of a plurality of different groups,
  a third group management signal for causing performance of a third group management operation to retrieve group information associated with at least one of the plurality of different groups,
  a fourth group management signal for causing performance of a fourth group management operation to delete at least one of the plurality of different groups,
  a fifth group management signal for causing performance of a fifth group management operation to edit at least one of the plurality of different groups, a sixth group management signal for causing performance of a sixth group management operation to add at least one group policy to at least one of the plurality of different groups,
  a seventh group management signal for causing performance of a seventh group management operation to edit the at least one group policy,
  an eighth group management signal for causing performance of an eighth group management operation to delete the at least one group policy, and
  a ninth group management signal for causing performance of a ninth group management operation to retrieve the at least one group policy;
 supporting deployment of a first client agent to the first group of devices for installing the first client agent on the first group of devices;
 causing sending, from the at least one server to the first device over the at least one network, a first product upgrade to upgrade the first client agent and at least one of the first virus scanner, the first intrusion detection system, or a first firewall;
 in response to receiving a first one of a plurality of first device signals and based on the addition of the at least one first group policy to the first group of devices and the addition of the first device to the first group of devices, causing sending, from the at least one server to the first device over the at least one network, a first one of a plurality of first device-related server signals for being processed at the first device to apply the at least one first group policy at the first device;
 based on the first operating system, causing identification of a plurality of first device vulnerabilities including at least one first device vulnerability of the first operating system;
 in response to receiving a second one of the plurality of first device signals and based on the addition of the at least one first group policy to the first group of devices and the addition of the first device to the first group of devices, causing sending, from the at least one server to the first device over the at least one network, a second one of the plurality of first device-related server signals including first device vulnerability information to provide an update to be caused to be installed on the first device utilizing the first client agent for use at the first device in accordance with the at least one first group policy, the second one of the plurality of first device-related server signals including the first device vulnerability information corresponding with the first device vulnerabilities;
 receiving updated first device vulnerability information from at least one other server;
 in response to receiving a third one of the plurality of first device signals and based on the addition of the at least one first group policy to the first group of devices and the addition of the first device to the first group of devices, causing sending, from the at least one server to the first device over the at least one network, a third one of the plurality of first device-related server signals including the updated first device vulnerability information to provide another update to be caused to be installed on the first device utilizing the first client agent for use at the first device in accordance with the at least one first group policy;
 in response to receiving a fourth one of the plurality of first device signals and based on the editing the at least one first group policy, causing sending, from the at least one server to the first device over the at least one network, a fourth one of the plurality of first device-related server signals for being processed at the first device to apply the edited at least one first group policy at the first device;
 in response to receiving a fifth one of the plurality of first device signals and based on the editing the at least one first group policy, causing sending, from the at least one server to the first device over the at least one network, a fifth one of the plurality of first device-related server signals to provide yet another update to be caused to be installed on the first device utilizing the first client agent for use at the first device in accordance with the edited at least one first group policy;
 receiving, at the first device from the at least one server over the at least one network, the first product upgrade to upgrade the first client agent and at least one of the first virus scanner, the first intrusion detection system, or the first firewall;
 causing sending, from the first device to the at least one server over the at least one network, the first one of the plurality of first device signals;

after sending the first one of the plurality of first device signals, receiving, at the first device from the at least one server over the at least one network, the first one of the plurality of first device-related server signals;

in response to receiving the first one of the plurality of first device-related server signals, causing processing of the first one of the plurality of first device-related server signals to apply the at least one first group policy at the first device, based on the addition of the at least one first group policy to the first group of devices and the addition of the first device to the first group of devices;

causing sending, from the first device to the at least one server over the at least one network, the second one of the plurality of first device signals;

after sending the second one of the plurality of first device signals, receiving, at the first device from the at least one server over the at least one network, the second one of the plurality of first device-related server signals including the first device vulnerability information to provide the update for use at the first device in accordance with the at least one first group policy;

in response to receiving the second one of the plurality of first device-related server signals, causing, utilizing the first client agent, installation of the update for use at the first device in accordance with the at least one first group policy;

causing sending, from the first device to the at least one server over the at least one network, the third one of the plurality of first device signals;

after sending the third one of the plurality of first device signals, receiving, at the first device from the at least one server over the at least one network, the third one of the plurality of first device-related server signals including the updated first device vulnerability information to provide the another update for use at the first device in accordance with the at least one first group policy;

in response to receiving the third one of the plurality of first device-related server signals, causing, utilizing the first client agent, installation of the another update for use at the first device in accordance with the at least one first group policy;

causing sending, from the first device to the at least one server over the at least one network, the fourth one of the plurality of first device signals;

after sending the fourth one of the plurality of first device signals, receiving, at the first device from the at least one server over the at least one network, the fourth one of the plurality of first device-related server signals;

in response to receiving the fourth one of the plurality of first device-related server signals, causing processing of the fourth one of the plurality of first device-related server signals to apply the edited at least one first group policy at the first device, based on the editing the at least one first group policy;

causing sending, from the first device to the at least one server over the at least one network, the fifth one of the plurality of first device signals;

after sending the fifth one of the plurality of first device signals, receiving, at the first device from the at least one server over the at least one network, the fifth one of the plurality of first device-related server signals to provide the yet another update for use at the first device in accordance with the edited at least one first group policy;

in response to receiving the fifth one of the plurality of first device-related server signals, causing, utilizing the first client agent, installation of the yet another update for use at the first device in accordance with the edited at least one first group policy;

causing, utilizing the first client agent, identification of a first portion of the first device vulnerability information that includes virus scanner-related information that corresponds with at least one of the first device vulnerabilities;

causing, utilizing the first client agent, identification of a second portion of the first device vulnerability information that includes intrusion-related information that corresponds with at least one of the first device vulnerabilities;

causing identification of a first network traffic event in connection with the first device;

in response to identifying the first network traffic event, causing, utilizing the first intrusion detection system installed on the first device, a determination whether the at least one of the first device vulnerabilities corresponding with the intrusion-related information of the first device vulnerability information is susceptible to being taken advantage of by the first network traffic event identified in connection with the first device, utilizing the intrusion-related information of the first device vulnerability information;

in response to identifying the first network traffic event, causing, utilizing the first virus scanner installed on the first device, a determination whether the at least one of the first device vulnerabilities corresponding with the virus scanner-related information of the first device vulnerability information is susceptible to being taken advantage of by the first network traffic event identified in connection with the first device, utilizing the virus scanner-related information of the first device vulnerability information;

identifying a determination that the at least one of the first device vulnerabilities corresponding with at least one of the intrusion-related information or the virus scanner-related information of the first device vulnerability information is susceptible to being taken advantage of by the first network traffic event identified in connection with the first device; and in response to the identification of the determination that the at least one of the first device vulnerabilities corresponding with at least one of the intrusion-related information or the virus scanner-related information of the first device vulnerability information is susceptible to being taken advantage of by the first network traffic event identified in connection with the first device:
  detecting the first network traffic event as the first attack,
  causing prevention of the first attack, and
  causing, utilizing the first client agent, sending, from the first device over the at least one network, a first incident signal for reporting the first attack.

19. The non-transitory computer readable storage medium of claim 18, wherein:
  the first product upgrade is capable of including an upgrade to the first virus scanner and the first intrusion detection system; and
  the at least one update includes the update and the another update;
  the administrator function is caused to be provided as an option in response to receipt of the first incident signal;
  the at least five (5) includes at least eight (8);

each of the first, the second, the third, the fourth, and the fifth ones of the plurality of the first device signals are sent from the first device utilizing the first client agent;

the at least one first group policy includes, at least in part, a first already-existent policy; and the instructions, when executed by at least one of: the at least one component, the first device, or the at least one server, cause a plurality of additional actions including:

at the at least one server:
in response to receiving a sixth one of the plurality of first device signals, causing reporting of an application of the at least one first group policy at the first device;
in response to receiving a seventh one of the plurality of first device signals, causing reporting of an application of the edited at least one first group policy at the first device; and
in response to receiving an eighth one of the plurality of first device signals, causing reporting of an installation of the yet another update at the first device; and at the first device:
identifying, utilizing the first client agent, the application of the at least one first group policy at the first device;
causing, utilizing the first client agent, sending, from the first device to the at least one server over the at least one network, the sixth one of the plurality of first device signals, for causing reporting of the application of the at least one first group policy at the first device;
identifying, utilizing the first client agent, the application of the edited at least one first group policy at the first device;
causing, utilizing the first client agent, sending, from the first device to the at least one server over the at least one network, the seventh one of the plurality of first device signals, for causing reporting of the application of the edited at least one first group policy at the first device;
identifying, utilizing the first client agent, the yet another update for use at the first device in accordance with the edited at least one first group policy; and
causing, utilizing the first client agent, sending, from the first device to the at least one server over the at least one network, the eighth one of the plurality of first device signals, for causing reporting of the installation of the yet another update for use at the first device.

20. The non-transitory computer readable storage medium of claim 19, wherein:
all of the plurality of the first device signals are sent from the first device utilizing the first client agent;
the second one of the plurality of first device-related server signals including the first device vulnerability information is selected by the at least one server based on a content of the second one of the plurality of first device signals, where such content of the second one of the plurality of first device signals corresponds with the first operating system;
the third one of the plurality of first device-related server signals including the updated device vulnerability information is selected by the at least one server based on a content of the third one of the plurality of first device signals, where such content of the third one of the plurality of first device signals corresponds with the first operating system;
the fifth one of the plurality of first device-related server signals is selected by the at least one server based on a content of the fifth one of the plurality of first device signals, where such content of the fifth one of the plurality of first device signals corresponds with the first operating system;
the processing of the first one of the plurality of first device-related server signals to apply the at least one first group policy at the first device and the processing of the fourth one of the plurality of first device-related server signals to apply the edited at least one first group policy at the first device, are each caused utilizing the first client agent so that the first client agent causes installation of the at least one first group policy and the edited at least one first group policy on the first device;

wherein:
the fourth group management operation results in a fourth group management operation-related message being sent over the at least one network to the first device,
the fifth group management operation results in a fifth group management operation-related message being sent over the at least one network to the first device, and
the eighth group management operation results in an eighth group management operation-related message being sent over the at least one network to the first device;

the instructions, when executed by at least one of: the at least one component, the first device, or the at least one server, cause a plurality of yet additional actions including:
receiving, over the at least one network, the fourth group management operation-related message for, in response thereto, processing the fourth group management operation-related message at the first device in connection with deletion of the first group of devices,
receiving, over the at least one network, the fifth group management operation-related message for, in response thereto, processing the fifth group management operation-related message at the first device in connection with editing of the first group of devices; and
receiving, over the at least one network, the eighth group management operation-related message for, in response thereto, processing the eighth group management operation-related message at the first device in connection with deletion of the at least first one group policy;

wherein:
the at least one component includes or is part of at least one of the plurality of devices that is not in the first group of devices and therefor is not the first device, and the addition of the first device, the addition of the at least one first group policy, the editing, and the administrator function are caused by signal transmission from the at least one of the plurality of devices that is not in the first group of devices nor includes the first device;
the application of the at least one first group policy at the first device is reported, such that the reporting of the application of the at least one first group policy at the first device is accessible via the at least one component, that includes or is part of the at least one of the plurality of devices that is not in the first group of devices nor includes the first device;

the application of the edited at least one first group policy at the first device is reported, such that the reporting of the application of the edited at least one first group policy at the first device is accessible via the at least one component, that includes or is part of the at least one of the plurality of devices that is not in the first group of devices nor includes the first device;

the use of the yet another update at the first device in accordance with the edited at least one first group policy is reported, such that the reporting of the use of the yet another update at the first device is accessible via the at least one component, that includes or is part of the at least one of the plurality of devices that is not in the first group of devices nor includes the first device;

in response to receiving the sixth one of the plurality of first device signals, the application of the at least one first group policy, as edited, is performed at the first device, such that the reporting of the application of the at least one first group policy, as edited, at the first device is accessible via the at least one component, that includes or is part of the at least one of the plurality of devices that is not in the first group of devices nor includes the first device;

the first intrusion detection system includes a first intrusion prevention system that includes, as part of the first intrusion prevention system, firewall capabilities;

the virus scanner-related information of the first device vulnerability information includes virus signatures utilized by the first virus scanner, and the intrusion-related information of the first device vulnerability information includes intrusion signatures utilized by the first intrusion prevention system;

the instructions, which when executed by at least one of: the at least one component, the first device, or the at least one server, cause a plurality of still yet additional actions including:

at the first device:

causing, utilizing the first client agent, identification of a third portion of the first device vulnerability information that includes firewall-related information that corresponds with at least one of the first device vulnerabilities; and in response to identifying the first network traffic event, causing, utilizing the first firewall, a determination whether the at least one of the first device vulnerabilities corresponding with the firewall-related information of the first device vulnerability information is susceptible to being taken advantage of by the first network traffic event identified in connection with the first device, utilizing the firewall-related information of the first device vulnerability information, access to which is provided at the first device utilizing the first client agent;

wherein:

the first device vulnerability information excludes at least a portion of potential vulnerability information that does not correspond with the first device vulnerabilities;

the first portion of the first device vulnerability information excludes other virus scanner-related information of the potential vulnerability information that does not correspond with the first device vulnerabilities;

the second portion of the first device vulnerability information excludes other intrusion-related information of the potential vulnerability information that does not correspond with the first device vulnerabilities;

the third portion of the first device vulnerability information excludes other firewall-related information of the potential vulnerability information that does not correspond with the first device vulnerabilities;

the instructions, when executed by at least one of: the at least one component, the first device, a second device, or the at least one server, cause a plurality of even still yet additional actions including:

identifying a second network traffic event in connection with the first device;

causing a determination whether the at least one of the first device vulnerabilities corresponding with the virus scanner-related information of the first device vulnerability information that corresponds with at least one of the first device vulnerabilities is not susceptible to being taken advantage of by the second network traffic event identified in connection with the first device, utilizing the virus scanner-related information of the first device vulnerability information;

identifying a third network traffic event in connection with the first device;

causing a determination whether the at least one of the first device vulnerabilities corresponding with the intrusion-related information of the first device vulnerability information that corresponds with at least one of the first device vulnerabilities is not susceptible to being taken advantage of by the third network traffic event identified in connection with the first device, utilizing the intrusion-related information of the first device vulnerability information;

identifying a fourth network traffic event in connection with the first device; and causing a determination whether the at least one of the first device vulnerabilities corresponding with the firewall-related information of the first device vulnerability information that corresponds with at least one of the first device vulnerabilities is not susceptible to being taken advantage of by the fourth network traffic event identified in connection with the first device, utilizing the first firewall-related information of the first device vulnerability information;

causing addition of a second device of a plurality of devices to a second group of devices, where each device in the second group includes a second operating system and a second application;

causing, before the second group of devices is attacked, addition of at least one second group policy to the second group of devices that causes at least one update to a second virus scanner and a second intrusion detection system installed on the second device, the at least one second group policy including, at least in part, a second already-existent policy;

causing editing of the at least one second group policy;

in response to a second attack being detected and prevented at the second device utilizing at least one of the second virus scanner or the second intrusion detection system, causing, in response to an administrator action, an administrator function that is different from and in addition to the prevention of the second attack;

supporting deployment of a second client agent to the second group of devices for installing the second client agent on the second group of devices;

causing sending, from the at least one server to the second device over the at least one network, a second product upgrade to upgrade at least one of the second virus scanner, the second intrusion detection system, or a second firewall;

in response to receiving a first one of a plurality of second device signals and based on the addition of the at least one second group policy to the second group of devices and the addition of the second device to the second group of devices, causing sending, from the at least one server to the second device over the at least one network, a first one of a plurality of second device-related server signals for being processed at the second device to apply the at least one second group policy at the second device;

based on the second operating system, causing identification of a plurality of second device vulnerabilities including at least one second device vulnerability of the second operating system;

in response to receiving a second one of the plurality of second device signals and based on the addition of the at least one second group policy to the second group of devices and the addition of the second device to the second group of devices, causing sending, from the at least one server to the second device over the at least one network, a second one of the plurality of second device-related server signals including second device vulnerability information to provide an update to be caused to be installed on the second device utilizing the second client agent for use at the second device in accordance with the at least one second group policy, the second one of the plurality of second device-related server signals including the second device vulnerability information corresponding with the second device vulnerabilities;

receiving updated second device vulnerability information from at least one other server;

in response to receiving a third one of the plurality of second device signals and based on the addition of the at least one second group policy to the second group of devices and the addition of the second device to the second group of devices, causing sending, from the at least one server to the second device over the at least one network, a third one of the plurality of second device-related server signals including the updated second device vulnerability information to provide another update to be caused to be installed on the second device utilizing the second client agent for use at the second device in accordance with the at least one second group policy;

in response to receiving a fourth one of the plurality of second device signals and based on the editing the at least one second group policy, causing sending, from the at least one server to the second device over the at least one network, a fourth one of the plurality of second device-related server signals for being processed at the second device to apply the edited at least one second group policy at the second device;

in response to receiving a fifth one of the plurality of second device signals and based on the editing the at least one second group policy, causing sending, from the at least one server to the second device over the at least one network, a fifth one of the plurality of second device-related server signals to provide yet another update to be caused to be installed on the second device utilizing the second client agent for use at the second device in accordance with the edited at least one second group policy; and in response to receiving a sixth one of the plurality of second device signals, causing reporting of an application of the at least one second group policy at the second device;

in response to receiving a seventh one of the plurality of second device signals, causing reporting of an application of the edited at least one second group policy at the second device;

in response to receiving an eighth one of the plurality of second device signals, causing reporting of an installation of the yet another update at the second device; and receiving, at the second device from the at least one server over the at least one network, the second product upgrade to upgrade at least one of the second virus scanner, the second intrusion detection system, or the second firewall;

causing sending, from the second device to the at least one server over the at least one network, the first one of the plurality of second device signals;

after sending the first one of the plurality of second device signals, receiving, at the second device from the at least one server over the at least one network, the first one of the plurality of second device-related server signals;

in response to receiving the first one of the plurality of second device-related server signals, causing processing of the first one of the plurality of second device-related server signals to apply the at least one second group policy at the second device, based on the addition of the at least one second group policy to the second group of devices and the addition of the second device to the second group of devices;

causing sending, from the second device to the at least one server over the at least one network, the second one of the plurality of second device signals;

after sending the second one of the plurality of second device signals, receiving, at the second device from the at least one server over the at least one network, the second one of the plurality of second device-related server signals including the second device vulnerability information to provide the update for use at the second device in accordance with the at least one second group policy;

in response to receiving the second one of the plurality of second device-related server signals, causing, utilizing the second client agent, installation of the update for use at the second device in accordance with the at least one second group policy;

causing sending, from the second device to the at least one server over the at least one network, the third one of the plurality of second device signals;

after sending the third one of the plurality of second device signals, receiving, at the second device from the at least one server over the at least one network, the third one of the plurality of second device-related server signals including the updated second device vulnerability information to provide the another update for use at the second device in accordance with the at least one second group policy;

in response to receiving the third one of the plurality of second device-related server signals, causing, utilizing the second client agent, installation of the another update for use at the second device in accordance with the at least one second group policy;

causing sending, from the second device to the at least one server over the at least one network, the fourth one of the plurality of second device signals;

after sending the fourth one of the plurality of second device signals, receiving, at the second device from the at least one server over the at least one network, the fourth one of the plurality of second device-related server signals;

in response to receiving the fourth one of the plurality of second device-related server signals, causing processing of the fourth one of the plurality of second device-related server signals to apply the edited at least one second group policy at the second device, based on the editing the at least one second group policy;

causing sending, from the second device to the at least one server over the at least one network, the fifth one of the plurality of second device signals;

after sending the fifth one of the plurality of second device signals, receiving, at the second device from the at least one server over the at least one network, the fifth one of the plurality of second device-related server signals to provide the yet another update for use at the second device in accordance with the edited at least one second group policy;

in response to receiving the fifth one of the plurality of second device-related server signals, causing, utilizing the second client agent, installation of the yet another update for use at the second device in accordance with the edited at least one second group policy;

identifying, utilizing the second client agent, the application of the at least one second group policy at the second device;

causing, utilizing the second client agent, sending, from the second device to the at least one server over the at least one network, the sixth one of the plurality of second device signals, for causing reporting of the application of the at least one second group policy at the second device;

identifying, utilizing the second client agent, the application of the edited at least one second group policy at the second device;

causing, utilizing the second client agent, sending, from the second device to the at least one server over the at least one network, the seventh one of the plurality of second device signals, for causing reporting of the application of the edited at least one second group policy at the second device;

identifying, utilizing the second client agent, the yet another update for use at the second device in accordance with the edited at least one second group policy;

causing, utilizing the second client agent, sending, from the second device to the at least one server over the at least one network, the eighth one of the plurality of second device signals, for causing reporting of the installation of the yet another update for use at the second device;

causing, utilizing the second client agent, identification of a first portion of the second device vulnerability information that includes virus scanner-related information that corresponds with at least one of the second device vulnerabilities;

causing, utilizing the second client agent, identification of a second portion of the second device vulnerability information that includes intrusion-related information that corresponds with at least one of the second device vulnerabilities;

causing identification of a fifth network traffic event in connection with the second device;

in response to identifying the fifth network traffic event, causing, utilizing the second intrusion detection system installed on the second device, a determination whether the at least one of the second device vulnerabilities corresponding with the intrusion-related information of the second device vulnerability information is susceptible to being taken advantage of by the fifth network traffic event identified in connection with the second device, utilizing the intrusion-related information of the second device vulnerability information, access to which is provided at the second device utilizing the second client agent;

in response to identifying the fifth network traffic event, causing, utilizing the second virus scanner installed on the second device, a determination whether the at least one of the second device vulnerabilities corresponding with the virus scanner-related information of the second device vulnerability information is susceptible to being taken advantage of by the fifth network traffic event identified in connection with the second device, utilizing the virus scanner-related information of the second device vulnerability information, access to which is provided at the second device utilizing the second client agent;

in response to identifying the fifth network traffic event, causing, utilizing the second firewall, a determination whether the at least one of the second device vulnerabilities corresponding with the firewall information of the second device vulnerability information is susceptible to being taken advantage of by the fifth network traffic event identified in connection with the second device, utilizing the firewall-related information of the second device vulnerability information, access to which is provided at the second device utilizing the second client agent;

identifying a determination that the at least one of the second device vulnerabilities corresponding with at least one of the intrusion-related information, the virus scanner-related information, or the firewall-related information of the second device vulnerability information is susceptible to being taken advantage of by the fifth network traffic event identified in connection with the second device; and in response to the identification of the determination that the at least one of the second device vulnerabilities corresponding with at least one of the intrusion-related information, the virus scanner-related information, or the firewall-related information of the second device vulnerability information is susceptible to being taken advantage of by the fifth network traffic event identified in connection with the second device:

detecting the fifth network traffic event as the second attack, causing prevention of the second attack, and causing, utilizing the second client agent, sending, from the second device over the at least one network, a second incident signal for reporting the second attack.

* * * * *